US012432833B2

(12) United States Patent
Casey et al.

(10) Patent No.: US 12,432,833 B2
(45) Date of Patent: Sep. 30, 2025

(54) SENSOR FOR MEASURING ENVIRONMENTAL CONDITIONS IN A USER ENVIRONMENT

(71) Applicant: Lutron Technology Company LLC, Coopersburg, PA (US)

(72) Inventors: Craig Alan Casey, Coopersburg, PA (US); Yogesh Gopalan, Cambridge, MA (US)

(73) Assignee: Lutron Technology Company LLC, Coopersburg, PA (US)

( * ) Notice: Subject to any disclaimer, the term of this patent is extended or adjusted under 35 U.S.C. 154(b) by 105 days.

(21) Appl. No.: 18/570,828

(22) PCT Filed: Jun. 18, 2022

(86) PCT No.: PCT/US2022/034122
§ 371 (c)(1),
(2) Date: Dec. 15, 2023

(87) PCT Pub. No.: WO2022/266522
PCT Pub. Date: Dec. 22, 2022

(65) Prior Publication Data
US 2024/0284572 A1  Aug. 22, 2024

Related U.S. Application Data

(60) Provisional application No. 63/212,398, filed on Jun. 18, 2021.

(51) Int. Cl.
*H05B 47/115* (2020.01)
*H04L 12/28* (2006.01)
(Continued)

(52) U.S. Cl.
CPC ........ *H05B 47/115* (2020.01); *H04L 12/2829* (2013.01); *H05B 47/16* (2020.01); *H04L 2012/285* (2013.01)

(58) Field of Classification Search
CPC ...... H05B 47/19; H05B 47/105; H05B 47/11; H05B 47/115; H05B 45/20; H05B 47/125;
(Continued)

(56) References Cited

U.S. PATENT DOCUMENTS 10,694,608 B2 *  6/2020  Baker ..................... G10L 15/30
10,779,381 B2 *  9/2020  Economy ............... H05B 47/19
(Continued)

*Primary Examiner* — Wei (Victor) Y Chan
(74) *Attorney, Agent, or Firm* — Flaster Greenberg P.C.

(57) ABSTRACT

A device located within a user environment comprises plurality of sensors to measure one or more environmental conditions within the user environment. A first sensor of the plurality of sensors is configured to measure an environmental condition on a first plane and a second sensor of the plurality of sensors is configured to measure an environmental condition on a second plane. For example, the sensor device may measure the temperature, humidity, light intensity, color temperature, and/or the like. The sensor device may periodically measure the environmental conditions, and may periodically transmit the values of the measured environmental conditions to a computing device. A mobile device associated with a user may receive the measured values from the sensor device when the mobile device is within range of the sensor device, and may present a survey to the user that includes one or more questions that prompt the user to report their comfort level with respect to the measured environmental conditions. The mobile device and/or another computing device may build a profile for the location and/or the user based on the values and the user's reported comfort levels.

16 Claims, 16 Drawing Sheets

(51) Int. Cl.
*H05B 47/105* (2020.01)
*H05B 47/11* (2020.01)
*H05B 47/16* (2020.01)
*H05B 47/19* (2020.01)

(58) Field of Classification Search
CPC .. H05B 47/1965; H05B 45/10; H05B 47/195; H05B 47/13; H05B 1/0263
See application file for complete search history.

(56) References Cited

U.S. PATENT DOCUMENTS

| | | | |
|---|---|---|---|
| 11,497,105 B2* | 11/2022 | Schröder | H05B 47/199 |
| 2013/0221203 A1 | 8/2013 | Barrileaux | |
| 2014/0028198 A1* | 1/2014 | Reed | H05B 47/16 |
| | | | 315/297 |
| 2016/0054023 A1* | 2/2016 | Baker | F24F 11/30 |
| | | | 315/307 |
| 2020/0082551 A1* | 3/2020 | Steiner | G06T 7/277 |
| 2020/0288558 A1* | 9/2020 | Anderson | H04L 67/125 |

* cited by examiner

SENSOR FOR MEASURING ENVIRONMENTAL CONDITIONS IN A USER ENVIRONMENT

CROSS-REFERENCE TO RELATED APPLICATIONS

This application is the 371 National Stage of International Application No. PCT/US2022/034122, filed Jun. 18, 2022, which claims priority to U.S. Provisional Patent Application No. 63/212,398, filed Jun. 18, 2021, the disclosures of which are incorporated herein by reference in their entirety.

BACKGROUND

A user environment, such as a residence or an office building, for example, may be configured using various types of load control systems. A lighting control system may be used to control the lighting loads providing artificial light in the user environment. A motorized window treatment control system may be used to control the natural light provided to the user environment. An HVAC system may be used to control the temperature and/or the humidity in the user environment.

Each load control system may include various control devices, including input devices and load control devices. The load control devices may receive messages, which may include load control instructions, for controlling an electrical load from one or more of the input devices. The load control devices may be configured to directly control an electrical load. The input devices may be configured to indirectly control the electrical load via the load control device.

Examples of load control devices may include lighting control devices (e.g., a dimmer switch, an electronic switch, a ballast, or a light-emitting diode (LED) driver), a motorized window treatment, a temperature control device (e.g., a thermostat), an AC plug-in load control device, and/or the like. Examples of input devices may include remote control devices, occupancy sensors, daylight sensors, glare sensors, color and/or color temperature sensors, temperature sensors, and/or the like. Remote control devices may receive user input for performing load control. Occupancy sensors may include infrared (IR) sensors for detecting occupancy/vacancy of an area based on movement of the users.

The preferred or user desired values for environmental conditions (e.g., temperature, humidity, light intensity, color and/or temperature, etc.) of a user environment may depend on the identity of the occupant(s) of the user environment. For example, certain occupants may prefer that the user environment have a relatively low temperature, while other occupants may prefer a relatively high temperature. Thus, a user-independent policy (e.g., a policy that defines the environmental conditions of the user environment (such as temperature setting based on time of day) without taking into account the preferences of a particular occupant in the space) may be undesirable.

SUMMARY

A device (e.g., a sensor device) located within a user environment may be used to measure one or more environmental conditions within the user environment. For example, the sensor device may measure the temperature, humidity, light intensity, color temperature, and/or any other environmental conditions within the user environment. The sensor device may measure environmental conditions related to the light within the user environment (e.g., the intensity and/or color temperature of the light) on two or more planes. For example, the sensor device may measure environmental conditions related to the light on a vertical plane and a horizontal plane. The sensor device may include one or more sensors that may be used to measure the environmental conditions. For example, the sensor device may include a temperature sensor, a humidity sensor, one or more visible light sensors, and/or the like.

The sensor device may periodically measure the environmental conditions, and may periodically transmit the values of the measured environmental conditions to a computing device (e.g., a system controller, a collection device and/or a mobile device). For example, the sensor device may measure the environmental conditions approximately once every minute, and may transmit the values approximately once every second. The sensor device may transmit the values as a beacon message transmitted in a beacon signal that may be received by one or more mobile devices in a load control system. A collection device may receive the values from the sensor device and may transmit the received values to a remote computing device. The collection device may also transmit associated information (e.g., a location ID associated with the area in which the user environment is located) to the remote computing device.

A mobile device that is associated with a user may receive the measured values from the sensor device when the mobile device is within range of the sensor device. The mobile device may present a survey to the user. The survey may include one or more questions that prompt the user to report their comfort level with respect to one or more of the measured environmental conditions. For a given environmental condition, the mobile device may display a scale from least comfortable to most comfortable, and may prompt the user to select a value within the scale that represents their comfort level with the given environmental condition. For example, the mobile device may prompt the user to select a value between 1 (e.g., least comfortable) and 10 (e.g., most comfortable) for the given environmental condition. Alternatively, the mobile device may display a question asking if the user is comfortable with the given environmental condition, and may prompt the user to select either "yes" or "no." If the user indicates that their comfort level is below a pre-determined threshold value (e.g., 5 on a scale of 1 to 10), and/or if the user selects "no," the mobile device may prompt the user to enter more information regarding why the user is uncomfortable with the given environmental condition. For example, if the user indicates that they have a low comfort level regarding the temperature of the environment, the mobile device may prompt the user to enter a preferred temperature.

After receiving the values from the sensor device, the mobile device may transmit the received values to the remote computing device. The mobile device may transmit associated information along with the received values. For example, the mobile device may transmit the location ID, an occupant ID associated with the user of the mobile device, and/or any survey information received from the user. The mobile device may wait for input from the user before transmitting the values and/or the associated information to the remote computing device. For example, if the mobile device presents a survey to the user, the mobile device may prompt the user to allow transmission of the values and/or the associated information (e.g., at the end of the survey).

The remote computing device and/or the system controller may receive the values and the associated information from the mobile device and/or the collection device. The remote computing device and/or the system controller may build a profile for the location and/or the user based on the values and the associated information. For example, for a given location and/or user, the remote computing device and/or the system controller may determine a value for each measured environmental condition that is likely to result in a maximized comfort level. The remote computing device and/or the system controller may aggregate information from multiple sensors to build a profile for a given user.

The remote computing device and/or the system controller may receive data from one or more sensor devices that comprises the one or more lighting conditions measured by the sensor device(s). The remote computing device and/or the system controller may analyze the one or more lighting conditions and determine that a ratio of one or more lighting conditions are outside of a predefined threshold. The remote computing device and/or the system controller may generate control instructions configured to adjust the one or more lighting conditions to bring the ratio of the lighting conditions within the predefined threshold and send the control instructions to one or more lighting control devices.

DETAILED DESCRIPTION

Figure 1A:
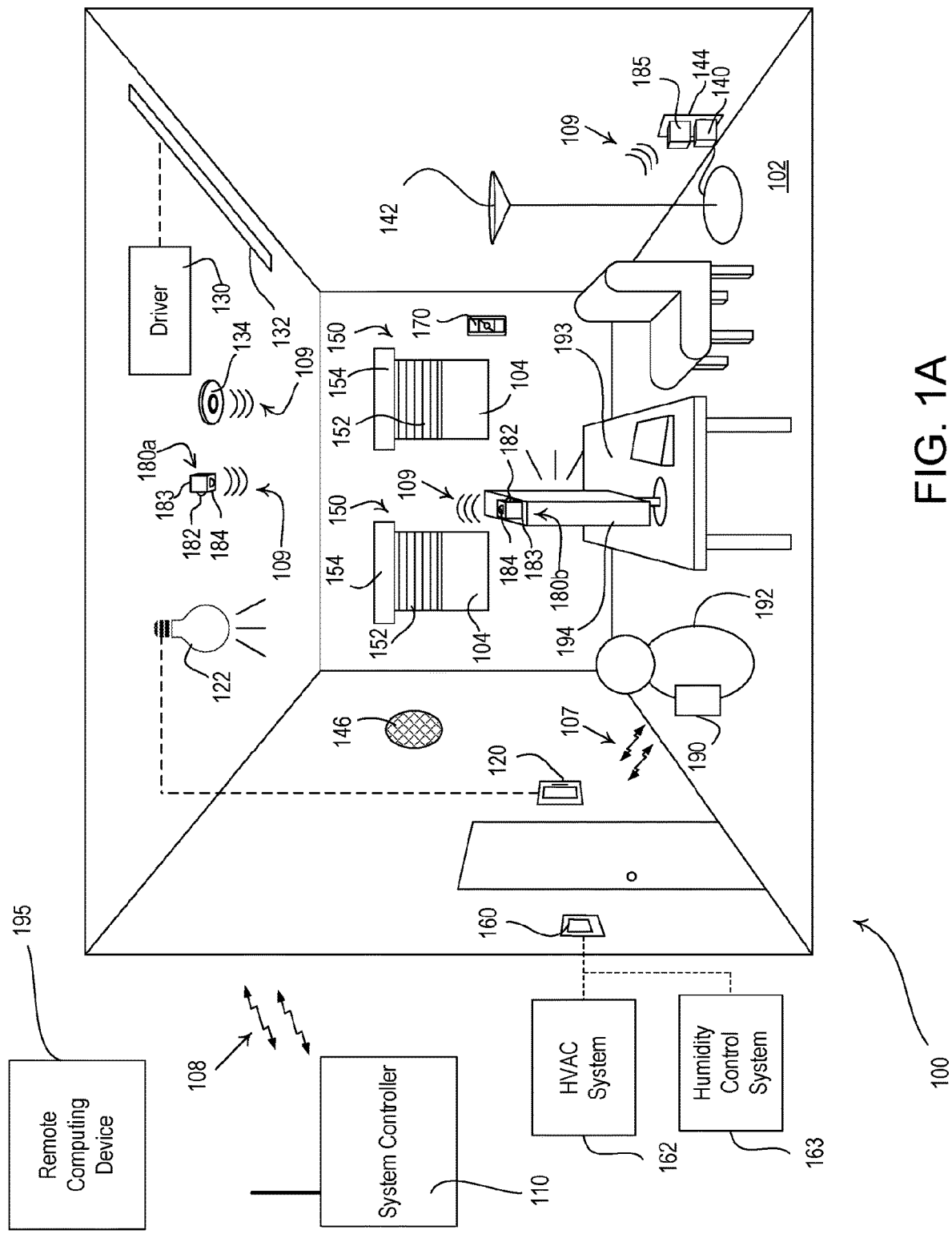
FIG. 1A is a diagram of an example load control system.

FIG. 1A is a diagram of an example load control system 100 for controlling the amount of power delivered from a power source, such as an alternating-current (AC) power source or direct current (DC) power source (not shown), to one or more electrical loads. The load control system 100 may be installed in one or more rooms or spaces, such as a room 102, of a building. The load control system 100 may comprise a plurality of control devices configured to communicate with each other via wireless signals, e.g., radio-frequency (RF) signals 108. Alternatively or additionally, the load control system 100 may comprise wired communication links (e.g., a digital communication link) coupled to one or more of the control devices to provide for communication between the load control devices. The control devices of the load control system 100 may comprise a number of input devices and/or a number of load control devices. The input devices may be operable to transmit messages in response to received input, such as user inputs, occupancy/vacancy conditions, changes in measured light intensity, and/or another form of input. The load control devices may be operable to receive messages and control respective electrical loads in response to the received messages.

The input devices may be configured to transmit messages directly to the load control devices. In addition, the load control system 100 may comprise one or more intermediary devices, such as a system controller 110 (e.g., a central processor or load controller), operable to communicate messages to and from the control devices (e.g., the input devices and/or the load control devices). The system controller 110 may operate as an input device and/or a load control device. The system controller 110 may be configured to receive messages from the input devices and transmit messages to the load control devices in response to the messages received from the input devices. The system controller 110 may be configured to operate as the input device from which messages may be generated for transmission to one or more load-control devices. For example, the system controller 110 may generate a message in response to a triggering event, such as a timeclock event, a received message from another input device, or another triggering event, and transmit the message to the load control devices. The input devices, the load control devices, and the system controller 110 may be configured to transmit and receive the RF signals 108 using a proprietary RF protocol, such as the CLEAR CONNECT protocol (e.g., CLEAR CONNECT TYPE A and/or CLEARCONNECT TYPE X protocols). Alternatively, the RF signals 108 may be transmitted using a different RF protocol, such as, a standard protocol, for example, one of WIFI, cellular (e.g., HSPA, LTE, 4G, 5G, etc.), ZIGBEE, Z-WAVE, BLUETOOTH, BLUETOOTH LOW ENERGY (BLE), THREAD, KNX-RF, ENOCEAN RADIO protocols, or a different proprietary protocol.

The load control system 100 may comprise one or more load control devices. The load control devices may include a dimmer switch 120 or another lighting control device (e.g., an electronic switch, a ballast, or a light-emitting diode (LED) driver) for controlling one or more lighting loads, such as a lighting load 122. The dimmer switch 120 may be adapted to be wall-mounted in a standard electrical wall box. The dimmer switch 120 may comprise a tabletop or plug-in load control device. The dimmer switch 120 may comprise a toggle actuator (e.g., a button) and an intensity adjustment actuator (e.g., a rocker switch). Actuations (e.g., successive actuations) of the toggle actuator may toggle (e.g., turn off and on) the lighting load 122. Actuations of an upper portion or a lower portion of the intensity adjustment actuator may respectively increase or decrease the amount of power delivered to the lighting load 122 and thus increase or decrease the intensity of the receptive lighting load from a minimum intensity (e.g., approximately 1%) to a maximum intensity (e.g., approximately 100%). The dimmer switch 120 may comprise a plurality of visual indicators, e.g., light-emitting diodes (LEDs), which may be arranged in a linear array and are illuminated to provide feedback of the intensity of the lighting load 122. The dimmer switch 120 may be configured to receive messages such as via the RF signals 108 (e.g., from the system controller 110) and to control the lighting load 122 in response to the received messages. Examples of dimmer switches are described in greater detail in commonly-assigned U.S. Pat. No. 9,679,696, issued Jun. 13, 2017, entitled WIRELESS LOAD CONTROL DEVICE, the entire disclosure of which is hereby incorporated by reference.

The load control system 100 may comprise one or more load control devices that are "remotely-located" such as load control devices like a light-emitting diode (LED) driver 130 for driving an LED light source 132 (e.g., an LED light engine). The LED driver 130 may be located remotely, for example, in or adjacent to the lighting fixture of the LED light source 132. The LED driver 130 may be configured to receive messages such as via the RF signals 108 (e.g., from the system controller 110) and to control the LED light source 132 in response to the received messages. The LED driver 130 may be configured to adjust the color of the LED light source 132 in response to the received messages. One or more color settings of the LED light source may be controlled. For example, the LED driver 130 may adjust one or more color values, such as a full-color value and/or a color temperature value. The load control system 100 may further comprise other types of remotely-located load control devices, such as, for example, electronic dimming ballasts for driving fluorescent lamps.

The load control devices in the load control system 100 may comprise a plug-in load control device 140 for controlling a plug-in electrical load, e.g., a plug-in lighting load (such as a floor lamp 142 or a table lamp) and/or an appliance (such as a television or a computer monitor). For example, the floor lamp 142 may be plugged into the plug-in load control device 140. The plug-in load control device 140 may be plugged into a standard electrical outlet 144 and thus may be coupled in series, for example, between an AC power source and the plug-in lighting load. The plug-in load control device 140 may be configured to receive messages such as via the RF signals 108 (e.g., from the system controller 110) and to turn on and off or adjust the intensity of the floor lamp 142 in response to the received messages.

Alternatively, or additionally, the load control devices in load control system 100 may comprise controllable receptacles for controlling plug-in electrical loads plugged into the receptacles. The load control system 100 may also comprise one or more load control devices or appliances that are able to directly receive messages from input devices, such as via the wireless signals 108, and/or indirectly from the system controller 110. In an example, the load control devices may include a speaker 146 (e.g., part of an audio/visual or intercom system), which is able to generate audible sounds, such as alarms, music, intercom functionality, etc. in response to messages from input devices.

The load devices in the load control system 100 may comprise one or more daylight load control devices. An example of a daylight load control device may include motorized window treatments 150, such as motorized cellular shades, for controlling the amount of daylight entering the room 102. Each motorized window treatment 150 may comprise a window treatment fabric 152 hanging from a headrail 154 in front of a respective window 104. Each motorized window treatment 150 may further comprise a motor drive unit (not shown) located inside of the headrail 154, for example, for raising and lowering the window treatment fabric 152 for controlling the amount of daylight entering the room 102. The motor drive units of the motorized window treatments 150 may be configured to receive messages such as via the RF signals 108 (e.g., from the system controller 110) and adjust the position of the respective window treatment fabric 152 in response to the received messages. For example, the motorized window treatments may be battery-powered and/or AC operated. The load control system 100 may comprise other types of daylight control devices, such as, for example, a drapery, a Roman shade, a Venetian blind, a Persian blind, a pleated blind, a tensioned roller shade system, an electrochromic or smart window, and/or other suitable daylight control device. Examples of battery-powered motorized window treatments are described in greater detail in U.S. Pat. No. 8,950,461, issued Feb. 10, 2015, entitled MOTORIZED WINDOW TREATMENT, and U.S. Pat. No. 9,488,000, issued Nov. 8, 2016, entitled INTEGRATED ACCESSIBLE BATTERY COMPARTMENT FOR MOTORIZED WINDOW TREATMENT, the entire disclosures of which are hereby incorporated by reference.

The load control devices in the load control system 100 may comprise one or more temperature load control devices, e.g., a thermostat 160 for controlling a room temperature in the room 102. The thermostat 160 may be coupled to a heating, ventilation, and air conditioning (HVAC) system 162 via a control link (e.g., an analog control link or a wired digital communication link). The thermostat 160 also may be configured to wirelessly communicate messages with a controller of the HVAC system 162. The thermostat 160 may comprise a temperature sensor for measuring the room temperature of the room 102 and may control the HVAC system 162 to adjust the temperature in the room to a setpoint temperature. The load control system 100 may comprise one or more wired or wireless temperature sensors located in the room 102 for measuring the room temperatures. The HVAC system 162 may be configured to turn a compressor on and off for cooling the room 102 and to turn a heating source on and off for heating the room in response to the control signals received from the thermostat 160 and/or other temperature sensors located in the room 102. The HVAC system 162 may be configured to turn a fan of the HVAC system on and off in response to the control signals received from the thermostat 160. The thermostat 160 and/or the HVAC system 162 may be configured to control one or more controllable dampers to control the air flow in the room 102. The thermostat 160 may be configured to receive messages via the RF signals 108 (e.g., from the system controller 110) and adjust heating, ventilation, and cooling in response to the received messages.

The thermostat 160 may comprise one or more humidity control devices, e.g., a humidistat for controlling the humidity in the room 102. The humidistat may be coupled to a humidity control system 163 via a control link (e.g., an analog control link or a wired digital communication link). The thermostat 160 also may be configured to wirelessly communicate messages with a controller of the humidity control system 163. The thermostat 160 may comprise a humidity sensor for measuring the humidity of the room 102 and may control the humidity control system 163 to adjust the humidity in the room to a setpoint humidity level (e.g., humidity percentage). The load control system 100 may comprise one or more wired or wireless humidity sensors located in the room 102 for measuring the room humidity. The humidity control system 163 may be configured to turn a humidifier or dehumidifier on and off for controlling the humidity in the room 102 in response to the control signals received from the humidistat in the thermostat 160 and/or other humidity sensors located in the room 102. The humidity control system 163 may be configured to turn a humidifier or dehumidifier on and off in response to the control signals received from the humidistat in the thermostat 160, for example. The humidistat in the thermostat 160 may be configured to receive messages via the RF signals 108 (e.g., from the system controller 110) and adjust the humidity in the room 102 in response to the received messages. Though the humidistat is described as being included in the thermostat 160, the humidistat may be a separate device than the thermostat 160 and may be separately coupled to the humidity control system 163 (e.g., via a separate control link) for enabling control as described herein.

The load control system 100 may comprise one or more other types of load control devices that are configured to receive messages as described herein and control respective loads, such as, for example, a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off; a motor control unit for controlling a motor load, such as a ceiling fan or an exhaust fan; a drive unit for controlling a projection screen; motorized interior or exterior shutters; an air conditioner; a compressor; an electric baseboard heater controller; a controllable damper; a variable air volume controller; a fresh air intake controller; a ventilation controller; hydraulic valves for use radiators and radiant heating system; a water heater; a boiler controller; a pool pump; a refrigerator; a freezer; a television or computer monitor; a video camera; an audio system or amplifier; an elevator; a power supply; a generator; an electric charger, such as an electric vehicle charger; an alternative energy controller; and/or another type of load control device.

The load control system 100 may comprise one or more input devices. For example, the input devices may comprise a remote control device 170 and/or an occupancy sensor 134. The input devices may be fixed or movable devices. The system controller 110 may be configured to receive messages from the input devices and transmit one or more messages to the load control devices (e.g., the dimmer switch 120, the LED driver 130, the plug-in load control device 140, the motorized window treatments 150, and/or the thermostat 160) in response to the messages received from the input devices. The input devices may be configured to transmit messages directly to the load control devices (e.g., the dimmer switch 120, the LED driver 130, the plug-in load control device 140, the motorized window treatments 150, and the temperature control device 160) or via one or more intermediary devices (e.g., the system controller 110 or one or more other control devices in the system). The messages transmitted by the input devices may include control information (e.g., commands) for controlling the load control devices and/or the electrical loads controlled by the load control devices.

The occupancy sensor 134 may be an input device configured to detect a triggering event, such as occupancy and/or vacancy conditions in the space in which the load control system 100 is installed. The occupancy sensor 134 may transmit messages via the RF communication signals 108 in response to detecting the triggering event (e.g., occupancy or vacancy conditions). The occupancy sensor 134 may communicate via a wired communication. The occupancy sensor 134 may communicate messages to load control devices directly, or via an intermediary device. For example, the system controller 110 may be configured to receive messages from the occupancy sensor 134 and transmit messages to one or more load control devices (e.g., lighting control devices that are configured to turn the lighting loads of one or more lighting control devices on and off) in response to receiving an occupied signal and a vacant signal, respectively. The load control devices may include, for example, the lighting load 122, the LED light source 132, the motorized window treatments 150, and/or the thermostat 160. The occupancy sensor 134 may operate as a vacancy sensor, such that the lighting loads may be manually turned on by a user and/or automatically turned off in response to detecting a vacancy signal from the sensor (e.g., the lighting load is not turned on in response to detecting an occupancy condition). Examples of load control systems having occupancy and vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The remote control device 170 may be configured to transmit messages, such as via the RF signals 108. The messages may be transmitted directly to one or more load control devices, or indirectly via the system controller 110 in response to an actuation of one or more buttons, for example, of the remote control device 170. The remote control device 170 may be battery-powered. The messages transmitted by the remote control device 170 may include control information for controlling the load control devices and/or the electrical loads controlled by the load control devices. For example, the control information may comprise a command (e.g., an on command, an off command, a move-to-level command, a present command, etc.) and/or an indication of the button of the remote control device 170 that was actuated.

The load control system 100 may also comprise one or more sensor devices 180a and 180b. A sensor device (e.g., the sensor devices 180a, 180b) may be used to measure one or more environmental conditions in a location. For example, the location may be a location in which an occupant 192 is located or likely to be located for periods of time, such as a workstation 193 of the occupant 192. The sensor devices 180a, 180b may be input devices configured to communicate via the RF signals 108 with the system controller 110 and/or other devices in the load control system 100. Alternatively or additionally, the sensor devices 180a, 180b may be configured to communicate via the RF signals 109. Though two sensor devices 180a, 180b may be illustrated and described herein, any number of sensor devices may be implemented in the load control system 100. For example, there may be one or more visible light sensors having light pipes from each side of the sensor devices 180a, 180b. Each side of the sensor devices 180a, 180b may include the same or a different number of light pipes than another side of the sensor devices 180a, 180b. One or more sides of the sensor devices 180a, 180b may not have a light pipe for sensing light in that direction.

The RF signals 108 and the RF signals 109 may be transmitted on the same wireless communication link or different wireless communication links in the load control system 100. For example, the RF signals 109 may be transmitted using another signal type, protocol, channel, and/or network than the RF signals 108. In one example, the RF signals 108 may use a proprietary protocol or a standard communication protocol (e.g., THREAD, WI-FI, etc.). The RF signals 109 may be communicated via as beacon signals comprising beacon messages or another short-range RF communication. The RF signals 109 may comprise beacon signals that are communicated using the BLUETOOTH communication protocol, the BLUETOOTH low energy (BLE) communication protocol, NFC protocol, or another short-range RF communication protocol. A beacon signal may be transmitted as a broadcast signal comprising a beacon message capable of being received by other devices in the load control system 100. Though the RF signals 109 are described as RF beacon signals comprising beacon messages, the beacon messages may be transmitted (e.g., by the sensor devices 180a, 180b) via optical signals (e.g., a visible light signal), audio signals, or other type of signal. The beacon messages may be received by another device, such as mobile device 190, that is in close proximity to the sensor devices 180a, 180b. The mobile device 190 may be, for example, a mobile device (e.g., a cell phone, tablet, PC, wearable wireless device, and/or the like) that may be associated with the occupant 192. The mobile device 190 may be referred to as a "mobile device" herein. If the beacon messages are transmitted via other signals, such as optical signals, audio signals, or other types of signals, the sensor devices 180a, 180b may have two distinct interfaces configured to communicate via different mediums (e.g., RF and optical, RF and audio, or other communication mediums). If the beacon messages are transmitted via the RF signals 109, the sensor devices 180a, 180b may comprise one or more interfaces configured to communicate on different communication channels, protocols, and/or networks. As described herein, the sensor devices 180a, 180b may transmit the measured values for environmental conditions via the RF signals 109 (although it may also transmit such measurements via signals 108). The sensor devices 180a, 180b may transmit the measured values in response to one or more triggering events, such as the performance of the measurements, a change in the value of the measurements exceeding a threshold, an expiration of a period of time, in response to a triggering message received from another device, or another triggering event as described herein.

The sensor devices 180a, 180b may include one or more different types of sensors, each of which may be used to measure one or more environmental conditions in a location, such as room 102, in which it is located. Example environmental conditions may include the temperature, humidity, lighting conditions (e.g., color conditions, such as full-color values and/or color temperature values, lighting intensity values, and/or other lighting conditions), or other environmental conditions in the location. As such, the sensor devices 180a, 180b may include one or more temperature sensors, one or more humidity sensors, one or more visible light sensors, and/or other sensor types configured to measure environmental conditions. In an example, the temperature sensors, humidity sensors, visible light sensors, and/or other sensors may measure one or more given environmental conditions and transmit one or more value(s) to a control circuit of the sensor device, which may process the value(s) before transmitting to another device. The sensor devices 180a, 180b may generate control instructions for controlling one or more electrical loads based on the value(s), and may transmit the control instructions to the other device. Alternatively, the other device may generate the control instructions (e.g., upon receipt of the measured value(s)).

The temperature sensor (e.g., thermometer) in the sensor devices 180a, 180b may be used to measure a temperature of the location in which the sensor devices 180a, 180b are located. For example, the temperature sensor may be used to measure the temperature in the location in which the occupant 192 may reside, such as at the workstation 193. The temperature may be measured periodically. The temperature measurements may be transmitted in messages to the system controller 110 and/or other devices in the load control system 100 to adjust the temperature of the room 102 to achieve a comfort level of the occupant 192. For example, the measured temperature, or control instructions for adjusting the temperature in response to a measurement, may be transmitted to the system controller 110, directly to the thermostat 160, or to another device in the load control system 100 for controlling the temperature in the room 102. The temperature may be adjusted by sending a message to the thermostat 160 to control the setpoint temperature of the thermostat 160 to heat or cool the room 102.

The humidity sensor in the sensor devices 180a, 180b may be used to measure a humidity of the location in which the sensor devices 180a, 180b are located. For example, the humidity sensor may be used to measure the humidity in the location of the occupant 192, the likely location of the occupant 192 (e.g., workstation 193), or another location at which measurements may be performed to attempt to improve the comfort of the occupant. The humidity may be measured periodically. The measured humidity may be used to adjust the humidity of the room to achieve a comfort level of the occupant 192. For example, the measured humidity, or control instructions for adjusting the humidity in response to a measurement, may be transmitted to the system controller 110, directly to the thermostat 160 or humidistat for controlling the humidity control system 163, or another device in the load control system 100 for controlling the humidity in the room 102.

The visible light sensors in the sensor devices 180a, 180b may be used to measure the lighting conditions (e.g., color conditions, such as full-color values and/or color temperature values, lighting intensity values, and/or other lighting conditions) in the location of the sensor devices 180a, 180b. As shown in FIG. 1A, the sensor devices 180a, 180b may include one or more visible light sensors or other sensors configured to measure lighting conditions in the location. For example, the sensor devices 180a, 180b may include a first visible light sensor 182 and a second visible light sensor 184. For example, the visible light sensors 182, 184 may each be cameras or another device capable of detecting and/or sensing visible light. Each of the visible light sensors 182, 184 may receive light from different directions, such that they measure the lighting conditions (e.g., color conditions, such as full-color values and/or color temperature values, lighting intensity values, and/or other lighting conditions) of the light in different directions. In one example, the visible light sensors 182, 184 may each be mounted to a printed circuit board (PCB) and receive light from respective light pipes that are pointed in different directions, such as a first direction and a second direction perpendicular to the first direction. The sensor devices 180*a*, 180*b* may transmit the measured values for the lighting conditions via RF signals 109 and/or via signals 108.

The sensor devices 180*a*, 180*b* may comprise a base surface 183 that is parallel to a surface on which the sensor devices 180*a*, 180*b* are mounted, such as the workspace 193, a ceiling, a wall, the floor, or another surface. The light pipe of the first visible light sensor 182 may receive light from a side of the sensor devices 180*a*, 180*b* that is perpendicular to the base surface 183. The second visible light sensor 184 may receive light from another side of the sensor devices 180*a*, 180*b* that is parallel to the base surface 183 and perpendicular to the side from which the first visible light sensor 182 receives light. As such, the first visible light sensor 182 and the second visible light sensor 184 may measure light on orthogonal planes of the sensor devices 180*a*, 180*b*.

When the base surface 183 of the sensor devices 180*a*, 180*b* are mounted to a horizontal surface in the room 102, such as the floor, ceiling, or other surface that is parallel to the floor or ceiling (e.g., workstation 193) of the room 102, the light pipe of the first visible light sensor 182 may face objects on a vertical plane (e.g., walls, human faces, and/or other objects on a vertical plane) such that the first visible light sensor 182 may take measurements of the lighting conditions of the light that falls on and is reflected from those objects on the vertical plane. Similarly, in this orientation, the first visible light sensor 182 may take light measurements of light emitted from lighting control devices on the vertical plane, light reflected off of surfaces on the vertical plane, or of light entering through a window, etc. When the base surface 183 of the sensor devices 180*a*, 180*b* are mounted to a horizontal surface, the light pipe of the second visible light sensor 184 may face objects on a horizontal plane (e.g., the ceiling, desk, floor, and/or other objects on a horizontal plane) such that the second visible light sensor 184 may take measurements of the lighting conditions of the light that falls on and is reflected from those objects on the horizontal plane, such as the ceiling. Similarly, in this orientation, the second visible light sensor 184 may take light measurements of light emitted from lighting control devices on the horizontal plane, etc. The measured lighting conditions on the vertical plane may include the lighting conditions of the light that the occupant 192 sees (e.g., the light intensity and/or color conditions of the light perceived by the occupant 192 in the occupant 192's location). The measured lighting conditions on the horizontal plane may include the lighting conditions of the light emitted from lighting control devices in the occupant 192's location. Though two visible light sensors 182, 184 are described for measuring lighting conditions in different directions, more or less visible light sensors may be mounted on the sensor devices 180*a*, 180*b* and/or receive light in one or more other directions.

The visible light sensors 182, 184 may each measure the lighting conditions (e.g., color conditions, such as full-color values and/or color temperature values, lighting intensity values, and/or other lighting conditions) of the light received from respective light pipes using spectral measurements to determine the composition of the light being received. The visible light sensors 182, 184 may measure light in the visible light spectrum (e.g., about 380 nm to about 780 nm). The visible light sensors 182, 184 may measure color temperature by measuring the amount of light in one or more different wavelength bands (e.g., RGB) and using the color of the light measured for each wavelength to approximate a color temperature. The visible light sensors 182, 184 may measure the amount of light in a clear channel (e.g., a broad spectrum), which may include infrared (IR) light or other light that is outside of the RGB spectrum or the visible light spectrum, or that includes light that overlaps with the RGB spectrum or the visible light spectrum. The visible light sensors 182, 184 may use the measurements received on the clear channel to detect light that may be affecting the RGB values that are measured and correct the RGB measurements, as further described elsewhere herein. For example, the visible light sensors 182, 184 (e.g., and/or a control circuit receiving measurements from visible light sensors 182, 184) may calculate an amount of IR light received based on the amount of light received in the RGB spectrum and in the clear channel. The visible light sensors 182, 184 (e.g., and/or the control circuit receiving measurements from visible light sensors 182, 184) may then subtract the calculated IR light received on the clear channel from each of the measured wavelength bands (e.g., each of the RGB channels) to produce corrected measurements for each of the RGB channels.

The visible light sensors 182, 184 may measure lighting intensity by measuring an excitation of the light in the one or more different wavelength bands and using the excitation of the light sensed for each wavelength to approximate a lighting intensity. The light that is received in the center of the opening of each light pipe may be weighted more heavily by the visible light sensors 182, 184 or another computing device in the system than the light that is received toward the edges of the opening of the light pipe (e.g., using a cosine weighting function) in order to more accurately measure the light in the direction that the light pipe is facing. In an example, pixels within a predefined location near the center of an image may be weighted more heavily than pixels outside of the predefined location or at the perimeter of the image. The pixels may be weighted on a gradient, such that the pixels outside of the predefined location near the center of the image are given less weight as the pixels reach the perimeter of the image. Each pixel in the image may have a unique location in the image (e.g., x-y identifier) and a weight may be associated with the unique location. The intensity of light received at a given measurement plane may be proportional to the cosine of the angle at which the light is incident. Therefore, the visible light sensors 182, 184 may determine a normalized value for the intensity of the light based on the cosine weighting function. An example visible light sensor may include the TCS3472 Color Light-To Digital Converter with IR Filter described by The LUMENOLOGY Company in the following reference: The LUMENOLOGY Company, TCS3472 Color Light-To Digital Converter with IR Filter, TAOS135, published August 2012, https://cdn-shop.adafruit.com/datasheets/TCS34725.pdf.

The sensor devices 180*a*, 180*b* may be positioned to obtain more precise measurements in the location of the occupant 192. More precise measurements may assist in controlling devices to improve the comfort level of the occupant 192. The sensor devices 180*a*, 180*b* may be positioned in a location proximate the occupant 192 to measure environmental conditions in the location of the occupant 192, the likely location of the occupant 192 (e.g., workspace/desk 193), or another location at which measurements may be performed to attempt to improve the comfort of the occupant. In an example as shown in FIG. 1A, the sensor devices 180*a*, 180*b* may be positioned on a monitor 194 on the occupant 192's workspace 193. The sensor devices 180*a*, 180*b* being positioned on the monitor 194 or the workspace 193 may allow the light pipe of the first visible light sensor 182 to face the occupant and thus allow the first visible light sensor 182 to measure light on the vertical plane (e.g., reflected off of vertical surfaces, falling on the face and eyes of the occupant, etc.) that is in the occupant 192's viewing area. The quality of light observed by the occupant 192 may be affected by the light emitted by the monitor 194 for periods of time. The sensor devices 180*a*, 180*b* being positioned on the monitor 194 or the workspace 193 may allow the light pipe of the second visible light sensor 184 to face the ceiling and thus allow the second visible light sensor 184 to measure light on a horizontal plane that is being emitted from one or more lighting loads (e.g., lighting load 122, LED light source 132, and/or another lighting load) and/or falling on and thus reflected from a horizontal plane in the occupant 192's viewing area, which may affect the quality of light being observed by the occupant 192. In an example, the measurements from the first visible light sensor 182 and the second visible light sensor 184 may be used to understand the proportion of light that the occupant 192 prefers at their viewing area. For example, if the occupant 192 indicates a low comfort level at a first time and a high comfort level at a second time, and the horizontal (e.g., work surface) value was the same in each, then the low comfort level may be caused by a difference in the vertical value (e.g., or the ratio of the two). The vertical value may be correlated to the daylight aperture, and closing shades partially may help balance the space for the occupant 192.

The sensor devices 180*a*, 180*b* may be affixed in other locations. For example, as shown in FIG. 1A, the sensor device 180*a* may be mounted to the ceiling (as shown) or a wall. In the example of FIG. 1A, the base surface 183 of the sensor device 180*a* may be mounted to the ceiling and the sensor device 180*a* may use the light received from the light pipe of the second visible light sensor 184 to measure light emitted by one or more lighting loads (e.g., lighting load 122, LED light source 132, and/or another lighting load such as on the workstation 193), such as lighting loads on a horizontal surface in the space (e.g., the location of the occupant 192, the likely location of the occupant 192, such as the workstation 193, or another location) and/or to measure light reflected from horizontal surfaces in the space, such as the workstation 193. The sensor devices 180*a*, 180*b* may be located proximate (e.g., next to, near, or within a direct view) a lighting load (e.g., lighting load 122, LED light source 132, and/or another lighting load) to measure the light emitted by the lighting load. The sensor devices 180*a*, 180*b* may be affixed to the ceiling (as shown) or a wall such that the light pipe of the second visible light sensor 184 is facing the workstation 193 for measuring the lighting conditions of the light falling on the workstation 193.

The sensor devices 180*a*, 180*b* may be fixed or moveable. For example, the base surface 183 of the sensor devices 180*a*, 180*b* may include an attachment mechanism (not shown) that may attach the sensor to, for example, a wall, ceiling, desk, computer, and/or another surface. For example, the base surface 183 of the sensor devices 180*a*, 180*b* may include a suction cup or gripping mechanism that may be used to releasably attach the sensor devices 180*a*, 180*b* to and detach the sensor devices 180*a*, 180*b* from a surface. Alternatively, a holder for the sensor devices 180*a*, 180*b* may be installed on a surface, and the base surface 183 of the sensor devices 180*a*, 180*b* may be placed in/removed from the holder. In another example, the base surface 183 of the sensor devices 180*a*, 180*b* may be placed directly on the surface. Being able to move the sensor devices 180*a*, 180*b* may allow the sensor to measure specific environmental conditions at different points within the location, which may allow the sensor devices 180*a*, 180*b* to determine different values within the location. Placing the sensor devices 180*a*, 180*b* relatively close to the occupant 192 (e.g., on the occupant 192's desk/workstation 193, monitor 194, computer, chair, etc.) may allow the sensor devices 180*a*, 180*b* to determine more accurate measurements for the temperature and/or humidity of the occupant 192's specific position in the location 102. Placing the sensor devices 180*a*, 180*b* relatively far from the occupant 192 (e.g., on the ceiling, the wall, a window, etc.) may allow the sensor devices 180*a*, 180*b* to get a full view of the occupant 192's workspace, which may result in more accurate measurements for the light intensity and/or color conditions of the location 102 as a whole.

The sensor devices 180*a*, 180*b* may measure each environmental condition in a predefined order and/or after a predefined period of time. For example, the sensor devices 180*a*, 180*b* may measure a first condition, then a second condition, and so on. Each environmental condition may be measured for a period of time before the sensor device measures another environmental condition. The sensor devices 180*a*, 180*b* may activate a given sensor for a period of time, or at predefined periods of time. The sensor devices 180*a*, 180*b* may be activated to cause the sensor devices 180*a*, 180*b* to take a measurement. The sensor devices 180*a*, 180*b* may be sequentially activated to turn on or exit a sleep state and take a measurement and/or transmit data before being deactivated to turn off or enter the sleep state. For example, the sensor devices 180*a*, 180*b* may activate a first sensor type for a period of time before engaging a second sensor type. The period of time that each sensor type may be activated for performing measurements and/or between measurements may correspond to the sensor type. For example, the sensor devices 180*a*, 180*b* may activate the temperature sensor and/or humidity sensor to perform measurements for a period of time and await a longer period of time between measurements than the sensor device activates the visible light sensors to measure the lighting conditions, as the temperature and humidity of the area may change relatively slowly compared to the lighting conditions. In an example, the sensor devices 180*a*, 180*b* may activate for a period of time (e.g., 500 milliseconds (ms)) to take the temperature and/or humidity measurement before deactivating for a period of time. The sensor devices 180*a*, 180*b* may then activate for another period of time (e.g., same period or different period than used to take temperature and/or humidity measurements) to take measurements of the next environmental condition. The sensor devices 180*a*, 180*b* awaiting longer periods of time between each activation of certain sensor types may conserve power at the sensor devices 180*a*, 180*b*. The periods of time between measurements may be increased to preserve batter life at the sensor devices. The periods of time between measurements may be decreased to increase the resolution or accuracy of the environmental conditions over time.

As the sensor devices 180*a*, 180*b* may be a battery powered device, the sensor devices 180*a*, 180*b* may perform communications in the load control system 100 in a manner that conserves power at the sensor devices 180*a*, 180*b*. For example, the sensor devices 180*a*, 180*b* may be a one-way communication devices that merely transmits messages, such as the RF signals 109. The sensor devices 180*a*, 180*b* may save power by not being configured to receive messages via RF signals 109. However, the sensor devices 180a, 180b may also be configured to receive messages via RF signals from the mobile device 190 and/or other devices in the load control system.

The sensor devices 180a, 180b may conserve battery power during operation based on the timing configuration for performing measurements and/or transmitting the measured values of the environmental conditions. For example, the sensor devices 180a, 180b may transmit the beacon messages in the RF signals 109 after expiration of a transmission period having a predefined period of time (e.g., once each second). For example, the sensor devices 180a, 180b may transmit measured values as beacon messages in the RF signals 109. The sensor devices 180a, 180b may transmit the beacon messages at a relatively low rate to conserve battery power. For example, the amount of time between transmissions of the beacon messages may be determined based on whether the sensor devices 180a, 180b are attempting to conserve battery power. If the sensor devices 180a, 180b are attempting to conserve battery power, the amount of time between transmissions may be longer than if the sensor devices 180a, 180b are not attempting to conserve battery power. For example, the sensor devices 180a, 180b may transmit beacon messages once each second when not operating in a power-saving mode, and may transmit beacon messages once each fifteen to thirty seconds when operating in a power-saving mode. The sensor devices 180a, 180b may transmit beacon messages in the RF signals 109 according to a transmission period indicated in a standard protocol or over other intervals of time, as configured.

The sensor devices 180a, 180b may perform one or more measurements after expiration of a measurement period. The transmission period may expire multiple times before each expiration of the measurement period, such that the sensor devices 180a, 180b may report the same measured values for one or more environmental conditions in the beacon messages in the RF signals 109 multiple times for each measurement or group of measurements that is performed to conserve battery power that may be consumed during operation for performing measurements. For example, the sensor devices 180a, 180b may transmit a beacon in the RF signals 109 once each second and perform an updated measurement for each of the environmental conditions once each minute. This may allow time for the sensor devices 180a, 180b to detect changes in environmental conditions, while preventing the sensor devices 180a, 180b from performing measurements at a frequency that unduly consumes power. Hence, the sensor devices 180a, 180b may be configured such that each sensor type has a measurement period which indicates the frequency at which a measurement(s) of that type is taken. At each measurement period for a respective sensor type, the sensor may take one or more measurements of the sensor type. The sensor devices 180a, 180b may further have a transmission period at which the sensor devices 180a, 180b may transmit beacon messages in the RF signals 109 to communicate the most recent measured value(s) for each of the respective sensor types.

As another example, the sensor devices 180a, 180b may log the measurements of the environmental conditions and store the measurements for gathering information about the location. For example, the sensor devices 180a, 180b may log the measurements of one or more environmental conditions over a period of time without transmitting the measurements. A triggering event at the sensor devices 180a, 180b may cause the sensor devices 180a, 180b to transmit the measurements stored over the period of time (or a portion of the measurements, a calculated value based on the measurements, such as an average, etc.), to the mobile device 190 or some other device within the load control system 100. For example, the triggering event may be an actuation of a button at the sensor devices 180a, 180b or a message received from the mobile device 190 or another device in the system 100. The sensor devices 180a, 180b may receive the triggering event and transmit the stored measurements via the RF signals 109. In response to the triggering event, the sensor devices 180a, 180b may transmit the stored measurements one or more times. For example, in response to the triggering event, the sensor devices 180a, 180b may begin transmitting the measurements via beacon signals over periodic intervals. In another example, the sensor devices 180a, 180b may establish a dedicated connection via the RF signals 109 by exchanging credentials with the mobile device 190 another device in the system 100 via the RF signals 109 to allow the device to receive the information via the dedicated connection. The sensor devices 180a, 180b may store the measurements over time, but may have a limited amount of memory for local storage of information. If the sensor devices 180a, 180b reaches a threshold amount of memory that has been occupied by the measurements, the sensor devices 180a, 180b may overwrite the oldest measurements with the newest measurements, or stop collecting data altogether. Though the sensor devices 180a, 180b are described as logging the measurements of the environmental conditions and transmitting the measurements in response to a triggering event, the sensor devices 180a, 180b may similarly log the measurements of the environmental conditions locally while transmitting a beacon signal that includes the measurements at the transmission period as described above. For example, the beacon signal transmitted at the transmission period may include the most recent measurement for one or more environmental conditions, while the sensor devices 180a, 180b log older measurements until a triggering event is received, at which time the sensor device transmits the logged measurements, or a portion there of.

Though the sensor devices 180a, 180b are described as transmitting the measurements of the environmental conditions via the RF signals 109, the sensor devices may transmit the measurements of the environmental conditions and/or other information described herein via a wired communication link. For example, the sensor devices 180a, 180b may include a Universal Serial Bus (USB) port or another port capable of connecting another device, such as the mobile device 190, to the sensor devices 180a, 180b via a wired communication link. The sensor devices 180a, 180b connecting to the mobile device 190 via the wired communication link may operate as a triggering event at the sensor devices 180a, 180b to transmit the information including the measurements of the environmental conditions to the mobile device 190 via the communication link. In another example, the USB port of the sensor devices 180a, 180b may be connected to the mobile device 190 and/or another device (e.g., the remote computing device 195) and the device receive another triggering event (e.g., actuation of a button at the sensor device, a message from another device, etc.) to communicate the measurements via the RF signals 109.

The measured lighting conditions may be used to adjust the lighting conditions (e.g., color conditions, such as full-color values and/or color temperature values, lighting intensity values, and/or other lighting conditions) of one or more lighting loads (e.g., lighting load 122, LED light source 132, floor lamp 142, and/or another lighting load) in the area of the sensor(s) to achieve a comfort level of the occupant 192.

For example, the sensor devices 180a, 180b may transmit the measured lighting conditions (e.g., color conditions, such as full-color values and/or color temperature values, lighting intensity values, and/or other lighting conditions) to the system controller 110 and/or the remote computing device 195, or directly to a lighting control devices (e.g., dimmer switch 120, LED driver 130, plug-in device 140, an electronic switch, a ballast, or another device configured to control a lighting load) in the load control system 100, and the system controller 110, the remote computing device 195, and/or the lighting control device may generate control instructions based on the measured lighting conditions for controlling lighting loads in the room 102.

A ratio of the lighting conditions (e.g., color conditions, such as full-color values and/or color temperature values, lighting intensity values, and/or other lighting conditions) measured by each of the visible light sensors 182, 184 may be monitored to control the light emitted from the lighting loads to maintain a predefined ratio of the light measured in different directions. The ratio of lighting conditions may refer to the ratio of light measured in different directions. For example, the ratio may refer to the light measured on the vertical plane to the light measured on the horizontal plane for one or more lighting conditions. The one or more computing devices (e.g., system controller 110, remote computing device 195, and/or mobile device 190) may monitor the ratio of the lighting conditions for sending control instructions to one or more lighting control devices to adjust the ratio. For example, the one or more computing devices (e.g., system controller 110, remote computing device 195, and/or mobile device 190) may monitor a lighting intensity and/or color temperature of the measured light on the vertical plane to the lighting intensity and/or color temperature of the measured light on the horizontal plane and determine that the ratio exceeds a threshold. When the ratio exceeds a threshold, the one or more computing devices (e.g., system controller 110, remote computing device 195, and/or mobile device 190) may determine that the value of the lighting condition(s) on the horizontal plane or vertical plane is relatively high or that the value of the lighting condition(s) on the horizontal plane or vertical plane is relatively low or outside of a predefined threshold. The one or more computing devices (e.g., system controller 110, remote computing device 195, and/or mobile device 190) may generate control instructions to control one or more lighting control devices to adjust the ratio to bring the ratio of the monitored lighting conditions within the threshold. For example, the control instructions may instruct one or more lighting control devices (e.g., dimmer switch 120, LED driver 130, etc.) to increase or decrease a lighting intensity value and/or a color temperature value. In another example, the one or more computing devices (e.g., system controller 110, remote computing device 195, and/or mobile device 190) may know the intensity and/or color temperature value of the light being received through a window and may send control instructions to the motorized window treatments 154 to open or close the covering material 152 to adjust the ratio. The control instructions may be sent to identified load control devices in a particular location or portion of the room 102 to adjust the ratio. For example, the control instructions may be sent to an identified portion of the room where the measurements differ by a threshold amount. The measurements in a first portion (e.g., zone, area, etc.) of the room 102 may be affected by the light in a second portion (e.g., zone, area, etc.) of the room 102 and the control instructions may be sent to the lighting control devices in the second portion of the room 102 to create more uniform lighting conditions in the first portion of the room 102 and/or the second portion of the room 102.

The sensor devices 180a, 180b may transmit a location identifier in the beacon messages transmitted in the RF signals 109. The location identifier may be used to associate the location with the environmental conditions measured by the sensor devices 180a, 180b within the location. As an example, the system controller 110 and/or the mobile device 190 may have a table stored in a memory thereon that associates the location identifier with the location, the location identifier itself may include enough information to identify the location (e.g., GPS coordinates), and/or the like. The location identifier may indicate a relative location of the sensor devices 180a, 180b. For example, the location identifier may indicate a room, such as the room 102, a location within a room (e.g., the workspace 193, a cubicle, or another location within a room), a location of a device in a room (e.g., the monitor 194 or another device on which the sensor devices 180a, 180b are mounted or with which the sensor devices 180a, 180b are otherwise associated), or another type of location. There may be multiple sensor devices that have the same location identifier. There may be multiple sensor devices that have different location identifiers. If a sensor devices 180a, 180b are moved to a different location, the sensor device's location identifier may be updated or may stay the same.

The load control system 100 may comprise other types of input devices, such as, for example, temperature sensors, humidity sensors, radiometers, cloudy-day sensors, shadow sensors, pressure sensors, smoke detectors, carbon monoxide detectors, air-quality sensors, motion sensors, security sensors, proximity sensors, fixture sensors, partition sensors, keypads, multi-zone control units, slider control units, kinetic or solar-powered remote controls, key fobs, cell phones, smart phones, tablets, personal digital assistants, personal computers, laptops, timeclocks, audio-visual controls, safety devices, power monitoring devices (e.g., such as power meters, energy meters, utility submeters, utility rate meters, etc.), central control transmitters, residential, commercial, or industrial controllers, and/or any combination thereof.

The computing devices (e.g., mobile device 190, system controller 110 and/or the remote computing device) may be coupled to a network, such as a wireless or wired local area network (LAN), e.g., for access to the Internet. The computing devices (e.g., mobile device 190, system controller 110 and/or the remote computing device) may be wirelessly connected to the network, e.g., using WI-FI technology. The system controller 110 and/or the remote computing device 195 may be coupled to the network via a network communication bus (e.g., an Ethernet communication link). The system controller 110 and/or the remote computing device 195 may be configured to communicate via the network with one or more mobile devices, e.g., a mobile device 190, such as, a personal computing device and/or a wearable wireless device. The mobile device 190 may be located on an occupant 192, for example, may be attached to the occupant's body or clothing or may be held by the occupant. The mobile device 190 may be characterized by a unique identifier (e.g., a serial number or address stored in memory) that uniquely identifies the mobile device 190 and thus the occupant 192. Examples of personal computing devices may include a smart phone, a laptop, and/or a tablet device (for example, a hand-held computing device). Examples of wearable wireless devices may include an activity tracking device, a smart watch, smart clothing, and/or smart glasses. The system controller 110 and/or the remote computing device 195 may communicate with the mobile device 190 for displaying information to the occupant 192. The system controller 110 and/or the remote computing device 195 may be configured to communicate via a wired or wireless communication link with the monitor 194 for displaying information to the occupant 192. For example, the system controller 110 and/or the remote computing device 195 may be configured to communicate via the network or via a local wired communication link with the monitor 194 for displaying information to the occupant 192. In addition, the system controller 110 and/or the remote computing device 195 may be configured to communicate via the network with one or more other control systems (e.g., a building management system, a security system, etc.).

The mobile device 190 may be configured to transmit messages to the system controller 110, for example, in one or more RF signals 107 and/or via the RF signals 109. The mobile device 190 may be one example of a device that may communicate with the sensor devices 180a, 180b. Another example may be the monitor 193 or another device capable of wired and/or wireless communications. To the extent that one or more devices in the load control system 100 interact with the mobile device 190, the one or more devices may similarly interact with the monitor 193 and/or other computing devices and/or provide information to the user via such computing devices, as described herein.

The RF signals 107 may be the same signal type and/or transmitted using the same protocol as the RF signals 108. Alternatively, or additionally, the RF signals 107 may be transmitted using another signal type and/or protocol than the RF signals 108. For example, the mobile device 190 may be configured to communicate messages with the system controller 110 and/or a remote computing device 195 (e.g., a server) in Internet Protocol packets transmitted in WIFI or cellular communications in RF signals 107, while the RF signals 108 may be used for the control devices to communicate with the system controller 110 via another protocol, such as a proprietary protocol. For example, the remote computing device 195 may comprise a memory with computer-executable or machine-executable instructions stored thereon that allow the remote computing device to operate as described herein. The load control system 100 may comprise other types of mobile devices coupled to the network, such as a desktop personal computer, a wireless-communication-capable television, or any other suitable Internet-Protocol-enabled device. Examples of load control systems operable to communicate with mobile devices on a network are described in greater detail in commonly-assigned U.S. Pat. No. 10,271,407, issued Apr. 23, 2019, entitled LOAD CONTROL DEVICE HAVING INTERNET CONNECTIVITY, the entire disclosure of which is hereby incorporated by reference.

The operation of the load control system 100 may be programmed and configured using, for example, the mobile device 190 (e.g., when the mobile device is a personal computing device). For example, the mobile device 190 may program the operation the sensor devices 180a, 180b. The mobile device 190 may program the environmental conditions measured by the sensor devices 180a, 180b, how often the sensor devices 180a, 180b measure the environmental conditions, how often the sensor devices 180a, 180b transmit measured values, etc.). The mobile device 190 may execute a graphical user interface (GUI) configuration software for allowing a user to program how the load control system 100 will operate. For example, the configuration software may run as an application or a web interface. The configuration software and/or the system controller 110 (e.g., via instructions from the configuration software) may generate a load control database that defines the operation of the load control system 100. For example, the load control database may include information regarding the operational settings of different load control devices of the load control system (e.g., the dimmer switch 120, the LED driver 130, the plug-in load control device 140, the motorized window treatments 150, and/or the thermostat 160). The load control database may comprise information regarding associations between the input devices (e.g., the remote control device 170, etc.) and the load control devices. The associations may comprise device identifiers that are stored together, such that devices may recognize the identifiers of associated devices to enable communication between the control devices. For example, input devices and load control devices may be associated and stored in the load control database for being distributed to one or more devices for recognizing the identifiers of associated devices. The identifiers of the sensor devices 180a, 180b may be associated with one or more devices in the load control system and stored in the load control database for identifying the devices that should record the measurements and other transmissions from the sensor devices 180a, 180b. Control devices may recognize the stored identifiers of associated devices and communicate messages to and/or identify messages received from the associated devices. The load control database may comprise information regarding how the load control devices respond to inputs received from the input devices. Examples of configuration procedures for load control systems are described in greater detail in commonly-assigned U.S. Pat. No. 10,027,127, published Jul. 17, 2018, entitled COMMISSIONING LOAD CONTROL SYSTEMS, the entire disclosure of which is hereby incorporated by reference.

The mobile device 190 may receive messages from the sensor devices 180a, 180b via RF signals 109. For example, the mobile device 190 may receive the measured values for environmental conditions from the sensor devices 180a, 180b via beacon messages being transmitted in the RF signals 109. As the occupant 190 moves around the load control system 100, the mobile device 190 may collect the measured values for environmental conditions from multiple sensor devices.

The mobile device 190 may be programmed/configured to receive a beacon transmitted by the sensor devices 180a, 180b via RF signals 109. The mobile device 190 may be further configured to exchange secure credentials with the sensor devices 180a, 180b to create a secure link in order to receive beacon messages transmitted by the sensor devices 180a, 180b. When the mobile device 190 receives the beacon transmitted by the sensor devices 180a, 180b, the mobile device 190 may reserve access (e.g., link) for communicating with the sensor devices 180a, 180b. For example, receiving a beacon transmitted by the sensor devices 180a, 180b and/or creating a link with the sensor devices 180a, 180b may cause the mobile device 190 to link to and/or pair to (e.g., virtually link to and/or pair to) the sensor devices 180a, 180b that is transmitting the beacon. Other mobile devices may be prevented from creating a link with the sensor devices 180a, 180b after the mobile device 190 creates a link with the sensor devices 180a, 180b. For example, the other mobile devices may be programmed such that they are prevented from creating a link with one or more of the sensor devices 180a, 180b after the mobile device creates a link with another of the sensor devices 180a, 180b. The mobile device may perform a handshake with the sensor device 180a, 180b with which it is linked to establish a security credential for the link, and may not have a similar security credential for establishing the link with the other sensor device 180a, 180b.

The mobile device 190 may create a communication link with the sensor devices 180a, 180b for performing certain tasks (e.g., firmware upgrades or other software updates). The mobile device 190 may receive the beacon signal in the RF signal 109 of the sensor devices 180a, 180b (e.g., including the measured values for the environmental conditions) without being linked to the sensor devices 180a, 180b. For example, the mobile device 190 may process the information in the RF signal 109 of the sensor devices 180a, 180b when the signal strength of the RF signal 109 is above a predefined threshold. If the signal strength of the RF signal 109 is above the predefined threshold, the mobile device 190 may be determined to be close enough to the sensor device 180a, 180b to assign the values from the sensor device 180a, 180b to the mobile device 190.

As described herein, the sensor devices 180a, 180b may be a one-way communication device configured to transmit beacon messages in the RF signals 109, but may be put into a two-way communication mode for exchanging credentials with the mobile device 190 to allow the mobile device 190 to create a link with the beacon of the sensor devices 180a, 180b and/or perform two-way communications with the mobile device 190 via the RF signals 109. For example, the sensor devices 180a, 180b may be put in the two-way communication mode in response to actuation of a button on the sensor devices 180a, 180b.

When within proximity to the sensor devices 180a, 180b, the beacon signal in the RF signal 109 of the sensor devices 180a, 180b may be received by the mobile device 190. When the beacon signal in theRF signal 109 is received by the mobile device 190 is above a predefined signal strength threshold (e.g., received signal strength indicator threshold or another signal strength threshold), the mobile device 190 may process the measured values for the environmental conditions and/or the location identifier in the RF signal 109 received from the sensor devices 180a, 180b, and may store the values and/or the location identifier in a memory of the mobile device 190. As the location identifier may be used by multiple sensor devices, the measured values for multiple sensor devices may be stored with the location identifier to collect data at the mobile device 190 from multiple sensor devices in the same location. The mobile device 190 may store the measured values with the location identifier to identify the measured values for the location, and may transmit the measured values and the location identifier to the system controller 110 and/or a remote computing device 195. Alternatively, the mobile device 190 may forward the measured values and the location identifier to the system controller 110 and/or the remote computing device 195 for being stored thereon for identifying the measured values at the location indicated by the stored identifier. The mobile device 190 may communicate directly with the remote computing device 195 via RF signals 107, and/or communicate with the remote computing device 195 via the system controller 110. A time or timestamp indicating a time at which the measured values are received by the mobile device 190 may be stored at the system controller 110 and/or the remote computing device 195. For example, the sensor devices 180a, 180b may store a time or timestamp associated with each measurement. The time may be an absolute time or timestamp, or a relative time or timestamp (e.g., indicating an amount of time elapse since a previous measurement). Additionally and/or alternatively, the mobile device 190 may store a time with each received measurement. An identifier associated with the mobile device 190 and/or the occupant 192 may be communicated with data sent to the system controller 110. In addition, the remote computing device 195 and/or the workstation 194 may receive signals 109 and may send them to system controller 110 (e.g., or to another device) along with a time or timestamp and the identifier associated with the mobile device 190 and/or the occupant 192.

The mobile device 190 may be programmed to store one of the location identifiers or another unique identifier received in the beacon signal in the RF signals 109 (e.g., unique identifier of the sensor devices 180a, 180b) as a "preferred" beacon. For example, the preferred beacon stored at the mobile device 190 may be the beacon in the RF signals 109 received from the sensor devices 180a, 180b located at the workstation 193 of the occupant 190. In a high density location, such as an open office space, there may be multiple sensor devices in close proximity to one another, such as a device at each workstation, for example. The mobile device 190 may ignore (e.g., not process) measurements received from sensors other than the sensor from which the preferred beacon is received. Though a single preferred beacon may be described, the mobile device 190 may have multiple preferred beacon messages. For example, as illustrated in FIG. 1A, the workstation 193 may be within a location comprising two sensor devices 180a, 180b, which may both be recognized by preferred beacon messages. The user 192 may be presented with multiple sensor devices that are recognized by the mobile device 190 or another computing device and the user may select one or more preferred sensor devices. The mobile device 190 or another computing device may select the beacon of the selected sensor device(s) as the preferred sensor device(s).

After the mobile device 190 is programmed to store the location identifier or another unique identifier received in the beacon signal as a preferred beacon, the mobile device 190 may use a lower signal strength threshold for receiving and processing the information in the preferred beacon than other thresholds (e.g., predefined threshold for creating a communication link) used for processing beacon signals from sensor devices described herein. For example, when the location identifier or another unique identifier is transmitted by the sensor devices 180a, 180b are stored at the mobile device 190 as a preferred beacon, the mobile device 190 may use a first signal strength threshold to enable receipt and processing of the measurements in the beacon signal being received from the sensor devices 180a, 180b, and may continue to receive and process the measurements in the beacon signal until the beacon signal drops below a second signal strength threshold, or preferred beacon threshold, that is lower than the first signal strength threshold. The mobile device 190 may receive measurements from multiple sensor devices. If the mobile device 190 receives a preferred beacon, the mobile device may process the preferred beacon before processing any other beacon messages (e.g., regardless of the signal strength at which the preferred beacon was received). If the mobile device does not receive a preferred beacon, the mobile device may process the beacon that was received at the highest signal strength. Additionally, or alternatively, the first signal strength threshold may be a lower preferred beacon threshold to enable the mobile device to receive and process the measurements in the preferred beacon being received from the sensor devices 180a, 180b over other beacon signals that may be transmitted in the system. The mobile device 190 may store the location identifier or another unique identifier received in the beacon signal as a preferred beacon in response to an indication received from a user on the mobile device 190 and/or after receiving the beacon a predefined amount of time (e.g., a threshold number of times or threshold number of times greater than another beacon).

One or more of the computing devices in the load control system 100 may use the measured values for each location identifier to build a profile for the location having the location identifier. For example, the system controller 110, the remote computing device 195, and/or the mobile device 190 may average multiple received values for a given environmental condition to determine the average value for that environmental condition within the location. The one or more computing devices may receive multiple temperature values for a given location identifier over a period of time, and may determine an average temperature for the location based on the received values. The one or more computing devices may record a time of day at which a value was measured (e.g., which may be received from the sensor device) and may determine an average value for the environmental condition at that time of day. In one example, the sensor devices 180a, 180b may measure the temperature of a room at noon and midnight across multiple days, and the temperature values may be transmitted by mobile device 190 to the system controller 110 and/or the remote computing device 195 and recorded with their respective times of day. The one or more computing devices may determine an average value for the temperature of the room at noon and an average value for the temperature of the room at midnight based on the multiple measurements. In another example, the one or more computing devices may receive measurements over a period of time (e.g., thirty minutes, an hour, two hours, or another period of time), and may average the measurements over the period of time to determine the temperature for the period of time. The one or more computing devices may also, or alternatively, record a time at which the measured values are received and/or stored at the computing devices themselves.

The occupant 192 may have a relatively low comfort level with one or more of the environmental conditions within the location. Without feedback from the occupant 192, the load control system 100 may be unaware of the occupant 192's comfort level. Thus, the load control system 100 may prompt the occupant 192 to provide feedback such that the load control system 100 can increase the occupant 192's comfort level with one or more environmental conditions. The feedback may be used to generate the profile for the location and/or the occupant 192, which may allow the load control system 100 to modify one or more of the environmental conditions when the occupant 192 is in the location. For example, the mobile device 190 may associate the occupant 192 (e.g., an identifier associated with the occupant 192) and the measured conditions.

The mobile device 190 may present the occupant 192 with a survey that prompts the occupant 192 to enter feedback of the occupant 192's comfort level with one or more of the measured environmental conditions. The occupant 192's comfort levels may be used to determine preferred values for the environmental conditions. The survey may be presented via a locally-executed application running on the mobile device 190 and/or via a browser application executed locally on the mobile device 190 for displaying information from an application that is being executed remotely at the system controller 110 or a remote computing device 195, for example. The mobile device 190 may present the occupant 192 with the survey when the mobile device 190 receives an indication from the system controller 110 or the remote computing device 195 to present the survey. For example, the system controller 110 or remote computing device 195 may receive information comprising the measurements for one or more environmental conditions in a given location from the mobile device 190, detect a change in the one or more environmental conditions received for the location (e.g., change greater than a threshold), and prompt the mobile device 190 to present a survey to the occupant 192. Alternatively, the mobile device 190 may present the survey to the occupant 192 at regular intervals or in response to an indication by the occupant 192 (e.g., selection at the mobile device 190). The survey may prompt the occupant 192 to enter feedback for each environmental condition (e.g., temperature, humidity, lighting intensity, color conditions, etc.) measured by the sensor devices 180a, 180b. For example, for each environmental condition measured by the sensor devices 180a, 180b, the mobile device 190 may present the occupant 192 with a scale having a range of values, with the lowest value (e.g., 1) indicating the lowest comfort level and the highest value (e.g., 10) indicating the highest comfort level. The occupant 192 may make selections on the scale indicating the user's comfort level for each environmental condition.

If the occupant 192 makes a selection that indicates a comfort level that is below a threshold value for a given environmental condition, the mobile device 190 may present additional questions related to that environmental condition. For example, if the user indicates a comfort level below predefined comfort level (e.g., below a level of "4") for the temperature of the location, the mobile device 190 may prompt the user to enter a preferred temperature. The mobile device 190 may also, or alternatively, estimate the preferred values of the environmental conditions based on input from the user at the mobile device. After a threshold number of times of receiving input from the user (e.g., at the mobile device 190, the system controller 110, and/or the remote computing device 195), the computing device (e.g., at the mobile device 190, the system controller 110, and/or the remote computing device 195) may begin to learn the values of the environmental conditions that create a comfort level for the occupant 192 of the mobile device 190 and set the preferred values. The mobile device 190 may prompt the user to indicate whether the temperature or humidity is too high or too low for determining the preferred temperature or humidity. The mobile device 190 may prompt the occupant 192 to indicate how much the measured environmental condition deviates from the occupant 192's preferred value and use the user input to adjust the preferred value more or less. For example, the mobile device 190 may prompt the occupant 192 to select an integer between 0 and 10, with a higher value indicating a relatively higher deviation. In another example, the mobile device may provide a range of values (e.g., −3 to 3) for an environmental condition, with a center value indicating a level of comfort and each value above or below the center value representing a relative level of discomfort toward one extreme or another (e.g., too cold to too warm, too dark to too bright, etc.). In response to a relatively larger or smaller indication of discomfort, the computing device(s) (e.g., the system controller 110, the remote computing device 195, and/or the mobile device 190) may generate control instructions to perform relatively larger or smaller changes in the environmental condition, respectively, The mobile device 190, the system controller 110, and/or the remote computing device 195 may determine a preferred value for the occupant 192 for a given environmental condition based on the value selected by the occupant 192. For example, the occupant 192 may indicate that a measured value of 65 degrees Fahrenheit is too low or too high by actuation of a button on the application running on the mobile device 190. Based on the measured value of 65 degrees Fahrenheit and the indication that the measured value is too low or too high, the mobile device 190, the system controller 110, and/or the remote computing device 195 may determine the preferred temperature. For example, the preferred temperature may be a predefined increase in response to the temperature being too low, or a predefined decrease in response to the temperature being too high. The user may select a relative value (e.g., 5 out of 10) when prompted to indicate how much the measured temperature deviates from the occupant 192's preferred temperature. The mobile device 190, the system controller 110, and/or the remote computing device 195 may calculate the preferred temperature based on the relative value indicating the relative comfort of the occupant 192. For example, the mobile device 190, the system controller 110, and/or the remote computing device 195 may use an equation to estimate the preferred temperature based on the indication from the user. The preferred temperature may be a predefined amount to increase or decrease for each value in the range of selectable values provided to the occupant 192 (e.g., one additional degree increase or decrease for each selectable value in the range). For example, the mobile device 190 may determine that the occupant 192's preferred temperature is approximately 70 degrees Fahrenheit based on the measured temperature value being 65 degrees Fahrenheit and the occupant 192 indicating a relative comfort level of five with the temperature being too low. One or more of the computing devices (e.g., the mobile device 190, the system controller 110, and/or the remote computing device 195) may implement an algorithm and/or a model that uses the relative comfort of the user and/or the physical measurements of the room 102, which may be retrieved from floorplan data stored in memory, to determine an amount of change in the environmental conditions to reach the comfort level of the user. The computing devices (e.g., the mobile device 190, the system controller 110, and/or the remote computing device 195) may generate control instructions for being sent to the load control devices to cause the change in the temperature value or other environmental conditions. The control instructions may be sent in a single message that causes the desired change, or the control instructions may be sent to begin changing the environmental conditions and the sensor devices 180a, 180b may continue to monitor the environmental conditions until the desired amount of change is detected. For example, the control instructions may be sent to cause the HVAC system 162 to heat the room for a period of time, or the control instructions may cause the HVAC system 162 to begin heating the room and a separate set of control instructions may be sent to cause the HVAC system 162 to stop heating the room when the preferred temperature of the occupant 192 is reached. Though the temperature value is provided as an example, the occupant 192's preferred value for other environmental conditions may similarly be estimated. For example, the user may provide input that the lighting conditions (e.g., lighting intensity and/or color temperature) are uncomfortable and one or more of the computing devices may identify the ratio of the light being received in multiple directions to determine a threshold or range within which to maintain the lighting conditions for maintaining the comfort of the user.

The mobile device 190 may store the selected comfort levels, and may transmit the comfort levels, the measured values received from the sensor devices 180a, 180b, the location identifier, and/or the unique identifier of the mobile device 190 (e.g., an occupant identifier) to the system controller 110 and/or the remote computing device 195 (e.g., directly or via the system controller 110). For example, the remote computing device 195 may be and/or may include one or more computing devices executing a remote service (e.g., a cloud-based service). The measured values and/or the comfort levels may be stored with the location identifier, such that the measured values are stored with the survey responses from the occupant 192 for the location. The location identifier may indicate, for example, the room in which the sensor devices 180a, 180b are located, or a specific position within the room (e.g., the floor, a desk, a wall, etc.).

Though the beacon messages comprising the measured environmental conditions are described as being received by the mobile device 190, the beacon messages that are transmitted by the RF signals 109 may be received by another computing device, such as the system controller 110, the monitor 194, and/or a collection device 185. The collection device 185 may have a fixed position, and may be associated with a given location, such as the room 102, for collecting measured environmental conditions from one or more sensor devices via the beacon messages transmitted in the RF signals 109. The collection device 185 may be used to aggregate information received from one or more sensor devices 180 and forward the information to the system controller 110 and/or the remote computing device 195 via the RF signals 108/109. The information aggregated by the collection device 185 may be accessed by the mobile device 190 (e.g., directly or via the system controller 110 and/or the remote computing device 180). While the information received by the mobile device 190 (e.g., and survey responses from the user of the mobile device) may be used to build a profile for a specific user or occupant, the information received by a collection device 185 may be used to build a profile for a specific location by having the one or more occupants take surveys.

The system controller 110 and/or the remote computing device 195 may receive the comfort levels, the measured values, the location ID, and/or the occupant ID from the mobile device 190 and may use the information to generate a profile for the location of the load control system 100 and/or for the occupant 192. The profile may include preferred environmental conditions (e.g., temperature, humidity, and/or lighting conditions) for the location and/or the occupant 192. For example, the profile for the occupant 192 may include the user's preferred temperature, humidity, color settings (e.g., full-color settings and/or color temperature settings), and/or light intensity.

The preferred values for the environmental conditions may be determined based on the user's responses to the survey presented by the mobile device 190. For example, the occupant 192 may indicate a current relative comfort level for an environmental condition in the location. If the occupant 192 indicated a preferred value or range of values for an environmental condition (e.g., preferred temperature value, preferred humidity value, color settings, and/or preferred light intensity), the profile may include the user's preferred value. If the occupant 192 did not indicate a preferred value for an environmental condition, but the occupant 192 did indicate their relative comfort level (e.g., relatively high or low level of comfort) for an environmental condition, the remote computing device 195 may predict the preferred value or range of values for the environmental condition and the profile may include the predicted preferred temperature. The preferred value or range of values for the environmental condition may be predicted based on one or more inputs from the occupant 192 via the mobile device 190. The greater the number of inputs, the greater the confidence level associated with the comfort of the user at a preferred value or range of values for the environmental condition. The input from the occupant 192 may indicate whether the occupant is "comfortable" or "not comfortable" while one or more load control devices are operating at a current value. A computing device (e.g., system controller 110, remote computing device 111, etc.) may record the indication of the occupant 192's comfort at the current value and use these indications from the occupant 192 to predict a future comfortability of the occupant 192. The comfortability may be dependent on time of day and/or other factors, which may also be recorded with the indication of the comfortability of the user from which the preferred values or range of values for the environmental conditions may be predicted. The computing device (e.g., system controller 110, remote computing device 111, etc.) may leverage a model to predict the preferred value or range of values for the environmental conditions. The model may be a regression model used to mathematically predict the combination of environmental variables that would make the user comfortable. Each set of current environmental conditions and/or values of the load control devices may be associated with a reported preference by the occupant 192. As the dataset increases, the computing device (e.g., system controller 110, remote computing device 111, etc.) may utilize the regression model may take into consideration the variability in the indicated comfort level of the occupant 192 against the values used to control the load control devices, the time of day, the time of year, and/or the values of the measured data indicating the environmental conditions to predict the relative comfort of the user for the currently sensed environmental conditions. If the computing device (e.g., system controller 110, remote computing device 111, etc.) predicts that the occupant 192 would be uncomfortable based on the measurements taken by the sensor devices 180a, 180b, the computing device (e.g., system controller 110, remote computing device 111, etc.) may transmit one or more messages via RF signals 109 to control one or more load control devices to preferred values of the occupant 192 for the environmental condition.

The remote computing device 195 and/or the system controller 110 may make incremental adjustments to the current values used to control the load control devices to adjust the environmental conditions in response to the input received from the occupant 192 and may determine the occupant 192's response to the adjustment. The remote computing device 195 (e.g., and/or the mobile device 190 and/or the system controller 110) may predict the preferred value or range of values for an environmental condition using the regression analysis. Each time the occupant 192 reports a relative comfort level of an environmental condition at the mobile device 190, the remote computing device 195 may associate the relative comfort level indicated by the user to the current measurements of the environmental condition. The relative comfort level of that is associated with the measurements of the environmental conditions may be used to control the environmental condition in the location and/or to determine the occupant 192's preferred value for the environmental condition.

The system controller 110 and/or the remote computing device 195 may aggregate the information received from multiple sensors, and/or from the same sensor at different times, and may use the aggregated information to predict the preferred environmental conditions for the location and/or the occupant 192. Because a given sensor may measure the environmental conditions and repeatedly transmit the values before measuring the environmental conditions again, the mobile device 190, the collection device 185, the remote computing device 195, and/or the system controller 110 may receive the same information twice (e.g., the transmission period may be more frequent than the measurement period(s)). The mobile device 190, the collection device 185, the remote computing device 195, and/or the system controller 110 may thus ignore repeated information. For example, the values may be transmitted with a timestamp at which the values were measured, and a device that receives the values may determine whether values with the same timestamp are already stored in memory. In another example, after measuring the values, the sensor may determine whether the values have changed since a previous measurement, and may transmit the values that have changed. Alternatively, the sensor device may transmit each of the measured values regardless of whether they have changed since the previous measurement, and the device that receives the values may store the ones that have changed. Additionally and/or alternatively, the mobile device 190, the system controller 110, and/or the remote computing device 185 may aggregate survey responses received from the occupant 192 within the same location to predict the preferred environmental conditions for the occupant for the respective location.

In an example, the mobile device 190, the system controller 110, and/or the remote computing device 195 may use aggregated information received from one or more sensors (e.g., within the same location or different locations) and survey responses from a given occupant to build a profile for the occupant. The occupant profile may be defined for a specific occupant based on the input received from that occupant at one or more locations comprising one or more sensor devices (e.g., preferred sensor devices and/or non-preferred sensor devices). The occupant profile may include different preferred values for environmental conditions at different locations. The occupant profile for a given location may be based on the reporting of the comfort levels by the occupant for that given location and the sensor devices 180a, 180b detecting the same occupant based on the unique identifier of the occupant's mobile device. The occupant profile may be used to determine load control settings for a location when the occupant is detected in the location. The user profile may include preferred settings for different location types, such that the mobile device 190, the system controller 110, and/or the remote computing device 195 may control the load control devices in a location based on the input they have provided in other locations having the same location type.

In another example, the system controller 110, and/or the remote computing device 195 may use aggregated information received from one or more sensors within a given location and survey responses from one or more occupants to build a profile for the location. The location profile may be stored with a location type (e.g., living room, office, conference room, kitchen, etc.). The location profile may be used to determine load control settings for a given location based on the input received by one or more occupants in the location. The input that is received for each location having the same location type may be applied to other locations having a similar location type. For example, occupants may provide indications of their comfort level in various conference rooms throughout a building and the indications of comfort level may be shared across the various conference rooms. The information may be shared across the locations having the same location type when the locations having the same location type also have other similar characteristics, such as size within a predefined range, number of windows within a predefined range, face the same direction, etc.

A profile associated with the occupant 192 may indicate the occupant 192's preferred values (e.g., temperature, humidity, light intensity, color settings, etc.) for the environmental conditions. The profile associated with the occupant 192 may also include one or more locations associated with the occupant 192 and/or one or more measured values in the location. In an example, the occupant 192 may enter a given location, and the mobile device 190 associated with the occupant 192 may receive one or more measured values from a sensor device. The mobile device 190 may transmit the values to the system controller 110. Upon reception of the measured values, the system controller 110 may access the profile (e.g., stored thereon, from the remote computing device 195, and/or from another computing device), and may command one or more load control devices to adjust environmental conditions in the location such that values for the environmental conditions match the preferred values, or are controlled toward the preferred values. For example, the occupant 192 may enter a location where the temperature is 65 degrees Fahrenheit. The system controller 100 may determine that the user's preferred temperature is 72 degrees Fahrenheit. The system controller 100 may then command the thermostat 160 to increase the temperature of the location to 72 degrees Fahrenheit. Though the temperature is provided as an example, other load control devices may be controlled for adjusting other environmental conditions described herein. Additionally and/or alternatively, the measured values and the occupant 192's responses to the survey may be used to adjust one or more of the environmental conditions in response to the survey (e.g., immediately).

Though the profile of the location may be described as a comfort profile, the profile may be built to track the changes in the value of one or more environmental conditions in the location over a predefined period of time. For example, the remote computing device 195 may receive the measured values for one or more environmental conditions from one or more sensor devices in the location and build a profile that stores the changes in the measured values over a day, a season, a year, and/or another period of time. When the measurements are received from multiple sensor devices, the profile may indicate significant non-uniformities (e.g., greater than a threshold) in the measurements throughout the location at a specific time or over periods of time.

Figure 1B:
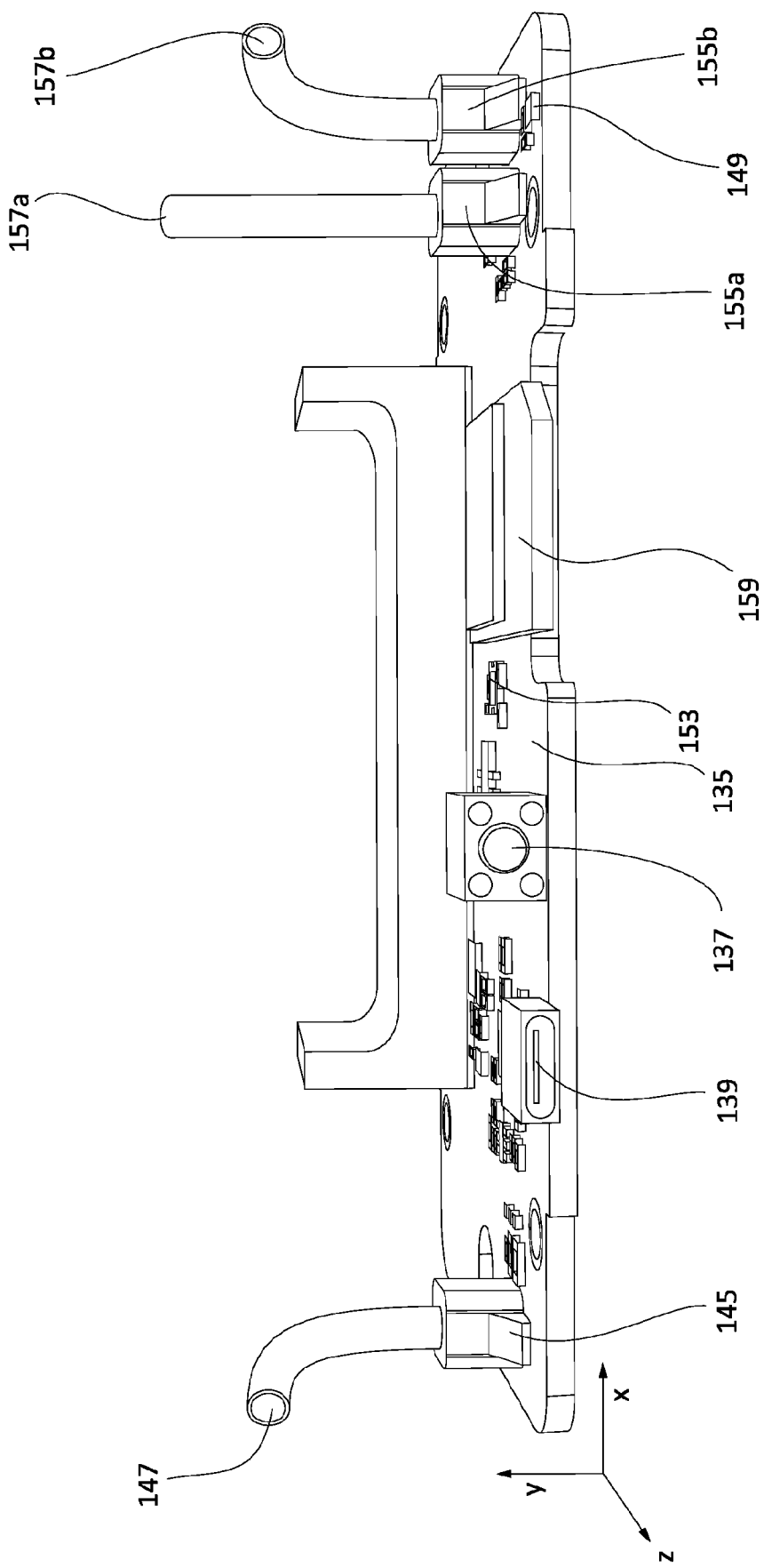
FIGS. 1B, 1C, and 1D illustrate a front perspective view, a side perspective view, and a top-down perspective view, respectively, of an example configuration of a printed circuit board (PCB) of a sensor device shown in the load control system of FIG. 1A.
Figure 1C:
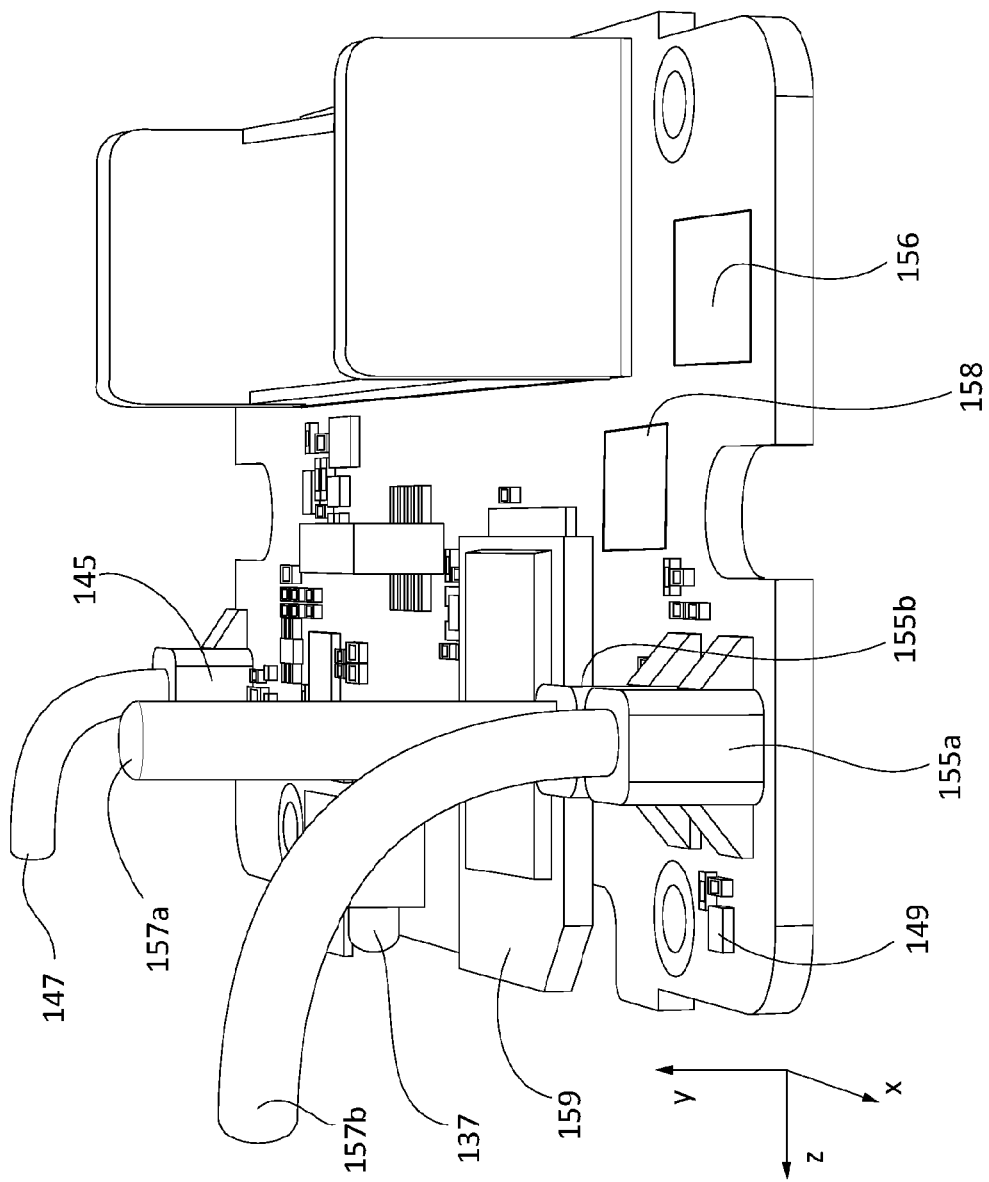
Figure 1D:
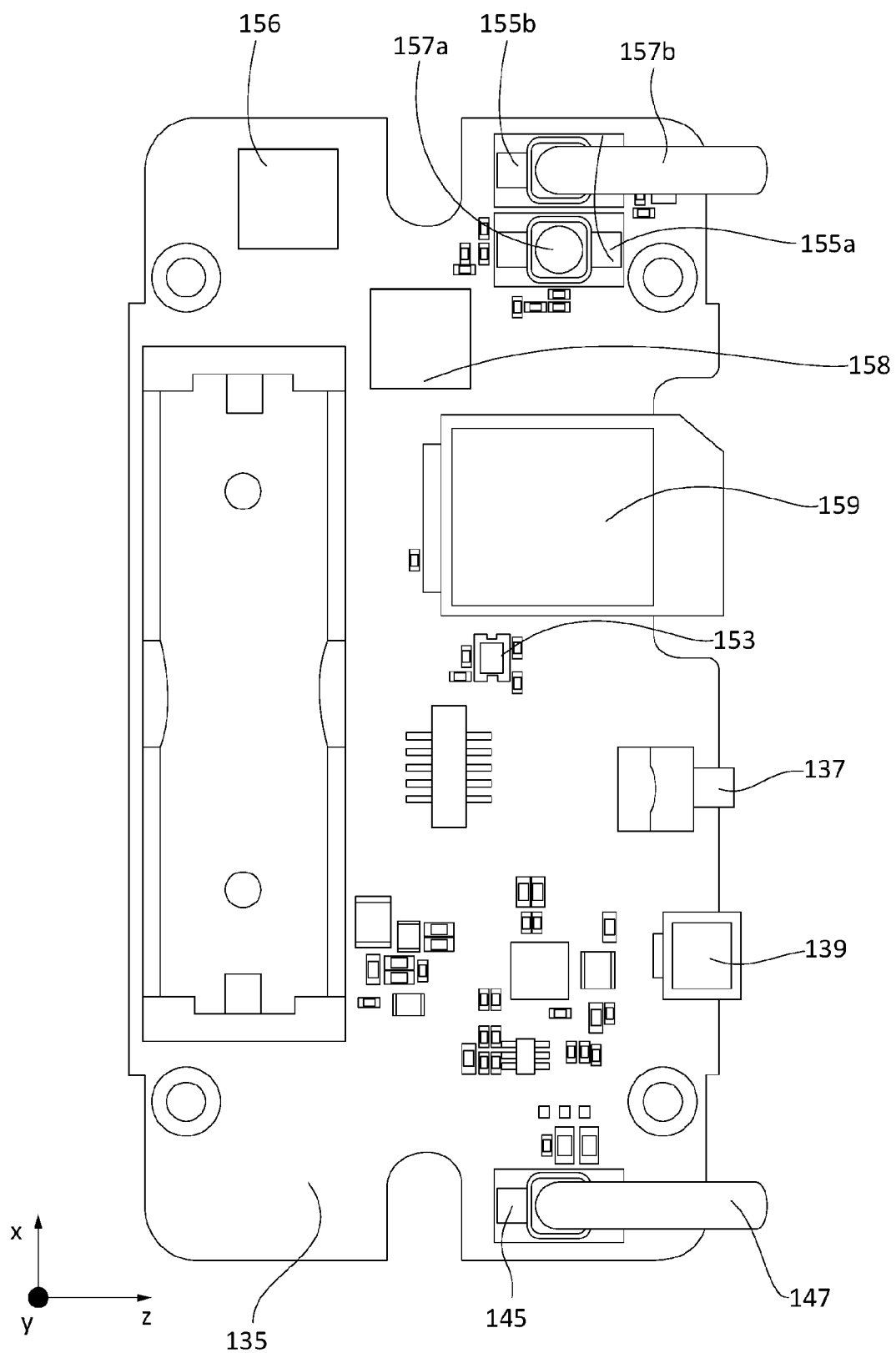

The sensor devices 180a, 180b may be configured to enable the collection of measurements of the environmental conditions, as described herein. FIGS. 1B, 1C, and 1D illustrate a front perspective view, a side perspective view, and a top-down perspective view, respectively, of an example configuration of a printed circuit board (PCB) 135 of a sensor device, such as the sensor devices 180a, 180b shown in FIG. 1A. The PCB 135 may be mounted parallel to a base surface 183 of the sensor devices 180a, 180b. As shown in FIGS. 1B and 1C, the PCB 135 may include visible light sensors 155a, 155b. Each of the visible light sensors 155a, 155b may receive light for performing respective measurements of one or more lighting conditions (e.g., color conditions, such as full-color values and/or color temperature values, lighting intensity values, and/or other lighting conditions). For example, the visible light sensors 155a, 155b may receive light from respective light pipes 157a, 157b from which the respective measurements may be performed.

The respective light pipes 157a, 157b of each of the visible light sensors 155a, 155b may receive light falling on surfaces in different directions, such that the visible light sensors 155a, 155b may measure the lighting conditions (e.g., color conditions, such as full-color values and/or color temperature values, lighting intensity values, and/or other lighting conditions) of the light in different directions. For example, the light falling on the surface of a visible light sensor may include direct light and/or indirect light (e.g., light reflected from one or more other surfaces). As shown in FIGS. 1B and 1C, the visible light sensors 155a, 155b may be mounted on the PCB 135 that is lying in an x-z plane. The light pipe 157a may be mounted to/over the visible light sensor 155a, such that the opening of the light pipe 157a may receive light falling on/emitted from a parallel surface in the x-z plane. The light pipe 157b may be mounted to/over the visible light sensor 155b, such that the opening of the light pipe 157b may receive light falling on/emitted from a perpendicular surface in the x-y plane. Though two visible light sensor 155a, 155b are described for measuring lighting conditions from different directions, more or less visible light sensors and corresponding light pipes may be mounted to the PCB 135 and/or measure lighting conditions falling in other directions.

The visible light sensors 155a, 155b may each measure the lighting conditions (e.g., lighting intensity and/or color temperature) of the light received from respective light pipes using spectral measurements to determine the composition of the light being received. For example, the visible light sensors 155a, 155b may measure color temperature by measuring the amount of light in one or more different wavelengths (e.g., RGB) and using the color of the light measured for each wavelength to approximate a color temperature. The visible light sensors 155a, 155b may measure lighting intensity by measuring an excitation of the light in the one or more different wavelengths and using the excitation of the light sensed for each wavelength to approximate a lighting intensity and/or a full color spectrum (e.g., a point on a color gamut). The visible light sensors 155a, 155b may measure the amount of light in a clear channel (e.g., a broad spectrum), which may include infrared (IR) light or other light that is outside of the RGB spectrum or the visible light spectrum, or that includes light that overlaps with the RGB spectrum or the visible light spectrum. The visible light sensors 155a, 155b may use the measurements received on the clear channel to detect light that may be affecting the RGB values that are measured and correct the RGB measurements, as further described elsewhere herein. For example, the visible light sensors 155a, 155b (e.g., and/or the control circuit 159) may calculate an amount of IR light received based on the amount of light received in the RGB spectrum and in the clear channel. The visible light sensors 155a, 155b (e.g., and/or the control circuit 159) may then subtract the calculated IR light received on the clear channel from each of the measured wavelength bands (e.g., each of the RGB channels) to produce corrected measurements for each of the RGB channels. The light that is received in the center of the opening of each light pipe may be weighted more heavily than the light that is received toward the edges of the opening of the light pipe (e.g., using a cosine weighting function) in order to more accurately measure the light in the direction that the light pipe is facing. For example, the intensity of light received at a given measurement plane may be proportional to the cosine of the angle at which the light is incident. Therefore, the visible light sensors 155a, 155b and/or the control circuit 159 may determine a normalized value for the intensity of the light based on the cosine weighting function.

The PCB 135 may include other sensor types. For example, the PCB 135 may include a temperature/humidity sensor 139. Though the temperature sensor and the humidity sensor may be illustrated as co-located as the same sensor 139 mounted to the PCB 135, the temperature sensor and the humidity sensor may be separate sensors that are independently mounted to different portions of the PCB 135. The temperature sensor may be used to measure a temperature of the location in which the sensor devices 180a, 180b are located. The humidity sensor may be used to measure a humidity of the location in which the sensor devices 180a, 180b are located.

The control circuit 159 may access computer-executable or machine-executable instructions stored as software in the memory 156 for being executed by the control circuit 159 for operating as described herein. The control circuit 159 may measure one or more environmental conditions via the visible light sensors 155a, 155b and/or the temperature/humidity sensor 149 and store the measurements in the memory 156. The visible light sensors 155a, 155b and/or the temperature/humidity sensor 149 may measure the environmental conditions in response to a triggering event. For example, the triggering event may be the reception of a signal from the control circuit 159 or the expiration of a timer. The triggering event may be a prior measurement and/or a measurement at another sensor. The visible light sensors 155a. 155b and/or the temperature/humidity sensor 149 may measure raw values and may transmit the raw values to the control circuit 159 for processing. For example, the visible light sensors 155a, 155b may measure raw values (e.g., for intensity and color or color temperature), and may transmit the raw values to the control circuit 159. The control circuit 159 may process the received values to generate measurements (e.g., a total intensity, color, and/or color temperature). Alternatively, the visible light sensors 155a, 155b and/or the temperature/humidity sensor 149 may process the raw values and may transmit the processed measurements to the control circuit 159. The control circuit 159 may store the measurements in memory 156. The measurements may be stored in memory with a timestamp that identifies the time at which the measurements taken. The PCB 135 may include a timer circuit 153 (or clock circuit) that is configured to track time and communicates with the control circuit 159 from which timestamps may be recorded. The control circuit 159 may transmit the measurements and/or other information (e.g., a location identifier stored in memory, another unique identifier stored in memory, and/or the timestamp that identifies the time at which the measurements were taken) via a wired or wireless communication link as describe herein. For example, the control circuit 159 may transmit information via a beacon signal using a wireless communication circuit 158. The PCB 135 may include a USB port 139 to which another device may be connected via a wired communication link. The control circuit 159 may be configured to transmit information via the USB port to the other device on the wired communication link.

The control circuit 159 may transmit information via the wired or wireless communication link in response to a triggering event. The triggering event may be identified by the control circuit 159 when a signal is received in response to an actuation of a button 137 attached to the PCB 135. The triggering event may be identified by the control circuit 159 when a message is received via a wired or wireless communication link from another device (e.g., the mobile device 190 or another device in the system 100). The sensor device may include the timer circuit 153, and the triggering event may be the passing of a predefined amount of time (e.g., as measured by the timer circuit 153 and/or the control circuit based on the timing information received from the timer circuit 153).

The PCB 135 may include an LED indicator(s) 145 for providing feedback to the user (e.g., in response to measurements, transmissions, actuation of the button 137, or other feedback). The LED indicator may provide light from an LED via the light pipe 147. The opening of the light pipe 147 may face the same direction as the opening as the light pipe 157b, as the opening of the light pipe 147 and the opening of the light pipe 157b may be configured to face the occupant for providing feedback and taking measurements, respectively, in the direction of the occupant. Alternatively, the opening of the light pipe 147 and the opening of the light pipe 157b may face in different directions. Though the PCB 135 includes visible light sensors 155a, 155b and/or the temperature/humidity sensor 149 as example sensor types that may be mounted to the PCB 135, other types of sensors may be attached to the PCB 135 for performing measurements of environmental conditions and storing the measurements in memory 156 by the control circuit 159 a clock circuit 153.

Figure 2:
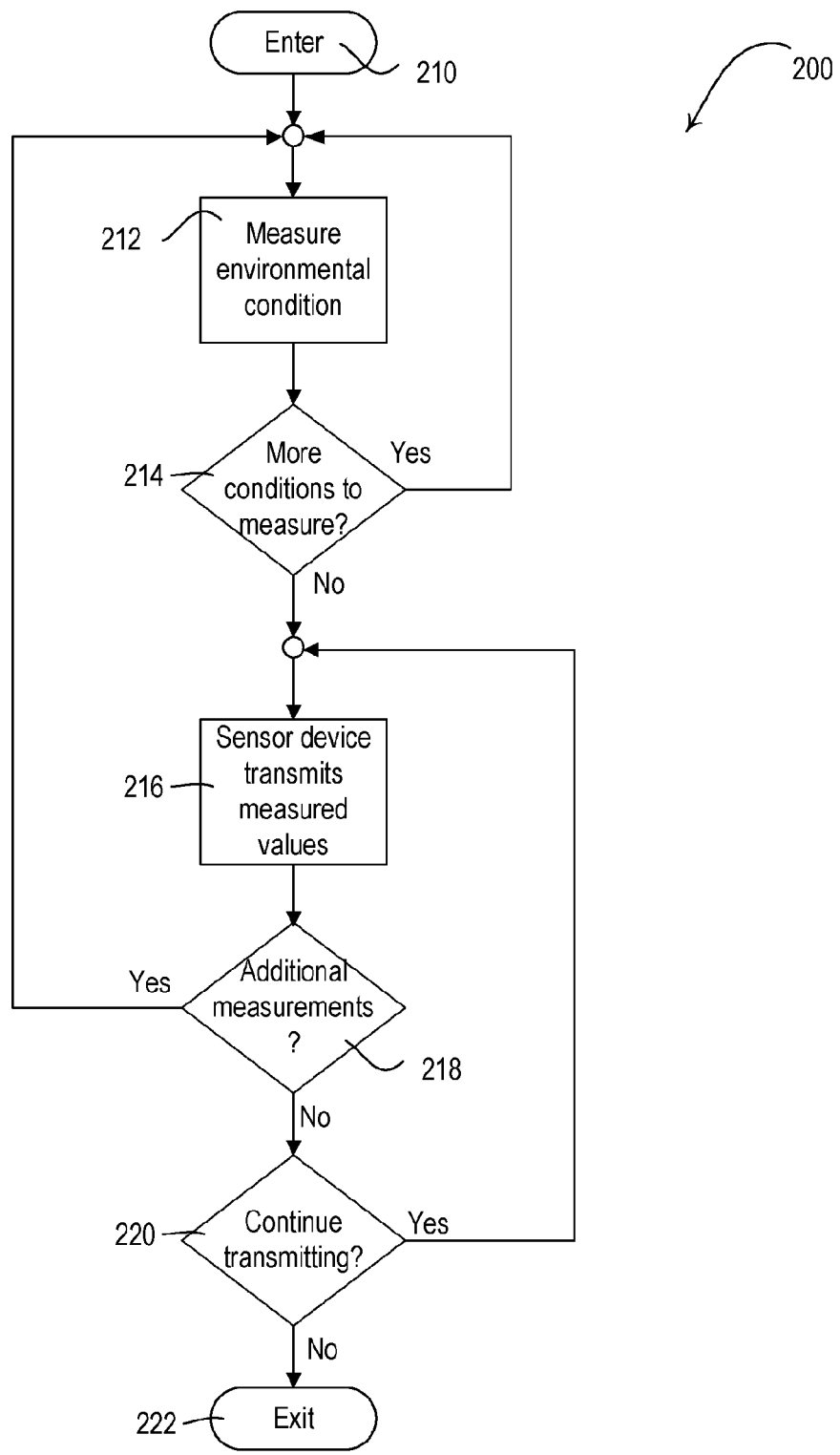
FIG. 2 is a flowchart depicting an example procedure for measuring one or more environmental conditions within a location.

As described herein, the sensor devices 180a, 180b may perform measurement of different environmental conditions. FIG. 2 is a flowchart depicting an example procedure 200 for measuring one or more environmental conditions within a location. For example, the location may be a location in the load control system (e.g., the load control system 100). The procedure 200 may be performed by a sensor device in the load control system. For example, the sensor device may be the sensor devices 180a, 180b shown in FIG. 1A. The sensor device may be located on, for example, a wall, a ceiling, a desk, a computer, and/or another location in the system. The procedure 200 may be performed periodically.

The procedure 200 may begin at 210. For example, the procedure 200 may begin at 210 after identifying a triggering event. The triggering event may be the expiration of a predefined period of time for measuring environmental conditions as determined by the sensor device from the internal timer/clock. In another example, the procedure 200 may begin at 210 in response to the sensor device receiving a triggering signal from another device. For example, the triggering signal may be a signal from a mobile device or an occupancy condition from an occupancy sensor when an occupant enters the location (e.g., directly and/or via a system controller). The occupancy sensor may be located on the sensor device itself or may be a separate device for detecting occupancy and/or vacancy in a space. The occupancy sensor may communicate the occupancy condition via wired or wireless communications upon detection of movement in the space.

At 212, the sensor device may measure an environmental condition. For example, the sensor device may include a control circuit and at least one sensor. The control circuit may measure the environmental condition via the sensor. The environmental condition may be, for example, a temperature, a humidity, or lighting conditions (e.g., color conditions, such as full-color values and/or color temperature values, lighting intensity values, and/or other lighting conditions). For example, the sensor device may include a temperature sensor, and the sensor device may use the temperature sensor to measure the temperature. For example, the sensor device may include a humidity sensor, and the sensor device may use the humidity sensor to measure the humidity. The humidity may be measured as a relative humidity.

The sensor device may measure the intensity of the light on one or more planes within the location (e.g., the illuminance of the light that falls on a surface). For example, the sensor device may include one or more visible light sensors, with each visible light sensor receiving light falling on a surface on a different plane. For example, the sensor device may include a first visible light sensor that measures light on a first plane (e.g., a horizontal plane) and a second visible light sensor that measures light on a second plane (e.g., a vertical plane). The planes may be orthogonal to one another. The planes may be set relative to the base of the sensor device or another side of the sensor device. Each visible light sensor may measure the light intensity of the light received from a respective light pipe that is pointed in a direction of a different surface. For example, the light pipe of the first visible light sensor may face objects on a horizontal plane (e.g., the ceiling, desk, floor, and/or other objects on a horizontal plane) such that the first visible light sensor may take measurements of the lighting conditions of the light that falls on and is reflected from those objects on the horizontal plane, such as the ceiling. The second visible light sensor may face objects on a vertical plane (e.g., walls, windows, etc.) and take measurements of the lighting conditions of the light that falls on and is reflected from those objects on the vertical plane. In this orientation, the second visible light sensor may take light measurements of light emitted from lighting control devices on the vertical plane, or of light entering through a window, etc. The sensor device may measure the color conditions of the light within the location on one or more surfaces. For example, each visible light sensor may measure the color conditions of the light on a viewable surface.

After the sensor device measures an environmental condition at 212, the control circuit of the sensor device may determine whether there are more conditions that remain to be measured at 214. For example, the control circuit of the sensor device may maintain a record of the environmental conditions in memory that have been measured within a given period of time. The sensor device may maintain a list of environmental conditions to be measured, or to be measured in each iteration of performing measurements (e.g., one or more environmental conditions may be measured more frequently than others, as described herein). The control circuit of the sensor device may compare the conditions that have been measured within the given period of time and the list of the conditions to be measured to determine whether there are more conditions that remain to be measured. If the control circuit of the sensor device determines that there are more conditions that remain to be measured, the sensor device may measure another environmental condition at 212.

The sensor device may measure each of the remaining conditions before the procedure 200 moves to 216. If the control circuit of the sensor device determines at 214 that each of the environmental conditions have been measured, or each environmental condition for a given iteration has been measured (e.g., one or more environmental conditions may be measured more frequently than others, as described herein), the control circuit of the sensor device may store the measured values for the environmental conditions in memory for being transmitted (e.g., via a communication circuit) at 216. The sensor device may transmit the measured values at 216 in response to a triggering event, such as a button press or a message from another device in the system. The measured values may include the measured values that have been stored since a previous transmission or over a period of time. In another example, the sensor device may transmit the measured values at 216 after each of the environmental conditions have been measured and/or the expiration of a transmission period has expired.

The sensor device may transmit the measured values via beacon messages that are received by one or more computing devices in the load control system (e.g., mobile device 190, collecting device 185, and/or system controller 110). The beacon messages may include a unique identifier that identifies the location (e.g., a location identifier) that is stored on the sensor device and/or a timestamp determined by the sensor device that identifies the time at which the values were measured along with the measured values. After the sensor device has transmitted the measured values, the sensor device may determine whether additional measurements are to be performed at 218. For example, the control circuit of the sensor device may determine whether a measurement period has expired. The sensor device may wait to perform additional measurements until the expiration of the measurement period. Each environmental condition may have the same measurement period, such that each environmental condition is measured in each iteration of measurements being performed. In another example, different environmental conditions may have different measurement periods, such that different environmental conditions may be measured on a given iteration of measurements being performed. For example, one or more measurement conditions may have a measurement period that is a multiple of other measurement conditions. If the control circuit of the sensor device determines that additional measurements are to be performed, at 218, the sensor device may return to 212 for performing measurements of one or more environmental conditions.

If the control circuit of the sensor device determines at 218 that additional measurements are not to be performed, the control circuit of the sensor device may determine whether to continue transmitting the measurements that have been stored at 220. For example, the sensor device may await a transmission period before continuing to transmit the measurements that have been stored. If the transmission period has expired, the sensor device may retransmit the measured values via the beacon messages at 216. The beacon messages may include the unique identifier that identifies the location (e.g., a location identifier) and/or the timestamp. The transmission period may be shorter than the measurement period, such that the sensor device transmits the beacon messages multiple times before each additional measurement or group of measurements that is performed to conserve battery power that may be consumed during operation for performing measurements. Alternatively, the transmit period may be the same as or longer than the measurement period If the control circuit of the sensor device 220 determines not to continue transmitting at 220, the sensor device may stop transmitting the measurements and the procedure 200 may exit at 222. The control circuit of the sensor device may determine to stop transmitting in response to a triggering event. The triggering event may be the expiration of a predefined period of time for transmitting measurements and/or measuring environmental conditions. In another example, the control circuit of the sensor device may stop measuring the environmental conditions and transmitting in response to the sensor device receiving a triggering signal from another device. For example, the triggering signal may be a signal from a mobile device, a vacancy condition from an occupancy sensor in the location, or a failure to receive another occupancy condition after a predefined period of time. Alternatively, the sensor device may stop measuring the environmental conditions in response to receiving the triggering signal, but may continue to transmit stored values.

The sensor device may also, or alternatively, keep measuring the environmental conditions without transmitting. The sensor device may overwrite previously stored measurements with updated measurements to maintain storage in memory when a certain threshold of the memory has been reached. When a triggering event is received, the sensor device may begin the procedure 200 to transmit the measured values that have been stored in memory.

Using the procedure 200 shown in FIG. 2, the sensor device may transmit measured environmental conditions to a mobile device, such as mobile device 190 shown in FIG. 1A. Upon receiving the measured environmental condition(s), the mobile device may present a user of the mobile device with a survey that prompts the user to input their comfort levels with respect to the measured values. For example, for a given environmental condition, the mobile device may display the associated value, and may prompt the user to enter their comfort level (e.g., using a scale from least comfortable to most comfortable). The mobile device may store the measured values along with the associated comfort levels, and may later transmit the measured values and comfort levels. The measured values and the comfort levels may be transmitted along with the location identifier of the sensor(s) and/or an occupant identifier associated with the occupant or the occupant's mobile device to a system controller or a remote computing device for building a profile associated with the location and/or the occupant. The profile may include a preferred value for each of the measured environmental conditions. The system controller may use the measured values and the comfort levels to adjust the environmental conditions by controlling one or more devices in the location. For example, the system controller may send control instructions to lighting control devices to control the lights (e.g., brighter, dimmer, different color), to motorized window treatments to control a covering material, to a temperature control device to control an HVAC system, to a humidity control device to control a humidifier or dehumidifier, etc.

Figure 3:
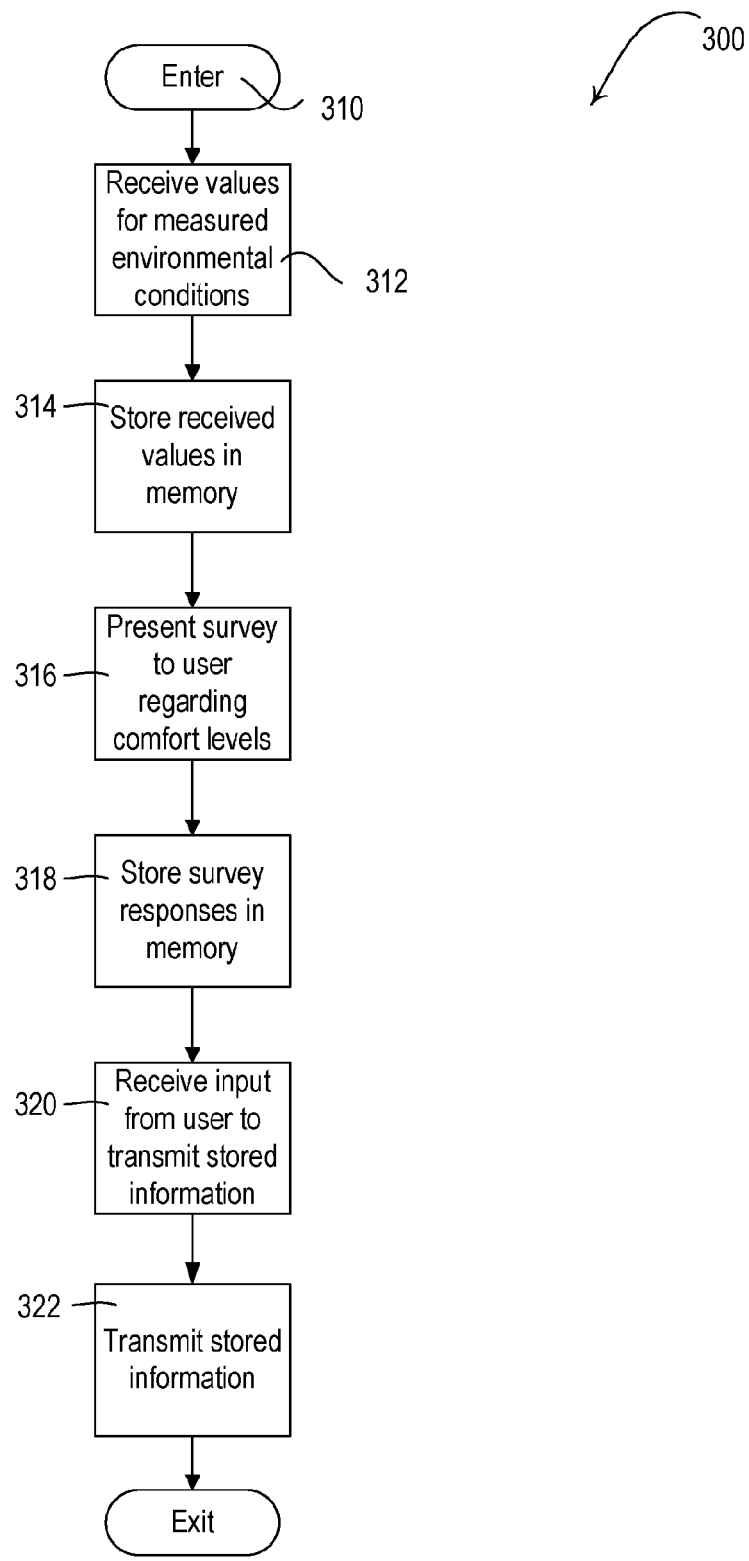
FIG. 3 is a flowchart depicting an example procedure for collecting measurements associated with one or more environmental conditions within a location and surveying a user regarding comfort levels to assist in controlling load control devices in the location.

FIG. 3 is a flowchart depicting an example procedure 300 for collecting measurements for one or more environmental conditions within a location and surveying a user regarding comfort levels to assist in controlling load control devices in the location. The procedure 300 may be performed by a mobile device in the load control system. For example, the mobile device may be the mobile device 190 shown in FIG. 1A. The procedure 300, or portions thereof, may be stored in memory as computer-executable or machine-executable instructions at the mobile device for performing as described herein. The mobile device may be associated with a unique identifier (e.g., an occupant identifier) that may be used to identify the mobile device and/or a user of the mobile device.

The procedure 300 may begin at 310. For example, the procedure 300 may begin in response to the mobile device receiving a signal, such as a beacon signal, from a sensor device, such as sensor devices 180a, 180b shown in FIG. 1A. The mobile device may come within proximity to the sensor device that is transmitting a beacon signal and the procedure 300 may begin at 310 in response to receiving the signal from the sensor device, or receiving the signal above a predefined threshold as described herein.

At 312, the mobile device may receive messages from the sensor device (e.g., via a communication circuit) that include values for one or more environmental conditions that have been measured by the sensor device. The messages may be received in a beacon signals or otherwise received via wireless communications. The messages that the mobile device receives from the sensor device may include information, for example, one or more measured values for one or more corresponding environmental conditions, a timestamp of a time at which the values were measured, and/or an identifier of the sensor device that may indicate its location. The environmental conditions may include, for example, a temperature of the location, a humidity of the location, color conditions of the light within the location (e.g., full-color values and/or color temperature values on one or more planes), and/or an intensity of the light within the location (e.g., on one or more planes).

At 314, the mobile device may store the information in the messages received from the sensor device in memory. For example, the mobile device may store one or more associations between the measured values, the timestamp(s), and/or the location identifier in memory. For a given environmental condition, the mobile device may store the measured value for that environmental condition, the time(s) at which the value was measured, and/or the location identifier. The mobile device may also determine and store a time at which the values were received at the mobile device from the sensor device.

At 316, the mobile device may present a survey to a user of the mobile device that prompts the user to enter the user's comfort level with one or more of the measured environmental conditions. The prompt may be provided upon the mobile device entering a predefined space, after the mobile device is stationary for a predefined period of time (e.g., 1 minute, five minutes, thirty minutes, an hour, etc.), and/or at predefined times of day. The mobile device itself may report its relative location and/or movement information to another device (e.g., the system controller and/or remote computing device) for being used to determine whether to present the survey to the user. In one example, for each environmental condition, the mobile device may present the user with a scale with a range of values, with the lowest value (e.g., 1) indicating the lowest comfort level and the highest value (e.g., 10) indicating the highest comfort level. The user may make selections on the scale indicating the user's comfort level with each environmental condition. The mobile device may present the survey using a local application executing thereon that accesses the measured environmental conditions for a corresponding location and/or having the most recent timestamp from memory at the mobile device.

If the user makes a selection that indicates a comfort level that is below a threshold value for a given environmental condition, the mobile device may present additional questions related to that environmental condition. For example, if the user indicates a comfort level that is below a predefined threshold for the temperature of the location, the mobile device may prompt the user to enter a preferred temperature, and/or may prompt the user to indicate whether the temperature is too high or too low.

At 318, the mobile device may store the user's responses to the survey in memory. The mobile device may store the responses with the measured values. The measured environmental conditions and the user's responses to the survey may be used to control the load control devices in the load control environment. For example, for a given environmental condition, the mobile device may store the measured value(s) for that environmental condition and the user's responses related to that environmental condition with the occupant identifier for building a profile for the user from which load control devices may be controlled to achieve a comfort level for the user. The measured values for environmental conditions and the user's responses to the survey may be stored with a location identifier associated with a sensor device for creating a user profile specific to the location. The survey responses may be stored with a timestamp for creating a user profile specific to the time of day, time of year, or another period of time. For example, the timestamp may indicate different user comfort levels at different times of day (e.g., warmer temperatures in the morning and cooler temperatures in the evening, greater lighting intensity in the morning and lower lighting intensity in the evening, etc.).

At 320, the mobile device may receive input from the user indicating that the mobile device should transmit the stored information to another computing device (e.g., a system controller 110 or another remote computing device 195). For example, the mobile device may prompt the user to save or transmit the information at the end of the survey. The user may cause the mobile device to transmit the stored information at the end of the survey by actuation of a button on the display of the mobile device. After the mobile device receives the input from the user at 320, the mobile device may transmit the stored information via a communication circuit to the other computing device at 322. For example, the mobile device may transmit the measured value for each environmental condition, the time at which each value was measured, the user's survey responses, the location identifier, and/or the occupant identifier. The mobile device may transmit the information as one or more messages via RF signals. After the mobile device transmits the information at 322, the procedure 300 may exit. The system controller may use the measured values and the comfort levels to adjust the environmental conditions by controlling one or more devices in the location. The system controller may use the location identifier associated with the sensor to determine one or more load control devices and/or electrical loads in the same location. For example, there may be a dataset (e.g., floorplan data) that correlates sensor devices and load control devices/loads in a given location, or area within a location. The system controller may perform control of the load control devices/loads that are correlated with the sensor devices in the location or area based on the measured values of those sensor devices and/or the user responses.

The user of the mobile device may move around different locations and collect the measured values that are being transmitted via beacon signals by multiple sensor devices. The beacon messages for each sensor device may include the location identifier that corresponds to the sensor device that is transmitting the beacon messages, so the measured values for each sensor device may be associated with the location identifier in memory of the mobile device. The measured values may be transmitted by the mobile device to another computing device for building a profile for the location and/or the user to control the load control devices in the system to achieve a comfort level for the profile.

As described herein, the space in which the sensor devices are located may include a collection device, such as collection device 185 shown in FIG. 1A, for collecting the measurements transmitted by one or more sensor devices. The collection device may have a fixed position, and may be associated with a given location (e.g., unlike the mobile device, which may have a variable position and may be associated with a given user). The collection device may be used to aggregate information received from one or more sensor devices and forward the information to a remote computing device and/or a system controller. While the information received by a mobile device and/or survey responses from the user of the mobile device may be used to build a profile for a specific user, the information received by a collection device may be used to build a profile for a specific location. For example, the sensor devices may transmit the measured values for one or more environmental conditions and the collection device may receive the measured values and store the values with a location identifier that corresponds to the collection device, a timestamp at which the values are measured, and/or a timestamp at which the values are received.

Figure 4:
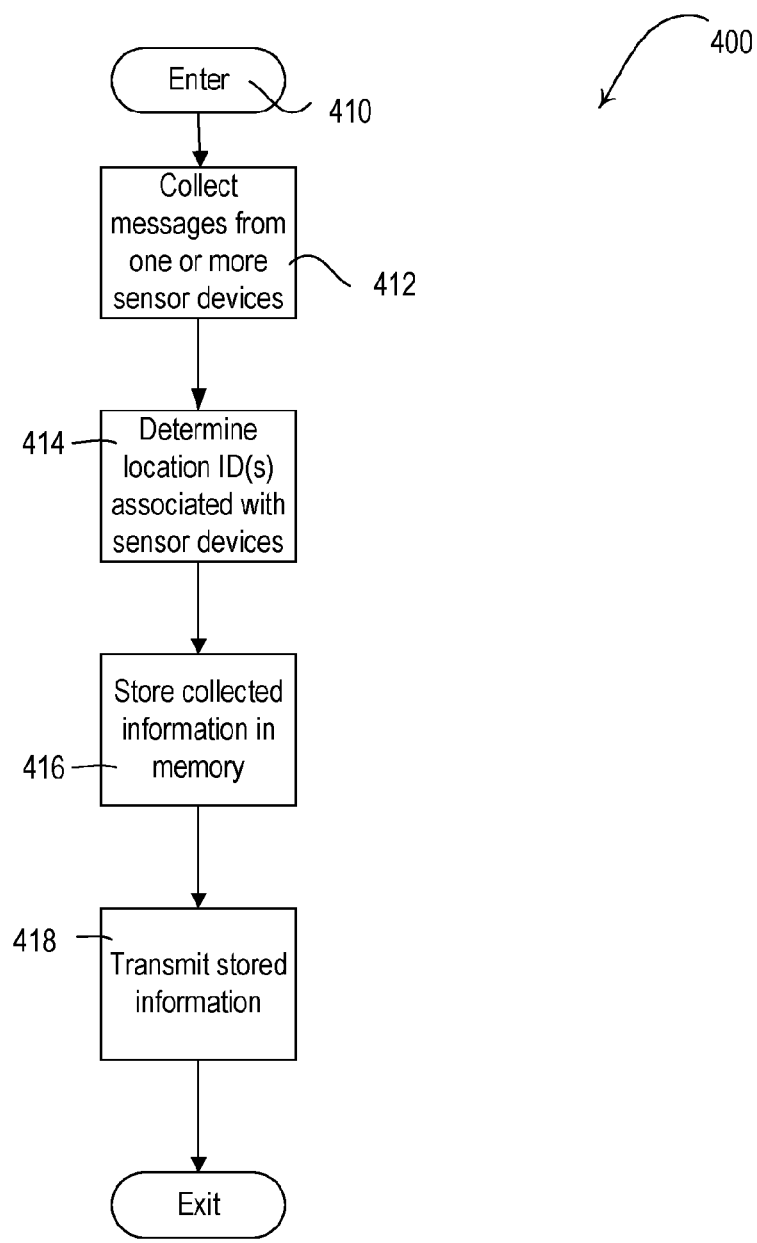
FIG. 4 is a flowchart depicting an example procedure for collecting information associated with one or more environmental conditions in a particular location.

FIG. 4 is a flowchart depicting an example procedure 400 that may be performed by a collection device, such as the collection device 185 shown in FIG. 1A, for collecting, processing, and transmitting the measured values for one or more environmental conditions. The collection device may be associated with a unique identifier (e.g., a location identifier) that may be used to identify the collection device (e.g., the location of the collection device). The procedure 400, or portions thereof, may be stored in memory as computer-executable or machine-executable instructions at the collection device for performing as described herein.

The procedure 400 may begin at 410. For example, the procedure 400 may be performed periodically at 410 after an expiration of a time period at the collection device. The period of time may allow the collection device to collect sensor measurements from one or more sensor devices after measurements have been performed over the time period. The time period may allow the collection device to enter a sleep state between collecting measurements. After each expiration of a period of time, the collection device may collect measurements from one or more sensor devices. For example, different sensor devices may be configured to transmit measurements on a different schedule to the collection device. In another example, the procedure 400 may begin at 410 after detection of updated measurements being beaconed from one or more sensor devices. In another example, the procedure 400 may begin at 410 in response to a signal from an input device or another computing device. For example, the collection device may receive a signal from the system controller, the remote computing device, and/or the mobile device of the user. The user may actuate a button on the mobile device that causes the mobile device to transmit a signal to the collection device to cause the procedure 400 to begin at 410. The mobile device may alternatively send a signal to the system controller and/or the remote computing device to cause the system controller and/or the remote computing device to send a signal to the collection device to cause the procedure 400 to begin at 410. The signal that is received to begin the procedure 400 at 410 may be received from an input device, such as a remote control device (e.g., in response to an actuation of a button) or an occupancy sensor (e.g., in response to detection of an occupancy condition or a vacancy condition).

At 412, the collection device may receive beacon messages being beaconed from one or more sensor devices (e.g., via a communication circuit). The sensor device(s) may be located within the load control system. The information that the collection device receives from the sensor device(s) may include, for example, one or more measured values corresponding to one or more environmental conditions, a timestamp of a time at which the values were measured, and/or a respective location identifier of each sensor device. The environmental conditions may include, for example, a temperature of the location, a humidity of the location, a color condition of the light within the location (e.g., full-color values and/or color temperature values measured on one or more planes), and/or an intensity of the light within the location (e.g., on one or more planes).

At 414, the control circuit of the collection device may determine a location identifier(s) associated with the sensor device(s) from which the information was received. For example, the collection device may receive the location identifier(s) from the sensor device(s). The location identifier(s) may be used to identify the location(s) of the sensor device(s). At 416, the collection device may store the information received from the sensor device(s) in memory. For example, the collection device may store information that may include the measured values, a timestamp indicating the time at which the information was received as determined by the collection device, the timestamp indicating the time at which the measurement was performed by the sensor device, the location identifier of the sensor device from which the measured values were received, and/or the location identifier of the collection device. In an example, for a given environmental condition, the collection device may store the measured value for that environmental condition, the time at which the value was measured, the time at which the value was received, the location identifier of the sensor device that measured the value, and/or the location identifier of the collection device. The collection device may aggregate the information received from multiple sensor devices. For example, if two or more sensor devices measured different values for the same environmental condition within a given time period of each other, the collection device may store the average of the measured values.

The collection device may transmit the stored information to the system controller or a remote computing device (e.g., directly or via a system controller) at 418. If the collection device receives information from multiple sensor devices, the collection device may transmit the information for each sensor device separately. For example, for a given sensor device, the collection device may transmit the measured value for each environmental condition, the time at which each value was measured, the time at which the value was received, the location identifier of the sensor device, and/or the location identifier of the collection device in a single batch transmission. Alternatively, the collection device may aggregate the information received from the multiple sensor devices, and may report a single value for each environmental condition. In another example, the collection device may collect several measured values from one or more sensor devices before transmitting the measured values. The collection device may transmit the information as one or more messages. Regardless of how measurements are sent, the collection device may transmit the information in response to a triggering event. For example, the system controller, the remote computing device, the mobile device or another device in the system may request one or more measured values from the collection device in a message. The message sent to the collection device may include a location identifier and/or a time period for which the measured values are requested. The triggering event may be an occupancy condition received by an occupancy sensor and communicated to the collection device directly or via another device, such as the system controller. The triggering event may be that the memory of the collection device reaches a predefined threshold, such that the collection device may transmit the information and begin to overwrite the information with updated information. After the collection device transmits the information at 418, the procedure 400 may exit.

The comfort level of the user may also be sent to the system controller, the remote computing device, the mobile device or another device in the system for performing analysis based on the measurements gathered by the collection device for performing control of one or more load control devices in the system. For example, the user of the mobile device may be prompted to provide an indication of the comfort level after the transmission of the measurements from the collection device, or the collection device may collect the information indicating the comfort level of the user and transmit this information with the measurements for enabling control or performing adjustments to the state of the load control devices in response to the information.

As described herein, the sensor device may be a battery powered device configured to measure environmental conditions, and may transmit the measured values as one or more beacon messages. The sensor device may be configured to measure the environmental conditions and/or transmit the measured values periodically to thereby save power at the sensor device. The sensor device may perform measurements at a first rate that is different than the rate at which transmissions may be performed via the beacon messages. For example, as the sensor device may await a longer period of time for taking measurements to allow for the environmental conditions to change, the sensor device may measure the environmental conditions after expiration of a first period of time and transmit the measured values via the beacon messages one or more times between each measurement after expiration of a second period of time. In an example embodiment, the first period of time for performing measurements may be approximately 60 seconds and the second interval for transmitting the measurements via beacon messages may be approximately 1 second. Additional power savings may be performed by increasing the amount of time between transmissions above a default amount (e.g., transmitting approximately once a second, rather than once every 100 milliseconds). In another example, the first period of time at which measurements are performed and the second period of time at which measurements are transmitted may be approximately the same, such that a beacon message is transmitted in a beacon signal to send a measurement that was just performed.

The sensor device performing the measurements at a different rate than the rate at which transmissions are performed may allow the sensor device to save batter life on the sensor device, while also allowing the user to enter a location with the user's mobile device, collect measurements, and communicate with other devices in the system to control the load control system (e.g., to preferred values). The transmission of the beacon messages being performed at a rate that is more frequent than the measurements may allow for faster detection of the measurements and more rapid responses to the measurements than if the sensor device were to wait for the performance of the next measurement to transmit a beacon. The more frequent transmission of the beacon messages also allows for a greater likelihood of successful transmission between measurements.

In an example, at an initial time (e.g., T=0 seconds), the sensor device may measure the environmental conditions and may transmit the measured values. For example, the sensor device may transmit the measured values at the initial time, or the sensor device may wait for a transmission period to pass before transmitting the measured values. After the transmission period has passed since the initial time (e.g., time T=1 second), the sensor device may transmit the measured values, and may repeat transmission of the measured values at each expiration of the transmission period thereafter (e.g., at T=2 seconds, T=3 seconds, T=4 seconds, etc.). After a measurement period has passed since the initial time (e.g., T=60 seconds), the sensor device may again measure one or more environmental conditions, and may transmit the updated measured values. The sensor device may then repeat transmission of the updated measured values at the expiration of each transmission period until the measurement period has expired again for performing one or more measurements (e.g., T=120 seconds). The sensor device may continue the pattern of performing measurements and transmitting the measured values in messages multiple times before performing another measurement. As described herein, the environmental conditions that are measured at each expiration of the measurement period may be different. For example, the measurement period for one or more environmental conditions may be a multiple of the measurement period for one or more other environmental conditions. In one example, the measurement period for measuring the temperature or humidity may be five times the measurement period for measuring the lighting conditions.

Figure 5:
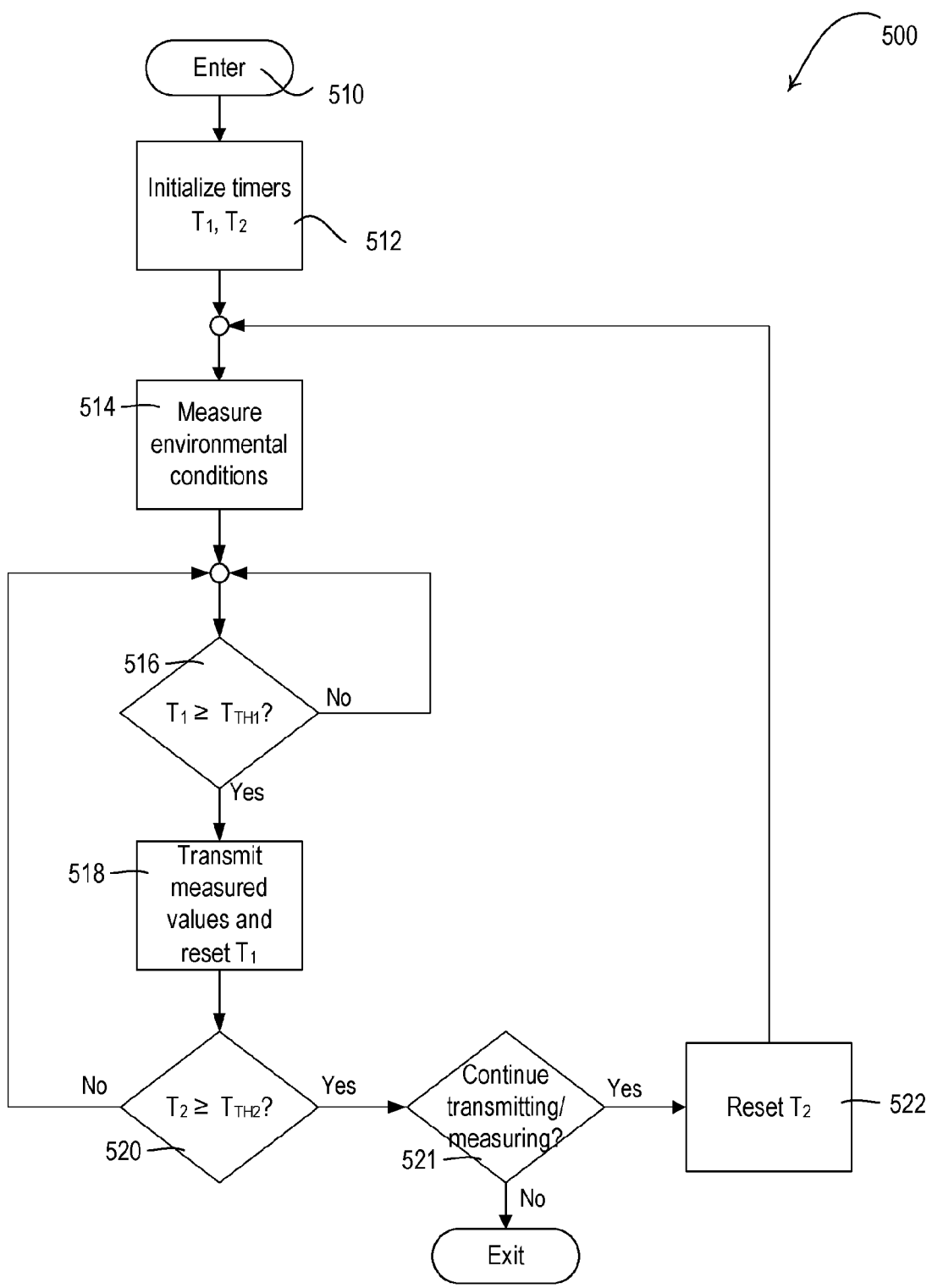
FIG. 5 is a flowchart depicting an example timing for performing a procedure for measuring one or more environmental conditions within a location.

FIG. 5 is a flowchart depicting an example procedure 500 for measuring and transmitting one or more environmental conditions. The procedure 500 may be performed by a sensor device in the load control system. For example, the sensor device may be the sensor devices 180a, 180b shown in FIG. 1A. The sensor device may be located on, for example, a wall, a ceiling, a desk, a computer, and/or another location. The procedure 500, or portions thereof, may be stored in memory as computer-executable or machine-executable instructions at the sensor device for performing as described herein.

The procedure 500 may begin at 510. For example, the procedure 500 may begin at 510 when the sensor device is powered on and/or activated for performing operation. The procedure 500 may begin at 510 in response to a triggering event. For example, the triggering event may be a startup of the sensor device, an expiration of a predefined period of time, or a triggering signal (e.g., a signal from a mobile device, an occupancy sensor, a remote computing device, or another device). The triggering event may be detected at the end of a procedure for linking to and/or pairing to (e.g., virtually link to and/or pair to) a mobile device or detecting a physical connection to the mobile device.

At 512, the sensor device may initialize a first timer $T_1$ and a second timer $T_2$. For example, the timer $T_1$ may be a transmission timer and the timer $T_2$ may be a measurement timer. At 514, the sensor device may measure one or more environmental conditions within the location. For example, the sensor device may include a control circuit and at least one sensor. The control circuit may measure the environmental condition via the sensor. For example, the sensor device may measure one or more of the temperature of the location, the humidity of the location, the light intensity of the location, and/or color conditions (e.g., full-color values and/or lighting intensity values) of the light within the location. The sensor device may measure the light intensity and/or color conditions of the light within the location on one or more or more planes (e.g., a horizontal plane and a vertical plane plane).

At 516, the sensor device may determine whether the first timer $T_1$ is greater than or equal to a first threshold $T_{TH1}$ defining a transmission period. For example, the value of the first threshold $T_{TH1}$ may be approximately 1 second or another transmission period. The value of the first threshold $T_{TH1}$ may be predefined at the sensor device or may be defined by an occupant. The first threshold $T_{TH1}$ may be used to ensure that the sensor device transmits the measured values at a regular interval. Once the first timer $T_1$ has reached the first threshold $T_{TH1}$, the sensor device may transmit the measured values (e.g., via a communication circuit) and may reset the first timer $T_1$ at 518. The sensor device may transmit the measured values at 514 after performing the measurement and then wait the transmission period of the first threshold $T_{TH1}$ before transmitting again, or may wait the transmission period of the first threshold $T_{TH1}$ before performing the initial transmission. The sensor device may transmit the measured values as one or more beacon messages that may be received by one or more mobile devices within the load control system (e.g., a mobile device, a system controller, a collection device, and/or another computing device).

At 520, the sensor device may determine whether the second timer $T_2$ is greater than or equal to a second threshold $T_{TH2}$ defining a measurement period. For example, the value of the second threshold $T_{TH2}$ may be approximately 60 seconds or another measurement period. The value of the second threshold $T_{TH2}$ may be predefined at the sensor device or may be defined by an occupant and stored at the sensor device (e.g., via configuration at the mobile device). The second threshold $T_{TH2}$ may be used to ensure that the sensor device measures the environmental conditions at a regular interval. As described herein, the sensor device may perform measurements of different environmental conditions on different intervals. For example, the second threshold $T_{TH2}$ may be set to a different value for some environmental conditions than for others. The second threshold $T_{TH2}$ defined for one or more environmental conditions may be a multiple of the second threshold $T_{TH2}$ defined for one or more other environmental conditions. Once the second timer $T_2$ has reached the second threshold $T_{TH2}$, the sensor device may measure the environmental conditions and may reset the second timer $T_2$ at 522. The procedure 500 may then return to 514 and may continue measuring environmental conditions and transmitting beacon messages. If the second timer $T_2$ has not reached the second threshold $T_{TH2}$ for performing one or more additional measurements at 520, the procedure 500 may return to 516 to determine whether to retransmit the previously measured environmental conditions at 518.

Before resetting the second timer $T_2$, the sensor device may determine, at 521, whether to continue measuring and/or transmitting environmental conditions. For example, the sensor device may continue to measuring environmental conditions until the procedure 500 exits. The sensor device may determine to stop transmitting in response to a triggering event. The triggering event may be the expiration of a predefined period of time for transmitting measurements and/or measuring environmental conditions. In another example, the sensor device may stop transmitting in response to the sensor device receiving a triggering signal from another device. For example, the triggering signal may be a signal from a mobile device, a vacancy condition from an occupancy sensor in the location, or a failure to receive an occupancy condition for a predefined period of time.

Figure 6:
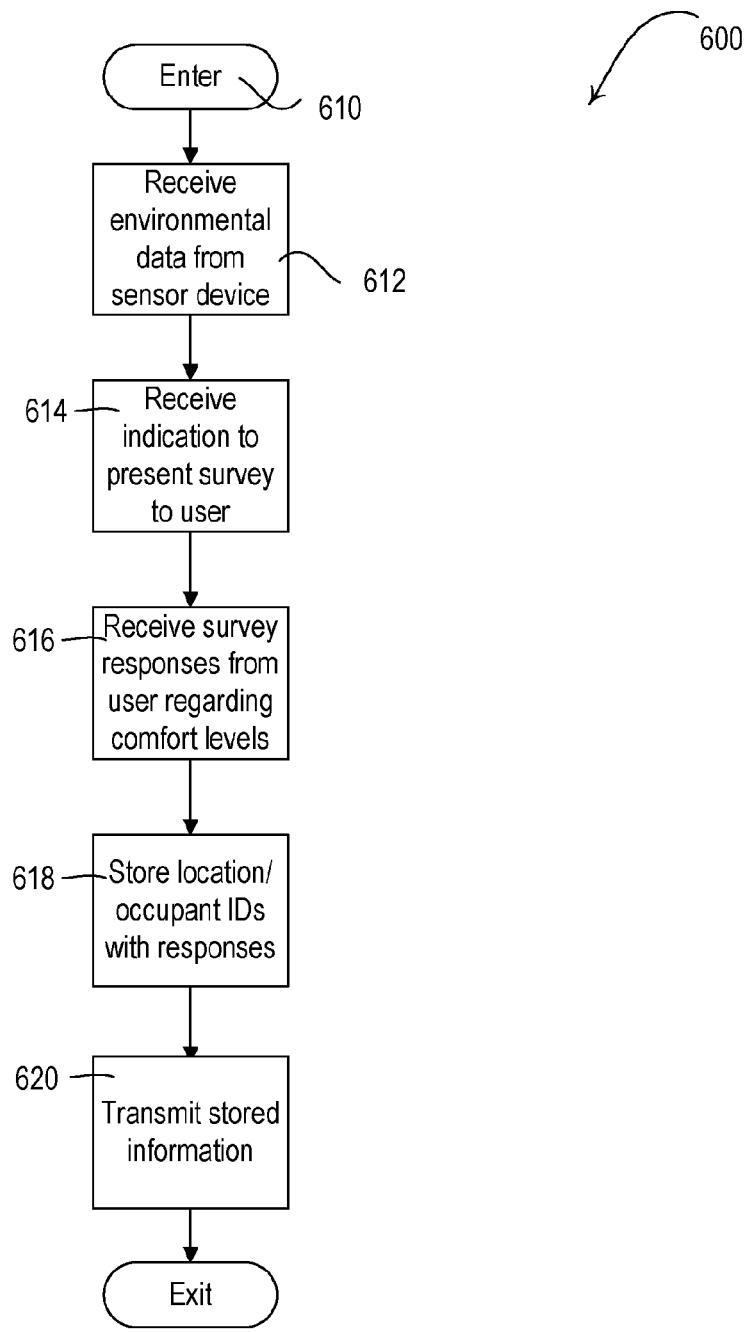
FIG. 6 is a flowchart depicting an example procedure for storing information regarding one or more measured environmental conditions in a location and survey responses received from an occupant of the location.

After the information measured by various sensor devices related to the environmental conditions of various locations in the system is received at a mobile device(s) in the load control system, the information may be stored by the load control system in a manner to maintain the information. The information may be stored in a manner be used to build a profile for a location and/or occupant to control load control devices in a manner to maintain a comfort level in the location and/or for the occupant. FIG. 6 is a flowchart depicting an example procedure 600 for storing information related to one or more measured environmental conditions in a location and survey responses received from an occupant of the location. The procedure 600 may be performed by a mobile device in the load control system. For example, the mobile device may be the mobile device 190 shown in FIG. 1A. The mobile device may be associated with a unique identifier (e.g., an occupant identifier) that may be used to identify the mobile device (e.g., a user of the mobile device). The procedure 600, or portions thereof, may be stored in memory as computer-executable or machine-executable instructions at the mobile device for performing as described herein.

The procedure 600 may begin at 610. For example, the procedure 600 may begin at 610 in response to the mobile device detecting a beacon from a sensor device or detecting the beacon at a signal strength above a predefined threshold. At 612, the mobile device may receive the information in the beacon messages being transmitted from the sensor device (e.g., via a communication circuit). The sensor device may be located within the load control system. The information that the mobile device receives from the sensor device may include, for example, one or more measured values for one or more corresponding environmental conditions, a timestamp of a time at which the values were measured as determined by the sensor, a timestamp of a time at which the values were received as determined by the mobile device, and/or a location identifier of the sensor device as provided by the sensor. The environmental conditions may include, for example, a temperature of the location, a humidity of the location, a color conditions of the light within the location (e.g., full-color values and/or color temperature values on one or more planes), and/or a lighting intensity of the light within the location (e.g., on one or more planes). The mobile device may receive the information via messages transmitted in beacon signals.

At 614, the mobile device may receive an indication to present a survey to the user of the mobile device (e.g., via the communication circuit). For example, the mobile device may receive the indication from a computing device (e.g., a system controller and/or a remote computing device), the indication may be received from the sensor device (e.g., in the form of a beacon signal transmitted from the sensor device), and/or the indication may be triggered locally at the mobile device (e.g., in response to an expiration of a period of time). The mobile device may receive the indication to present the survey when the mobile device (e.g., the user) enters the location, after the mobile device has been in the location for a predefined period of time, after receipt of the measured values or a predefined change in the measured values, and/or at a predefined time of day. For example, the mobile device may receive the indication 30 minutes after the user enters the location or receives beacon messages from a sensor device in the location. The mobile device may receive the indication at the same time that the mobile device receives the measured values. After the mobile device receives the indication, the mobile device may present the survey to the user via a display of the mobile device.

At 616, the mobile device may receive one or more survey responses from the user. For example, the survey responses may include the user's comfort level for one or more of the measured environmental conditions. For a given environmental condition, the survey responses may include a user's preferred value for that environmental condition and/or an indication of whether the value of the environmental condition should be increased or decreased in order to raise the user's comfort level with that environmental condition. For example, the survey may include the user's comfort level with the temperature of the location, the user's preferred temperature, and/or an indication that the current temperature is too high (e.g., should be decreased) or is too low (e.g., should be increased).

At 618, the mobile device may store the location identifier and/or the occupant identifier with the survey responses received from the user. For example, the mobile device may store the location identifier and/or the occupant identifier with the survey responses in memory. For a given environmental condition, the mobile device may create an association between the measured value for that environmental condition, the user's responses related to that environmental condition, the location identifier from the sensor, and/or the occupant identifier. The mobile device may store the associations comprising the measured values for the environmental conditions, the user's survey responses, and the location identifier and/or the occupant identifier in a memory of the mobile device. The mobile device may store the measured values and/or the survey responses with a timestamp that indicates a time at which the information is being stored, a timestamp that indicates the time at which the survey was taken, and/or a timestamp that indicates a time at which the values were measured.

At 620, the mobile device may transmit the stored information (e.g., via the communication circuit) to another computing device (e.g., a system controller and/or a remote computing device). For example, the mobile device may transmit the location identifier, the measured values, and/or the occupant identifier with the survey responses at 620. The stored information that is being transmitted may include the timestamp that indicates the time at which the information was stored. The mobile device may receive input from the user indicating that the mobile device should transmit the stored information to the remote computing device (e.g., directly or via a system controller). For example, the mobile device may prompt the user to indicate that the mobile device should transmit the stored information at the end of the survey. The mobile device may transmit the stored information as one or more messages via radio frequency signals. After the mobile device transmits the information at 620, the procedure 600 may exit.

Figure 7:
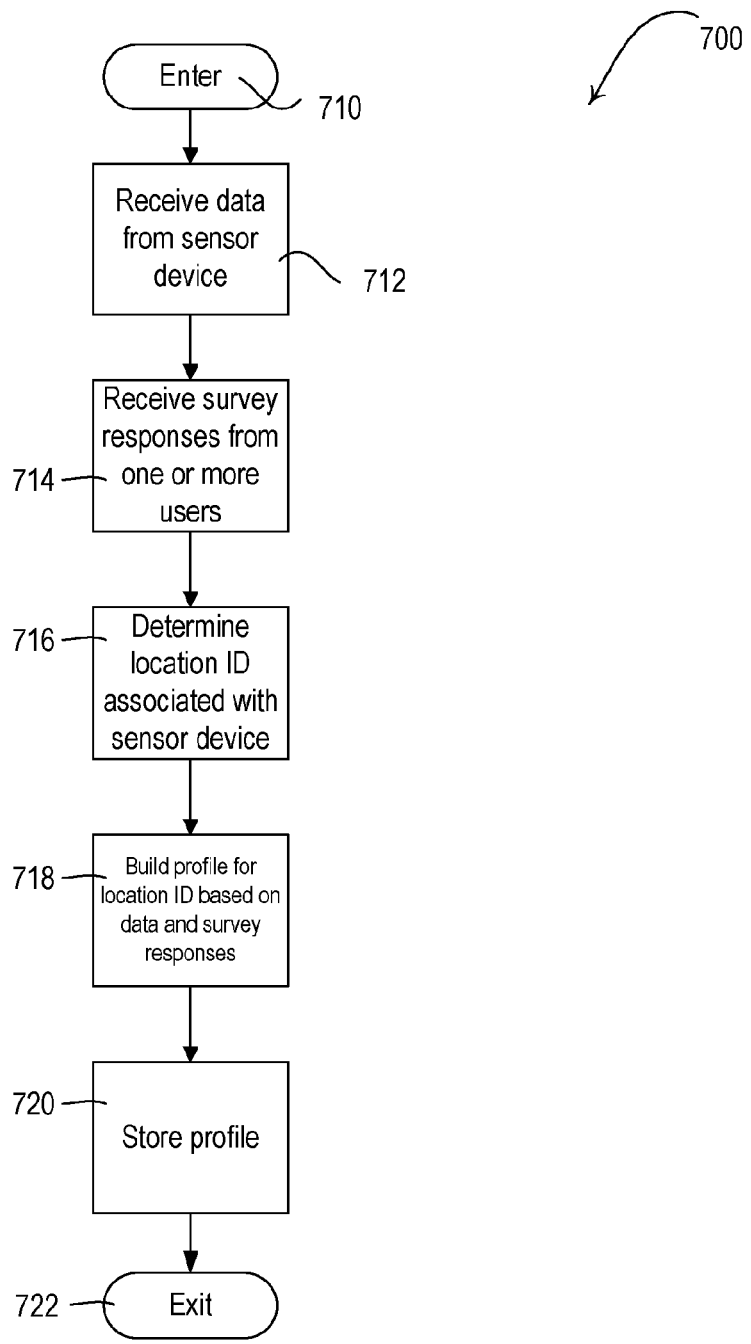
FIG. 7 is a flowchart depicting an example procedure for building a profile for a given location that includes preferred values for one or more environmental conditions within the location.
Figure 8:
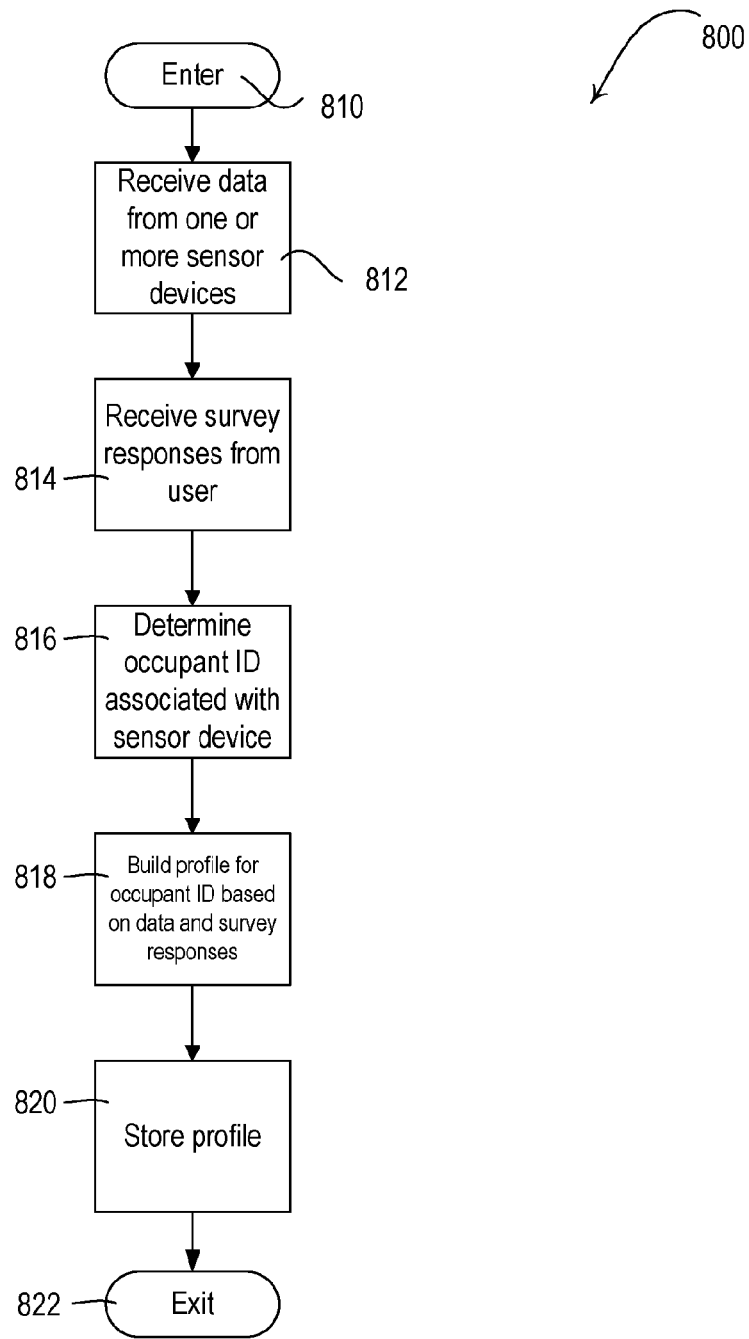
FIG. 8 is another flowchart depicting an example procedure for building a profile for a given user that includes preferred values for one or more environmental conditions within a location.

After the location identifier, the measured values, and/or the occupant identifier are transmitted with the survey responses to one or more computing devices (e.g., the remote computing device, the system controller, and/or another computing device), the computing device(s) (e.g., the remote computing device, the system controller, and/or another computing device) may use the received information to build a profile for the location in which the sensor device is located (e.g., based on the location identifier as shown in FIG. 7) and/or for the user of the mobile device (e.g., based on the occupant identifier as shown in FIG. 8). The profiles may be used to control one or more loads in the location. For example, the profile may include preferred values for the environmental conditions within the location. The profile may be updated as the one or more computing device(s) receive more values and/or survey responses.

The profiles may be used to control one or more load control devices toward achieving a comfort level in the location. For example, when a given user enters the location, the mobile device may receive a beacon that includes the location identifier and/or the measured values and may send a message that includes the occupant identifier, the measured values, and the location identifier to the remote computing device, the system controller, or another computing device, to cause the computing device to access the profile associated with the occupant identifier, and to transmit control instructions to one or more load control devices based on the profile. The control instructions may be configured to cause the load control devices to modify the environmental conditions within the location if the preferred values in the profile differs from a current measured value. For example, the remote computing device may determine that the preferred temperature associated with the user's profile is lower than the current temperature that is received from the mobile device, and the remote computing device may transmit control instructions to an HVAC system (e.g., via a thermostat and/or a system controller) configured to decrease the temperature until the temperature matches the preferred temperature or comes within a predefined threshold. If the profile is for a given location, the remote computing device, the system controller, or another computing device, may transmit control instructions to the load control devices configured to cause the environmental conditions within the location to be maintained at the preferred values for that location.

FIG. 7 and FIG. 8 show flowcharts of example procedures for building and storing profiles from which the load control devices in the location may be controlled. FIG. 7 is a flowchart depicting an example procedure 700 for building a profile for a given location that includes preferred values for one or more environmental conditions within the location. The procedure 700 may be performed by a computing device (e.g., a remote computing device, system controller, and/or another computing device) in the load control system. For example, the remote computing device may be configured to receive information from one or more sensor devices and/or mobile devices located within the load control system for building a profile. Though the remote computing device and/or the system controller may be described as performing certain portions of the procedure 700, another computing device may perform such portions. Additionally, although a single computing device may be described as performing one or more features herein, one or more computing devices may similarly be implemented. The procedure 700, or portions thereof, may be stored in memory as computer-executable or machine-executable instructions at remote computing device, the system controller, and/or another computing device for performing as described herein.

The procedure 700 may begin at 710. At 712, the remote computing device and/or the system controller may receive information (e.g., via a communication circuit) from a sensor device (e.g., via a mobile device). The sensor device may be located within the load control system. The information that the remote computing device and/or the system controller receives from the sensor device/mobile device may include, for example, one or more measured values corresponding to one or more environmental conditions, a respective timestamp of a time at which each value was measured, a respective timestamp of a time at which each value was stored at the mobile device, and/or a location identifier or other unique identifier of the sensor device. The environmental conditions may include, for example, a temperature of the location, a humidity of the location, a color condition of the light within the location (e.g., full-color values and/or color temperature values on one or more planes), and/or an intensity of the light within the location (e.g., on one or more planes). The remote computing device and/or the system controller may receive the information via radio frequency signals.

At 714, the remote computing device and/or the system controller may receive survey responses (e.g., via the communication circuit) from one or more users of mobile devices located within the location (e.g., via a mobile device and/or a system controller). Each mobile device (e.g., each user) may be associated with a respective occupant identifier, and a given survey response may be associated with the occupant identifier of the user that gave that survey response. The survey responses for a given user may indicate the user's comfort level with one or more of the environmental conditions within the location, the user's preferred value for one or more of the environmental conditions, and/or one or more indications that a respective environmental condition should be increased or decreased. Each mobile device may transmit the information that the mobile device receives from the sensor device (e.g., at 322 of the procedure 300 shown in FIG. 3) along with the survey responses from the user of that mobile device. For example, each mobile device may transmit the information and the survey responses (e.g., at 620 of the procedure 600 shown in FIG. 6).

At 716, the remote computing device and/or the system controller may determine a location identifier associated with the sensor device from which the information was received. For example, the remote computing device and/or the system controller may receive the location identifier from the sensor device (e.g., via a mobile device). The location identifier may be used to identify the location of the sensor device. At 718, the remote computing device and/or the system controller may build a profile for the location based on the information received from the sensor device and the survey responses.

The profile may be built to track the changes in the value of one or more environmental conditions in a location over a predefined period of time. For example, the remote computing device and/or the system controller may receive the measured values for one or more environmental conditions from one or more sensor devices in the location and build a profile that stores the changes in the measured values over a day, a season, a year, and/or another period of time. When the measurements are received from multiple sensor devices, the profile may indicate non-uniformities greater than a threshold (e.g., which may be different for different types of measurements, locations, periods of time) in the measurements throughout the location at a specific time or over periods of time. The non-uniformities may be indicated to a user (e.g., via the display of the mobile device), such that the user may be alerted of the non-uniformities. The profile may include preferred values for the environmental conditions within the location. The profile may include one or more associations between environmental conditions and respective preferred values for each environmental condition. The remote computing device and/or the system controller may build the profile by determining preferred values for the environmental conditions based on the survey responses. The remote computing device and/or the system controller may use the measured values and the comfort levels from the survey to determine the preferred values, as described herein. For example, the remote computing device and/or the system controller may predict the preferred value or range of values for an environmental condition in the location using regression analysis based on user(s) responses to the surveys. A regression model may be implemented to predict the preferred value or range, in an example. If the preferred value for a given environmental condition differs from the current value, the remote computing device and/or the system controller may use the profile to generate control instructions that are configured to cause one or more load control devices to modify the environmental condition to match the preferred value or come within a predefined range of the preferred value. The remote computing device and/or the system controller may generate control instructions for modifying the environmental condition and send the control instructions to one or more load control devices. The remote computing device and/or the system controller may continue to monitor the environmental condition and may update the control instructions for being sent to the one or more load control devices until the environmental condition matches the preferred value or comes within a predefined range of the preferred value.

For each environmental condition, the profile may include multiple preferred values, and one or more factors may be used to determine the correct preferred value at any given time. The factors may include, for example, the time of day, the day of the week, the date, the vacancy condition of the location, and/or one or more other factors. For example, the preferred value for the intensity of the light within the location may be higher during the week and during working hours (e.g., 9 AM to 5 PM) and lower during weekends and outside of working hours (e.g., 5 PM to 9 AM). In another example, the preferred value for the temperature of the location may be different when the location is vacant as compared to when the location is occupied (e.g., one or more occupants are in the location) and/or at different times of day. The remote computing device and/or the system controller (e.g., or any other computing device) may select a preferred value for a given environmental condition based on the factors.

After the remote computing device and/or the system controller builds the profile at 718, the remote computing device and/or the system controller may store the profile at 720. The remote computing device and/or the system controller (e.g., or any other computing device) may access the profile and may later use the profile to determine preferred values for the environmental conditions or otherwise identify values in the profile for controlling the electrical loads in the load control system. The remote computing device and/or the system controller may adjust the environmental conditions (e.g., immediately) to the preferred values upon receiving the survey responses from the user. Additionally and/or alternatively, the remote computing device and/or the system controller may adjust the environmental conditions to the preferred values when the user enters the location, and may maintain the environmental conditions at the preferred values as long as the user is in the space. As the remote computing device and/or the system controller continues to receive further measured values and survey responses, the remote computing device and/or the system controller may update the profile. The procedure 700 may end at 722.

As disclosed herein, a remote computing device, the system controller and/or one or more other computing devices, may build a profile for a given location. In addition, or alternatively, the remote computing device, the system controller, and/or one or more other computing devices, may build a profile for a given user (e.g., based on a unique occupant identifier associated with the user and/or the user's mobile device). The remote computing device and/or the system controller may receive environmental condition information from one or more sensor devices and survey responses regarding the user's comfort levels with the environmental conditions from the user's mobile device. The remote computing device and/or the system controller may determine one or more preferred values for the environmental conditions based on the sensor information and the survey responses. If the user later re-enters a given location, and the preferred value for a given environmental condition differs from the current value, the remote computing device and/or the system controller may use the profile to generate control instructions that are configured to cause one or more load control devices to modify the environmental condition to match the preferred value or come within a predefined range of the preferred value. The remote computing device and/or the system controller may compare the preferred value for the environmental condition in the user profile with a preferred value or range of values for the environmental condition that is stored in a location profile associated with the location. The remote computing device and/or the system controller may generate control instructions that are configured to cause one or more load control devices to modify the environmental condition to come within a predefined range of the preferred value or range of values for the environmental condition that is stored in a location profile.

FIG. 8 is a flowchart depicting an example procedure 800 for building a profile for a given user that includes preferred values for one or more environmental conditions within a location. The procedure 800 may be performed by a computing device (e.g., a remote computing device and/or system controller) in the load control system. The remote computing device and/or the system controller may be configured to receive information from one or more sensor devices and/or mobile devices located within the load control system. Though the remote computing device and/or the system controller may be described as performing certain portions of the procedure 800, another computing device may perform such portions. Additionally, although a single computing device may be described as performing one or more features herein, one or more computing devices may similarly be implemented. The procedure 800, or portions thereof, may be stored in memory as computer-executable or machine-executable instructions at the remote computing device, the system controller, and/or another computing device for performing as described herein.

The procedure 800 may begin at 810. At 812, the remote computing device and/or the system controller may receive information (e.g., via a communication circuit) from one or more sensor devices (e.g., via a mobile device and/or a system controller). The sensor devices may be located within the load control system. The information that the remote computing device and/or the system controller receives from the sensor devices may include, for example, one or more measured values for corresponding environmental conditions, a respective timestamp of a time at which each value was measured, a respective timestamp of a time at which each value was received at the mobile device, and/or a respective location identifier of each sensor device. The environmental conditions may include, for example, a temperature of the location, a humidity of the location, a color condition (e.g., full-color values and/or color temperature values) of the light within the location (e.g., on two or more planes), and/or a lighting intensity of the light within the location (e.g., on two or more planes). The remote computing device and/or the system controller may receive the data via radio frequency signals (e.g., Bluetooth Low Energy signals). If there are two or more sensor devices, the sensor devices may be associated with different locations, and each sensor device may transmit measured values of environmental conditions within its respective location. The remote computing device and/or the system controller may store a timestamp indicating the time at which the information is received and/or a timestamp indicating the time at which the information is received at the mobile device.

At 814, the remote computing device and/or the system controller may receive survey responses (e.g., via a communication circuit) from a user of a mobile device in the same location as one or more of the sensor devices (e.g., via a mobile device and/or a system controller). The mobile device (e.g., the user) may be associated with a respective occupant ID, and the survey responses may be stored with the occupant ID. The survey responses may indicate the user's comfort level with one or more of the environmental conditions within the location, the user's preferred value for one or more of the environmental conditions, and/or one or more indications that a respective environmental condition should be increased or decreased. The mobile device may transmit the information that the mobile device receives from a sensor device (e.g., at 322 of the procedure 300 shown in FIG. 3) along with the survey responses. For example, the mobile device may transmit the information and the survey responses (e.g., at 620 of the procedure 600 shown in FIG. 6).

At 816, the control circuit of the remote computing device and/or the system controller may determine the occupant identifier associated with the mobile device from which the information was received. For example, the remote computing device and/or the system controller may receive the occupant identifier from the mobile device (e.g., via a system controller). The occupant identifier may be used to identify the mobile device and/or the user. At 818, the control circuit of the remote computing device and/or the system controller may build a profile for the user based on the information received from the sensor device and the survey responses. For example, the profile may include the user's preferred values for the environmental conditions within a location. The profile may include one or more associations between environmental conditions and respective preferred values for each environmental condition. The remote computing device and/or the system controller may build the profile by determining preferred values for the environmental conditions based on the survey responses. The remote computing device and/or the system controller may use the measured values and the comfort levels to determine the preferred values, as described herein. For example, the remote computing device and/or the system controller may predict the preferred value or range of values for an environmental condition using regression analysis based on the user's response to the surveys. A regression model may be implemented to predict the preferred value or range, in an example. The remote computing device and/or the system controller may use the profile to modify one or more of the environmental conditions when the user enters a location. For example, the remote computing device and/or the system controller may generate control instructions that are configured to cause one or more load control devices in the location to modify the environmental condition to match the associated preferred value. The remote computing device and/or the system controller may adjust the environmental conditions to the preferred values upon receiving the survey responses from the user.

For each environmental condition, the profile may include multiple preferred values, and one or more factors may be used to determine the correct preferred value at any given time. The factors may include, for example, the time of day, the day of the week, the date, the vacancy condition of the location, and/or one or more other factors. For example, the user's preferred value for the temperature of a given location may be higher in the winter and lower in the summer. In another example, the user's preferred value for the color temperature of the light within a given location may be warmer (e.g., lower) in the morning and colder (e.g., higher) in the afternoon. The remote computing device and/or the system controller may select a preferred value for a given environmental condition based on the factors.

After the remote computing device and/or the system controller builds the profile at 818, the remote computing device and/or the system controller may store the profile at 820. The remote computing device and/or the system controller may access the profile and may later use the profile to determine preferred values for the environmental conditions. As the remote computing device and/or the system controller continues to receive further measured values and survey responses from the user, the remote computing device and/or the system controller may update the profile with new preferred values. The procedure 800 may end at 822.

The remote computing device and/or the system controller may use the information in the profile of the occupant and/or the profile of the location to control one or more load control devices in the location upon detecting that the occupant has entered the location. For example, one or more sensor devices may detect the occupant identifier from the occupant's mobile device. The remote computing device and/or the system controller may compare the preferred values of the environmental conditions in the profile(s), generate control instructions for modifying the environmental condition, and send the control instructions to one or more load control devices. The remote computing device and/or the system controller may continue to monitor the environmental condition and may update the control instructions for being sent to the one or more load control devices until the environmental condition matches the preferred value or comes within a predefined range of the preferred value.

Figure 9:
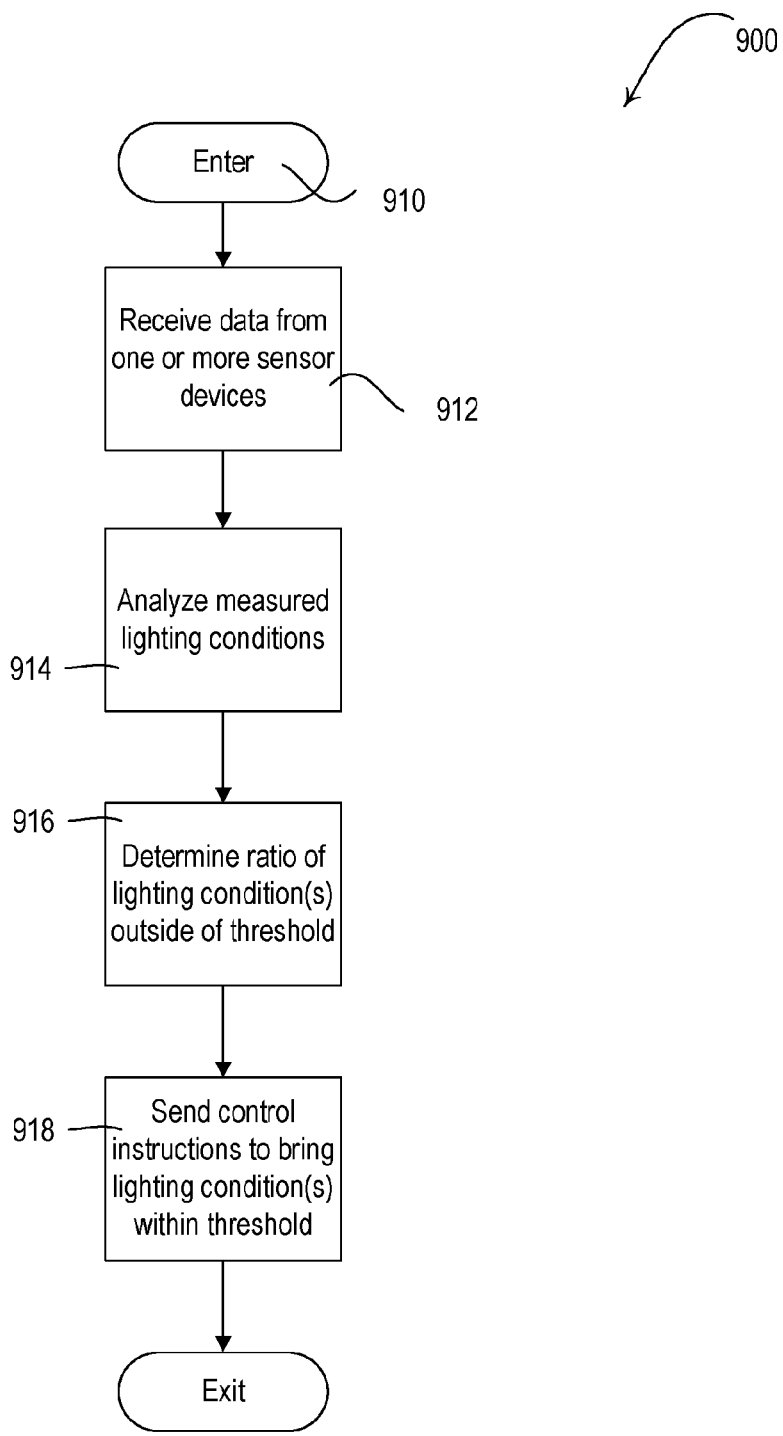
FIG. 9 is a flowchart depicting an example procedure for maintaining a ratio of one or more lighting conditions measured in different directions.

FIG. 9 is a flowchart depicting an example procedure 900 for maintaining a ratio of one or more lighting conditions measured in different directions. The procedure 900 may be performed by one or more computing devices (e.g., a remote computing device, a system controller, a mobile device, etc.) and/or load control devices in the load control system. Though the remote computing device and/or the system controller may be described as performing certain portions of the procedure 900, another computing device may perform such portions. Additionally, although a single computing device may be described as performing one or more features herein, one or more computing devices may similarly be implemented. The procedure 900, or portions thereof, may be stored in memory as computer-executable or machine-executable instructions at one or more load control devices, the remote computing device, the system controller, and/or another computing device for performing as described herein.

The procedure 900 may begin at 910. For example, the procedure 900 may begin at 910 after a predefined period of time and/or after receiving an indication of measurements to be received. At 912, the remote computing device and/or the system controller may receive data from one or more sensor devices. The data may include measurements that are collected by a mobile device and/or a collection device. The data may include one or more measured lighting conditions. The lighting conditions may include color conditions, such as full-color values and/or color temperature values, lighting intensity values, and/or other lighting conditions. The lighting conditions may be measured in two or more different directions. For example, the data that is received at 912 may include an identifier of a direction, a sensor, and/or a light pipe from which the lighting conditions were measured at the sensor device. The remote computing device and/or the system controller may analyze the lighting conditions at 914. The measured lighting conditions may include lighting conditions measured on the horizontal plane and/or lighting conditions measured on the vertical plane, though lighting conditions measured in other directions may be similarly analyzed.

At 916, the remote computing device and/or the system controller may determine that a ratio of one or more lighting conditions that are measured in different directions are outside of a predefined threshold. The predefined threshold may be different for different lighting conditions. The ratio of one or more lighting conditions may refer to the ratio of light measured on the vertical plane to light measured on the horizontal plane for one or more lighting conditions. However, the ratio of one or more lighting conditions may refer to the ratio of light measured in other directions or on other planes.

The remote computing device and/or the system controller may analyze the ratio of the lighting conditions for sending control instructions to one or more lighting control devices to adjust the ratio when the ratio is determined to be outside of the predefined threshold at 916. The remote computing device and/or the system controller may generate control instructions configured to adjust the lighting conditions of one or more lighting loads to bring the ratio of the lighting conditions within the predefined threshold and send the control instructions to the lighting control devices of the one or more lighting loads at 918. For example, the remote computing device and/or the system controller may transmit the control instructions for changing the color (e.g., full-color and/or color temperature) and/or lighting intensity of one or more lighting loads. The remote computing device and/or the system controller may identify the intensity and/or color temperature value of the light being received through a window from the data received from the one or more sensors and may send control instructions to one or more motorized window treatments to open or close a covering material to adjust the ratio based on the light being received through the window. The control instructions may be sent to identified lighting control devices in a particular zone, area, or location to adjust the ratio. As described herein, one or more lighting control devices may be stored in memory with a corresponding sensor from which the measurements may be received in the data. The control instructions may be sent to the identified lighting control devices stored win memory with the corresponding sensor having measurement values that are determined to be affecting the ratio, or affecting the ratio the greatest (e.g., sensors having measurement values with largest difference in lighting condition(s) from other sensors). The control instructions may be sent as a single message or multiple messages that continue to change the lighting conditions as the remote computing device and/or the system controller continues to monitor the ratio of the lighting conditions while the lighting control devices incrementally control their respective lighting loads.

Figure 10:
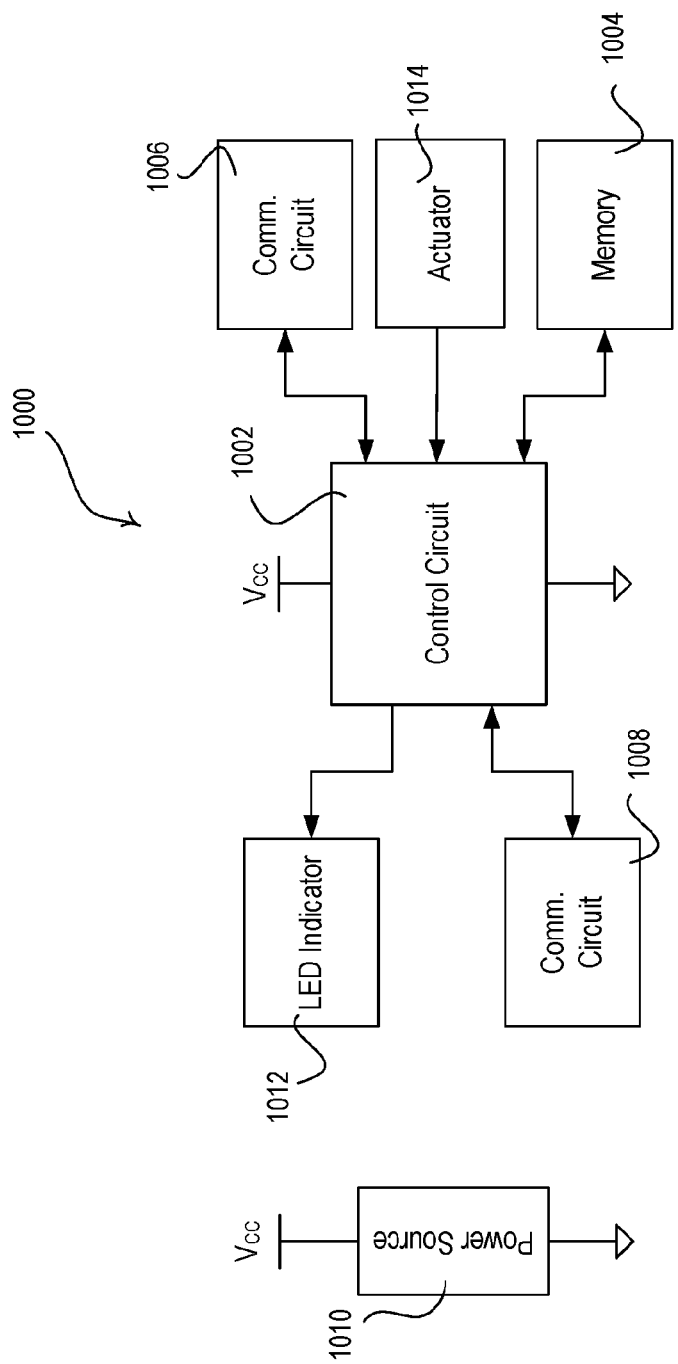
FIG. 10 is a block diagram depicting an example computing device.

FIG. 10 is a block diagram illustrating an example computing device 1000. For example, the computing device 1000 may be a system controller (such as system controller 110, described herein), a remote computing device (such as remote computing device 195), a collection device, and/or another computing device as described herein. The computing device 1000 may include a control circuit 1002 for controlling the functionality of the computing device 1000. The control circuit 1002 may include one or more general purpose processors, special purpose processors, conventional processors, digital signal processors (DSPs), microprocessors, integrated circuits, a programmable logic device (PLD), application specific integrated circuits (ASICs), or the like. The control circuit 1002 may perform signal coding, data processing, image processing, power control, input/output processing, or any other functionality that enables the computing device 1000 to perform as described herein. The control circuit 1002 may store information in and/or retrieve information from the memory 1004. The memory 1004 may include a non-removable memory and/or a removable memory. The non-removable memory may include random-access memory (RAM), read-only memory (ROM), a hard disk, or any other type of non-removable memory storage. The removable memory may include a subscriber identity module (SIM) card, a memory stick, a memory card, or any other type of removable memory. The memory 1004 may include computer-executable and/or machine-executable instructions that may be accessed by the control circuit 1002 for operating a computing device, as described herein.

The computing device 1000 may include a first communication circuit 1006 for transmitting and/or receiving information. The first communication circuit 1006 may perform wireless and/or wired communications on a first wireless communication link and/or network (e.g., a network wireless communication link). The computing device 1000 may also, or alternatively, include a second communication circuit 1008 for transmitting and/or receiving information. The second communication circuit 1008 may perform wireless and/or wired communications via a second wireless communication link and/or network (e.g., a short-range wireless communication link). The first and second communication circuit 1006, 1008 may be in communication with control circuit 1002. The communication circuits 1006 and 1008 may include RF transceivers or other communications modules configured to performing wireless communications via an antenna. The communication circuit 1006 and communication circuit 1008 may be configured to performing communications via the same communication channels or different communication channels. For example, the first communication circuit 1006 may be configured to communicating (e.g., with control devices and/or other devices in the load control system) via the first wireless communication link and/or network using a first wireless communication protocol (e.g., a network wireless communication protocol, such as the CLEAR CONNECT and/or THREAD protocols) and the second communication circuit 1008 may be configured to communicating (e.g., with a mobile device, a sensor device, and/or another device) via the second wireless communication channel and/or network using a second wireless communication protocol (e.g., a short-range wireless communication protocol, such as the BLUETOOTH and/or BLUETOOTH LOW ENERGY (BLE) protocols).

The control circuit 1002 may be in communication with an LED indicator 1012 for providing indications to a user. The control circuit 1002 may be in communication with an actuator 1014 (e.g., one or more buttons) that may be actuated by a user to communicate user selections to the control circuit 1002. For example, the actuator 1014 may be actuated to put the control circuit 1002 in an association mode and/or communicate association messages from the computing device 1000.

Each of the modules within the computing device 1000 may be powered by a power source 1010. The power source 1010 may include an AC power supply or DC power supply, for example. The power source 1010 may generate a supply voltage Vcc for powering the modules within the computing device 1000.

Figure 11:
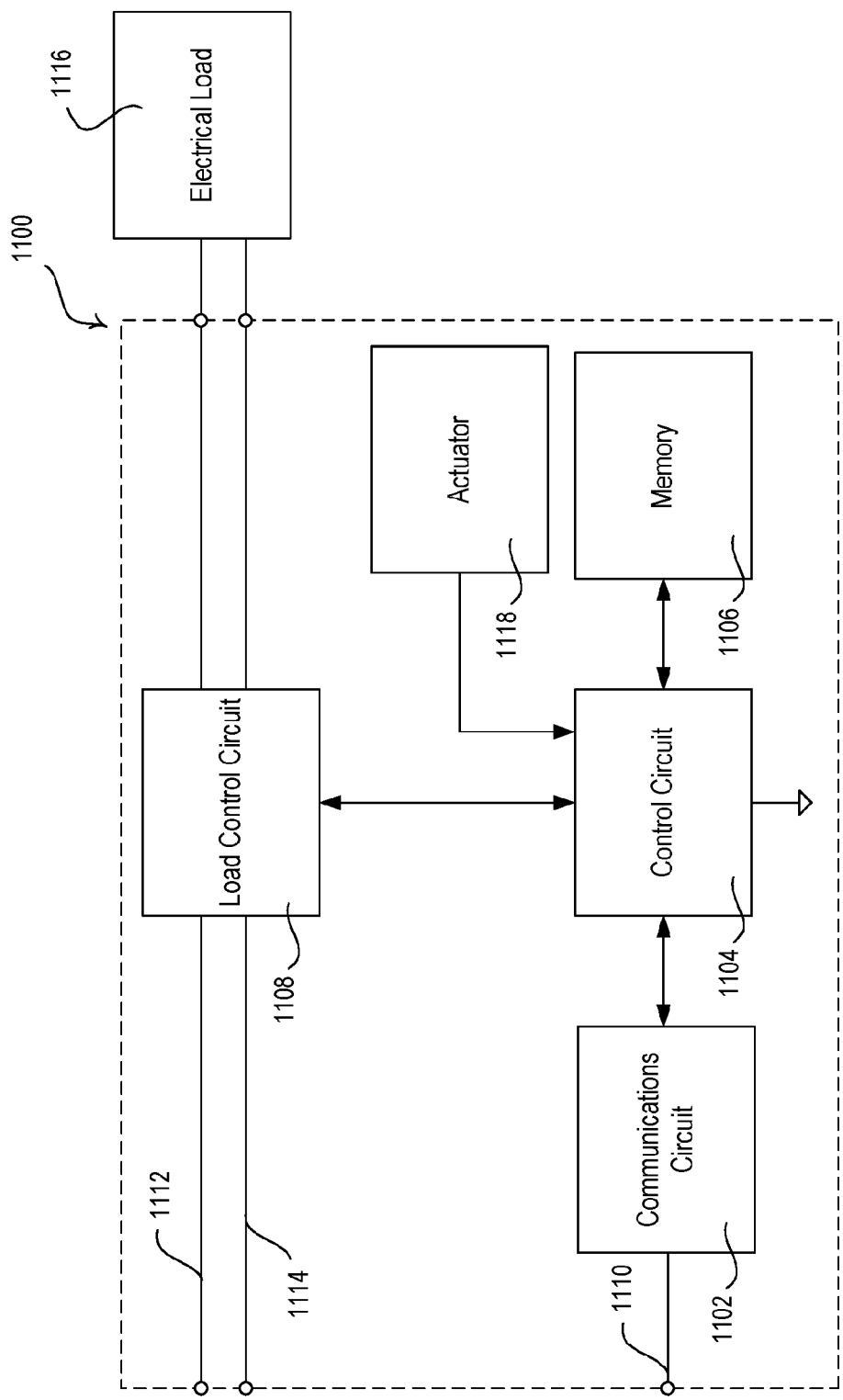
FIG. 11 is a block diagram depicting an example load control device.

FIG. 11 is a block diagram illustrating an example load control device 1100, as described herein. The load control device 1100 may be a dimmer switch, an electronic switch, an electronic ballast for lamps, an LED driver for LED light sources, an AC plug-in load control device, a temperature control device (e.g., a thermostat), a motor drive unit for a motorized window treatment, or other load control device. The load control device 1100 may include a communication circuit 1102. The communication circuit 1102 may include a receiver, an RF transceiver, or other communications module configured to performing wired and/or wireless communications via communications link 1110. The communication circuit 1102 may be in communication with control circuit 1104. The control circuit 1104 may include one or more general purpose processors, special purpose processors, conventional processors, digital signal processors (DSPs), microprocessors, integrated circuits, a programmable logic device (PLD), application specific integrated circuits (ASICs), or the like. The control circuit 1104 may perform signal coding, data processing, power control, input/output processing, or any other functionality that enables the load control device 1100 to perform as described herein.

The control circuit 1104 may store information in and/or retrieve information from the memory 1106. For example, the memory 1106 may maintain a registry of associated control devices and/or control instructions. The memory 1106 may include a non-removable memory and/or a removable memory. The memory 1106 may include computer-executable and/or machine-executable instructions that may be accessed by the control circuit 1104 for operating a load control device, as described herein. The load control circuit 1108 may receive instructions from the control circuit 1104 and may control the electrical load 1116 based on the received instructions. The load control circuit 1108 may send status feedback to the control circuit 1104 regarding the status of the electrical load 1116. The load control circuit 1108 may receive power via the hot connection 1112 and the neutral connection 1114 and may provide an amount of power to the electrical load 1116. The electrical load 1116 may include any type of electrical load.

The control circuit 1104 may be in communication with an actuator 1118 (e.g., one or more buttons) that may be actuated by a user to communicate user selections to the control circuit 1104. For example, the actuator 1118 may be actuated to put the control circuit 1104 in an association mode and/or communicate association messages from the load control device 1100.

Figure 12:
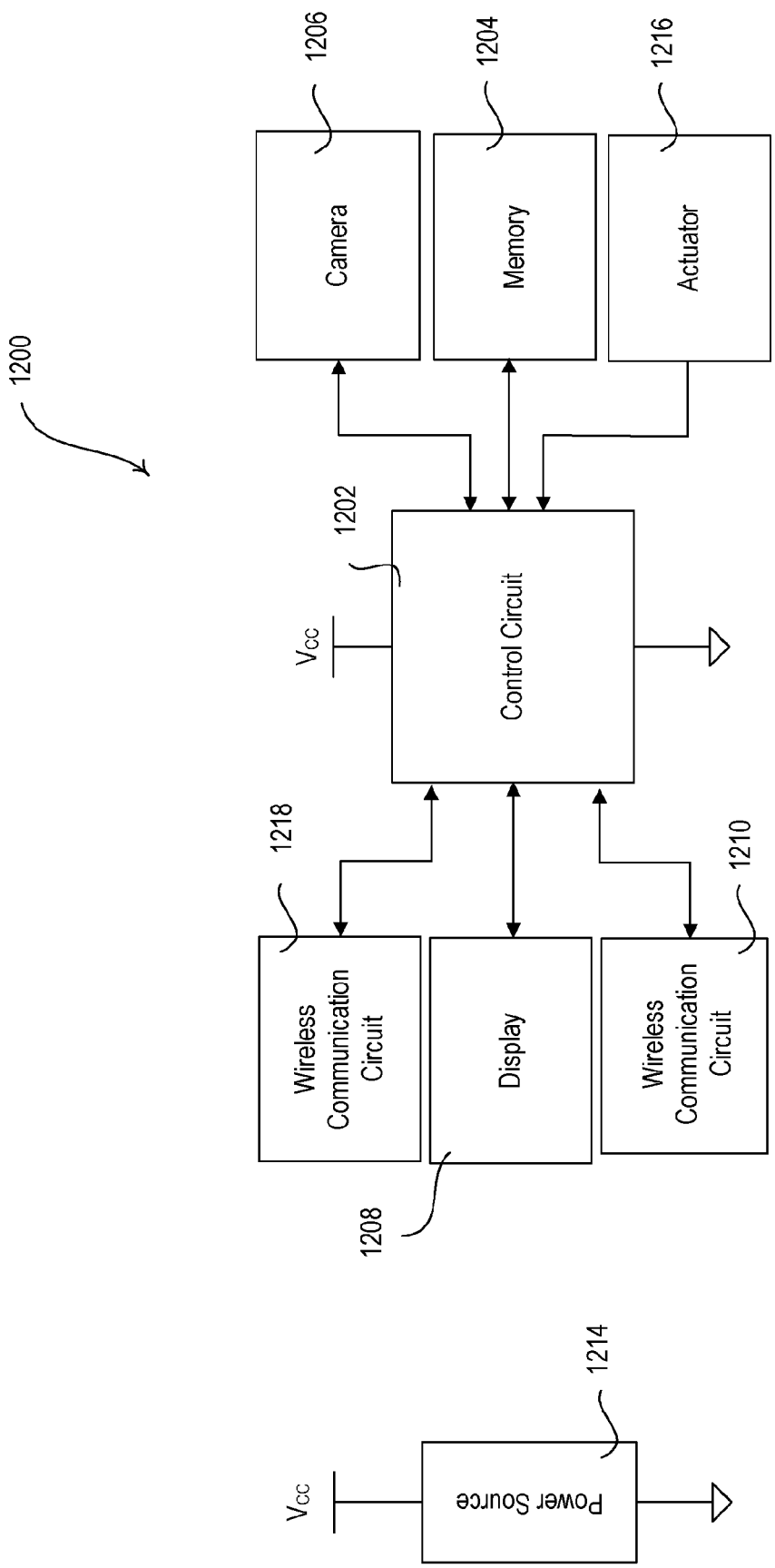
FIG. 12 is a block diagram depicting an example mobile device.

FIG. 12 is a block diagram illustrating an example mobile device 1200 (e.g., a mobile device 190 shown in FIG. 1A) as described herein. Though the mobile device 1200 is described herein separately from the computing device 1000, the mobile device 1200 may be a computing device. The block diagram of FIG. 12 may show additional portions of the mobile device 1200 that may be implemented in the mobile device and/or other computing devices herein. The mobile device 1200 may include a control circuit 1202 for controlling the functionality of the mobile device 1200. The control circuit 1202 may include one or more general purpose processors, special purpose processors, conventional processors, digital signal processors (DSPs), microprocessors, integrated circuits, a programmable logic device (PLD), application specific integrated circuits (ASICs), and/or the like. The control circuit 1202 may perform signal coding, data processing, power control, image processing, input/output processing, and/or any other functionality that enables the mobile device 1200 to perform as described herein.

The control circuit 1202 may store information in and/or retrieve information from the memory 1204. The memory 1204 may include a non-removable memory and/or a removable memory. The non-removable memory may include random-access memory (RAM), read-only memory (ROM), a hard disk, and/or any other type of non-removable memory storage. The removable memory may include a subscriber identity module (SIM) card, a memory stick, a memory card (e.g., a digital camera memory card), and/or any other type of removable memory. The memory 1204 may include computer-executable and/or machine-executable instructions that may be accessed by the control circuit 1202 for operating a mobile device, as described herein.

The mobile device 1200 may include a camera 1206 that may be in communication with the control circuit 1202. The camera 1206 may include a digital camera or other optical device configured to generating images or videos (e.g., image sequences) for being captured at the mobile device 1200 using visible light. The camera 1206 may include a light configured to flashing, modulating, or turning on/off in response to signals received from the control circuit.

The mobile device 1200 may include a first wireless communication circuit 1210 for transmitting and/or receiving information. The first wireless communication circuit 1210 may perform wireless communications on a first wireless communication link and/or network (e.g., a network wireless communication link). The mobile device 1200 may also, or alternatively, include a second wireless communication circuit 1218 for transmitting and/or receiving information. The second wireless communication circuit 1218 may perform wireless communications via a second wireless communication link and/or network (e.g., a short-range wireless communication link). The first and second wireless communication circuit 1210, 1218 may be in communication with control circuit 1202. The wireless communication circuits 1210 and 1218 may include RF transceivers or other communications modules configured to performing wireless communications via an antenna. The wireless communication circuit 1210 and wireless communication circuit 1218 may be configured to performing communications via the same communication channels or different communication channels. For example, the first wireless communication circuit 1210 may be configured to communicating (e.g., with control devices and/or other devices in the load control system) via the first wireless communication link and/or network using a first wireless communication protocol (e.g., a network wireless communication protocol, such as the CLEAR CONNECT and/or THREAD protocols) and the second wireless communication circuit 1218 may be configured to communicating (e.g., with a sensor device or another device) via the second wireless communication channel and/or network using a second wireless communication protocol (e.g., a short-range wireless communication protocol, such as the BLUETOOTH and/or BLUETOOTH LOW ENERGY (BLE) protocols).

The control circuit 1202 may also be in communication with a display 1208. The display 1208 may provide information to a user in the form of a graphical and/or textual display. The control circuit 1202 may signal the display 1208, or portions thereof, to modulate or turn on/off to communicate information from the display 1208. The communication between the display 1208 and the control circuit 1202 may be a two-way communication, as the display 1208 may include a touch screen module configured to receiving information from a user and providing such information to the control circuit 1202.

The mobile device 1200 may include an actuator 1216. The control circuit 1202 may be responsive to the actuator 1216 for receiving a user input. For example, the control circuit 1202 may be operable to receive a button press from a user on the mobile device 1200 for making a selection or performing other functionality on the mobile device 1200.

One or more of the circuits within the mobile device 1200 may be powered by a power source 1214. The power source 1214 may include an AC power supply or DC power supply, for example. The power source 1214 may generate a DC supply voltage Vcc for powering the circuits within the mobile device 1200.

Figure 13:
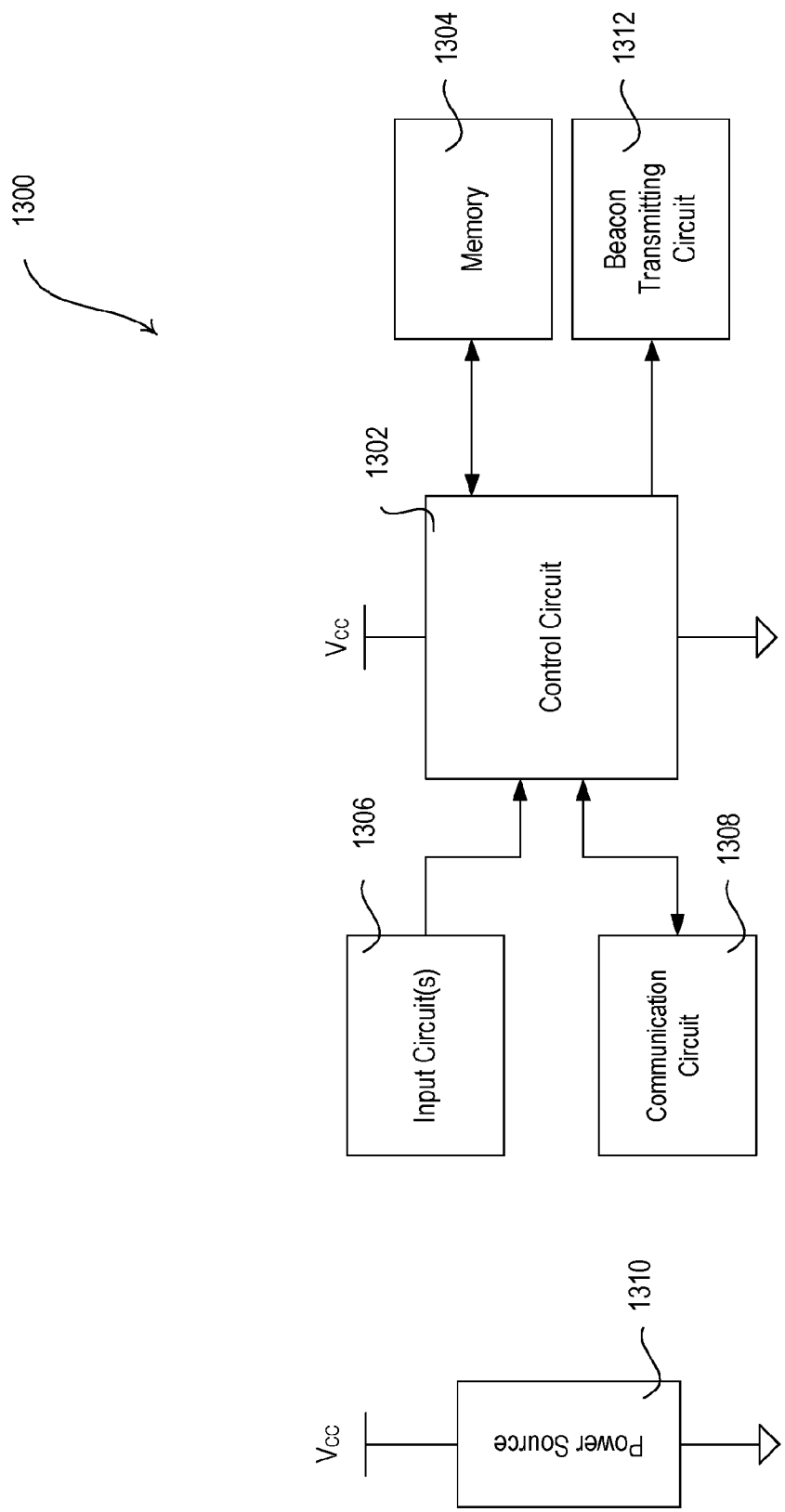
FIG. 13 is a block diagram depicting an example input device.

FIG. 13 is a block diagram illustrating an example input device 1300 as described herein. The input device 1300 may be a remote-control device (e.g., remote control device 170 shown in FIG. 1A), a sensor device (e.g., sensor devices 180*a*, 180*b* shown in FIG. 1A), or another input device. The input device 1300 may include a control circuit 1302 for controlling the functionality of the input device 1300. The control circuit 1302 may include one or more general purpose processors, special purpose processors, conventional processors, digital signal processors (DSPs), microprocessors, integrated circuits, a programmable logic device (PLD), application specific integrated circuits (ASICs), or the like. The control circuit 1302 may perform signal coding, data processing, power control, input/output processing, or any other functionality that enables the input device 1300 to perform as described herein.

The control circuit 1302 may store information in and/or retrieve information from the memory 1304. The memory 1304 may include a non-removable memory and/or a removable memory, as described herein. The memory 1302 may include computer-executable and/or machine-executable instructions that may be accessed by the control circuit 1302 for operating an input device, as described herein.

The input device 1300 may include a communication circuit 1308 for transmitting and/or receiving information. The communication circuit 1308 may transmit and/or receive information via wired and/or wireless communications. The communication circuit 1308 may include a transmitter, an RF transceiver, or other communication circuit configured to performing wired and/or wireless communications. The communication circuit 1308 may be in communication with control circuit 1302 for transmitting and/or receiving information.

Additionally, or alternatively, the input device 1300 may include a second communication circuit, such as a beacon transmitting circuit 1312 for transmitting beacon signals. For example, some input devices in the load control system may include the beacon transmitting circuit (e.g., sensor devices), while other input devices may include another communication circuit, such as the communication circuit 1308. The beacon transmitting circuit 1312 may transmit beacon signals via a second wireless communication link and/or network (e.g., a short-range wireless communication link). The beacon transmitting circuit 1312 may be in communication with control circuit 1302 for transmitting beacon signals. The beacon transmitting circuit 1312 may be configured to performing communications via a different communication channels as the communication circuit 1308. For example, the communication circuit 1308 may be configured to communicating (e.g., with control devices and/or other devices in the load control system) via the first wireless communication link and/or network using a first wireless communication protocol (e.g., a network wireless communication protocol, such as the CLEAR CONNECT and/or THREAD protocols) and the beacon transmitting circuit 1312 may be configured to communicating (e.g., with a mobile device, system controller, collection device, and/or another device) via a wireless communication channel and/or network using a second wireless communication protocol (e.g., a short-range wireless communication protocol, such as the BLUETOOTH and/or BLUETOOTH LOW ENERGY (BLE) protocols). Though the beacon transmitting circuit 1312 is described as a transmitting circuit, the input device 1300 may receive information at the control circuit 1302 via the beacon transmitting circuit 1312.

The control circuit 1302 may also be in communication with one or more input circuits 1306. The input circuits 1306 may include an actuator (e.g., one or more buttons) for receiving input that may be sent to a device for controlling an electrical load. For example, the input device may receive input from the input circuit 1306 to put the control circuit 1302 in an association mode and/or communicate association messages from the input device 1300. The input circuits 1306 may include one or more sensors for receiving measurements of environmental conditions. For example, the input circuits 1306 for a sensor device may include one or more temperature sensors, one or more humidity sensors, or more visible light sensors, one or more color temperature sensors, and/or other sensor types configured to measuring environmental conditions, as described herein. The control circuit 1302 may receive information from the input circuits 1306 (e.g., an indication that a button has been actuated or measurements of environmental conditions). Each of the circuits within the input device 1300 may be powered by a power source 1310.

Although features and elements are described herein in particular combinations, each feature or element can be used alone or in any combination with the other features and elements. For example, the functionality described herein may be described as being performed by a control device, such as a remote control device or a lighting device, but may be similarly performed by a hub device or a mobile device. The methods described herein may be implemented in a computer program, software, or firmware incorporated in one or more computer-readable media for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed is:

1. A sensor device comprising:
  a beacon transmitting circuit; and
  a plurality of sensors, wherein each sensor of the plurality of sensors is configured to measure an environmental condition; and
  a control circuit configured to:
    determine an expiration of a measurement timer;
    in response to the expiration of the measurement timer, measure a respective value for each of the environmental conditions via respective ones of the plurality of sensors;
    determine an expiration of a transmission timer a plurality of times within the period of the measurement timer; and
    in response to each expiration of the transmission timer, transmit a respective message via beacon signals on the beacon transmitting circuit, wherein each of the respective messages comprises the values of the environmental conditions.

2. The sensor device of claim 1, wherein a first environmental condition of the environmental conditions comprises a temperature, wherein a second environmental condition of the environmental conditions comprises a humidity, and wherein a third environmental condition of the environmental conditions comprises a lighting condition.

3. The sensor device of claim 2, wherein the lighting condition is a first lighting condition, wherein the sensor device comprises a first sensor of the plurality of sensors that is configured to measure the first lighting condition and a second sensor that is configured to measure a second lighting condition, wherein the first sensor is configured to measure the first lighting condition on a first plane, and wherein the second sensor is configured to measure the second lighting condition on a second plane.

4. The sensor device of claim 3, wherein the first plane and the second plane are orthogonal to each other.

5. A load control system comprising:
a sensor device configured to:
measure respective values of one or more environmental conditions within a location; and
transmit the measured values and a location identifier that identifies the sensor device;
a mobile device configured to:
receive the measured values and the location identifier from the sensor device;
present a survey to a user of the mobile device, wherein the survey is configured to prompt the user to enter a respective comfort level for each of the measured environmental conditions; and
transmit the measured values, the location identifier, the survey responses, and an occupant identifier that identifies the user of the mobile device; and
a computing device configured to:
receive the measured values, the location identifier, the survey responses, and an occupant identifier that identifies the user of the mobile device from the mobile device; and
build a profile associated with at least one of the location identifier and the occupant identifier, wherein the profile comprises a respective preferred value for each environmental condition.

6. The load control system of claim 5, wherein the load control system further comprises one or more load control devices, and wherein the computing device is further configured to:
determine that a current value for a first environmental condition of the one or more environmental conditions differs from a preferred value for the first environmental condition based on the profile;
generate control instructions configured to cause a first load control device of the one or more load control devices to modify the first environmental condition such that the preferred value for the first environmental condition is reached; and
transmit the control instructions to the first load control device.

7. The load control system of claim 5, wherein the one or more environmental conditions comprise one or more of a temperature of the location, a humidity level of the location, a color temperature of light within the location, and an intensity of the light within the location, and wherein the profile comprises one or more of a preferred temperature for the location, a preferred humidity for the location, a preferred color temperature of the light within the location, and a preferred intensity of the light within the location.

8. The load control system of claim 5, wherein the computing device is further configured to:
receive one or more further measured values and one or more further survey responses; and
update the profile based on the further measured values and the further survey responses.

9. The load control system of claim 5, wherein the profile comprises a plurality of preferred values for a first environmental condition, and wherein the computing device is further configured to select one of the plurality of preferred values for the first environmental condition based on one or more factors.

10. The load control system of claim 9, wherein the one or more factors include one or more of a time of day, a day of week, a date, or a vacancy condition of the location.

11. A load control system comprising:
a sensor device configured to measure one or more lighting conditions in different directions; and
a computing device configured to:
receive data from the sensor device that comprises the one or more lighting conditions measured by the sensor device;
analyze the one or more lighting conditions;
determine that a ratio of one or more lighting conditions are outside of a predefined threshold;
generate control instructions configured to adjust the one or more lighting conditions to bring the ratio of the lighting conditions within the predefined threshold; and
send the control instructions to one or more lighting control devices.

12. The load control system of claim 11, wherein the lighting conditions comprise color conditions or lighting intensity values, and wherein the control instructions are configured to change a color value or a lighting intensity value of one or more lighting loads controlled by the one or more lighting control devices.

13. The load control system of claim 12, wherein the color conditions comprise full-color values or color temperature values.

14. The load control system of claim 13, wherein the different directions comprise a first plane and a second plane.

15. The load control system of claim 14, wherein the first plane is a vertical plane and the second plane is a horizontal plane.

16. The load control system of claim 11, wherein the one or more lighting conditions comprise a plurality of lighting conditions, and wherein the predefined threshold is different for each lighting condition.

* * * * *